(12) United States Patent
Sheikh et al.

(10) Patent No.: US 11,510,545 B2
(45) Date of Patent: Nov. 29, 2022

(54) APPARATUS AND METHODS FOR SEMI-AUTONOMOUS CLEANING OF SURFACES

(71) Applicant: Avidbots Corp., Waterloo (CA)

(72) Inventors: Faizan Sheikh, Kitchener (CA); Pablo Roberto Molina Cabrera, Kitchener (CA); Todd Willick, Corbeil (CA); Julien D'Alessio-Doucet, Grimsby (CA); Kenneth Lee, Mississauga (CA)

(73) Assignee: AVIDBOTS CORP., Kitchener (CA)

( * ) Notice: Subject to any disclaimer, the term of this patent is extended or adjusted under 35 U.S.C. 154(b) by 115 days.

(21) Appl. No.: 16/859,476

(22) Filed: Apr. 27, 2020

(65) Prior Publication Data
US 2020/0329937 A1    Oct. 22, 2020

Related U.S. Application Data

(63) Continuation of application No. 15/137,510, filed on Apr. 25, 2016, now Pat. No. 10,667,664.
(Continued)

(51) Int. Cl.
*A47L 11/282*    (2006.01)
*A47L 11/40*    (2006.01)

(52) U.S. Cl.
CPC ......... *A47L 11/282* (2013.01); *A47L 11/4011* (2013.01); *A47L 11/4044* (2013.01);
(Continued)

(58) Field of Classification Search
CPC ............... A47L 11/282; A47L 11/4011; A47L 11/4044; A47L 11/4061; A47L 11/4066;
(Continued)

(56) References Cited

U.S. PATENT DOCUMENTS 5,341,540 A * 8/1994 Soupert ............... G05D 1/0234
180/169
7,170,252 B2 * 1/2007 Maeki ................. G05D 1/0274
700/258
(Continued)

FOREIGN PATENT DOCUMENTS

CN 101081153 A 12/2007
CN 101480795 A 7/2009
(Continued)

OTHER PUBLICATIONS

Non-Final Office Action dated Jul. 19, 2018 for U.S. Appl. No. 15/137,510, 5 pages.
(Continued)

*Primary Examiner* — Richard M Camby
(74) *Attorney, Agent, or Firm* — Cooley LLP

(57) ABSTRACT

An apparatus includes a frame, a drive assembly supported by the frame, an electronic system supported by the frame, and a cleaning assembly coupled to the frame. The drive assembly is configured to move the frame along a surface. The cleaning assembly is configured to engage the surface to transfer detritus from the surface to a storage volume supported by the frame. The electronic system has at least a processor and a memory. The processor is configured to define a path along which the drive assembly travels and is configured to redefined a path along which the drive assembly travels based on at least one signal received from at least one sensor.

20 Claims, 40 Drawing Sheets

Related U.S. Application Data

(60) Provisional application No. 62/152,203, filed on Apr. 24, 2015.

(52) U.S. Cl.
CPC ....... *A47L 11/4061* (2013.01); *A47L 11/4066* (2013.01); *A47L 11/4072* (2013.01); *A47L 2201/00* (2013.01); *A47L 2201/04* (2013.01)

(58) Field of Classification Search
CPC ............. A47L 11/4072; A47L 2201/00; A47L 2201/04; A47L 11/24; A47L 11/28; A47L 11/40; A47L 11/4041; A47L 11/4069
See application file for complete search history.

(56) References Cited

U.S. PATENT DOCUMENTS

| | | | |
|---|---|---|---|
| 7,188,000 | B2 | 3/2007 | Chiappetta et al. |
| 7,275,280 | B2 | 10/2007 | Haegermarck et al. |
| 8,001,651 | B2 | 8/2011 | Chang |
| 8,387,193 | B2 | 3/2013 | Ziegler et al. |
| 8,892,251 | B1 | 11/2014 | Dooley et al. |
| 10,206,550 | B2 | 2/2019 | Sheikh et al. |
| 10,667,664 | B2 * | 6/2020 | Sheikh ................. A47L 11/282 |
| 2004/0083570 | A1 | 5/2004 | Song et al. |
| 2005/0166357 | A1 | 8/2005 | Uehigashi |
| 2005/0171644 | A1 | 8/2005 | Tani |
| 2005/0251457 | A1 | 11/2005 | Kashiwagi |
| 2007/0016328 | A1 | 1/2007 | Zeigler et al. |
| 2007/0244610 | A1 | 10/2007 | Ozick et al. |
| 2007/0267570 | A1 | 11/2007 | Park et al. |
| 2009/0216449 | A1 | 8/2009 | Erko et al. |
| 2010/0211244 | A1 | 8/2010 | Jeong et al. |
| 2012/0084939 | A1 | 4/2012 | Kim et al. |
| 2012/0283906 | A1 | 11/2012 | Anderson |
| 2013/0054022 | A1 | 2/2013 | Jang et al. |
| 2013/0118528 | A1 * | 5/2013 | Kim ..................... G05D 1/0219 134/18 |
| 2014/0150820 | A1 * | 6/2014 | Yoo ..................... A47L 11/4061 15/98 |
| 2014/0257564 | A1 * | 9/2014 | Sun ........................ B25J 9/0003 700/259 |
| 2016/0095487 | A1 * | 4/2016 | Koura ................... A47L 9/1418 429/99 |

FOREIGN PATENT DOCUMENTS

| | | |
|---|---|---|
| CN | 102727135 A | 10/2012 |
| CN | 103092205 A | 5/2013 |
| CN | 103099583 A | 5/2013 |
| CN | 103479303 A | 1/2014 |
| CN | 103799921 A | 5/2014 |
| CN | 104161487 A | 11/2014 |
| CN | 104248395 A | 12/2014 |
| DE | 10 2009 041362 A1 | 3/2011 |
| EP | 2 294 960 A2 | 3/2011 |
| EP | 2 330 471 A2 | 6/2011 |
| EP | 2 713 232 A1 | 4/2014 |
| EP | 2 730 205 A1 | 5/2014 |
| EP | 2 804 065 A1 | 11/2014 |
| JP | 63-183032 A | 7/1988 |
| JP | 5-502743 A | 5/1993 |
| JP | 2005-211367 A | 8/2005 |
| JP | 2013-103135 A | 5/2013 |
| JP | 2013-250684 | 12/2013 |
| JP | 2014-108356 A | 6/2014 |
| WO | WO 2001/037060 A1 | 5/2001 |
| WO | WO 2009/132317 A1 | 10/2009 |

OTHER PUBLICATIONS

Non-Final Office Action dated Oct. 19, 2018 for U.S. Appl. No. 15/137,510, 6 pages.
Final Office Action dated Mar. 1, 2019 for U.S. Appl. No. 15/137,510, 6 pages.
Final Office Action dated Oct. 8, 2019 for U.S. Appl. No. 15/137,510, 6 pages.
Office Action dated Dec. 22, 2021 for Chinese Application No. 202110140264.7, with English translation, 21 pages.
International Preliminary Report on Patentability dated Oct. 24, 2017 for International Application No. PCT/CA2016/050480, 5 pages.
International Search Report and Written Opinion dated Jul. 19, 2016 for International Application No. PCT/CA2016/050480, 9 pages.
Examination Report No. 1 for Australian Application No. 2016253435, dated Apr. 6, 2020, 5 pages.
Notification of the Second Office Action and Search Report dated Mar. 27, 2020 for Chinese Application No. 201680034996.5, with English translation, 18 pages.
Office Action dated Sep. 17, 2019 for Chinese Application No. 201680034996.5, with English translation, 22 pages.
Extended European Search Report dated Feb. 1, 2019 for European Application No. 16782441.6, 6 pages.
Notice of Reasons for Rejection dated Mar. 18, 2020 for Japanese Application No. 2018-506462, with English translation, 8 pages.

* cited by examiner

APPARATUS AND METHODS FOR SEMI-AUTONOMOUS CLEANING OF SURFACES

CROSS-REFERENCE TO RELATED APPLICATIONS

This application is a continuation of U.S. patent application Ser. No. 15/137,510, entitled "Apparatus and Methods for Semi-Autonomous Cleaning of Surfaces, filed Apr. 25, 2016, which claims priority to and the benefit of U.S. Provisional Patent Application Ser. No. 62/152,303, entitled "Apparatus and Methods for Semi-Autonomous Cleaning of Surfaces," filed Apr. 24, 2015, the disclosure of each of which is incorporated herein by reference in its entirety.

BACKGROUND

The embodiments described herein relate to apparatus and methods for cleaning a surface and more particularly, to apparatus and methods for at least semi-autonomous cleaning of floors and/or other surfaces.

The use of at least semi-autonomous devices configured to perform a set of tasks is known. For example, robots can be used to clean a surface, mow a lawn, collect items from a stocked inventory, etc. Such devices can be configured to operate in a number of different ways; however, central to all these devices is the ability for the device to determine its position relative to a given area. Specifically, some known devices for at least semi-autonomous cleaning of a surface such as a floor, can be configured to determine its location relative to an area of that surface. In some instances, such devices and/or robots can include any number of sensors, cameras, light emitting and/or sensing device (e.g., visible light, infrared light, etc.), radio and/or sound wave emitters (e.g., sonar), global positioning system (GPS) radios, and/or any other device used to locate the device and/or robot within an area. Although these devices (robots) are configured to operate in at least a semi-autonomous manner, optimal design and/or control still presents challenges.

For example, in some instances, object-sensing methods such as sonar can be limited, inaccurate, and/or difficult to program. In other instances, a robot that is configured (e.g., programed) to travel along a predetermined path may encounter an unexpected obstacle or the like, which can cause the robot to deviate from the predetermined path in a manner that may be unrecoverable without user (e.g., human) intervention. Moreover, defining the predetermined path can include extensive time and/or programing and is often not the most efficient path along which the robot should travel. In still other instances, some known robots fail to provide a user with an indication of the robots position, progress, and/or status. In addition, the arrangement of some robots configured to clean a surface, may lack a suitable drive system that can allow the robot to reach into corners and/or otherwise effectively clean the desired surface.

Thus, a need exists for improved apparatus and methods for semi-autonomous cleaning of surfaces.

SUMMARY

Apparatus and methods for at least semi-autonomous cleaning of floors and/or other surfaces are described herein. In some embodiments, an apparatus includes a frame, a drive system supported by the frame, an electronic system supported by the frame, and a cleaning assembly coupled to the frame. The drive system is configured to move the frame along a surface. The cleaning assembly is configured to engage the surface to transfer detritus from the surface to a storage volume supported by the frame. The electronic system has at least a processor and a memory. The processor is configured to define a path along which the drive system travels and is configured to redefine a path along which the drive system travels based on at least one signal received from at least one sensor.

DETAILED DESCRIPTION

Figure 1:
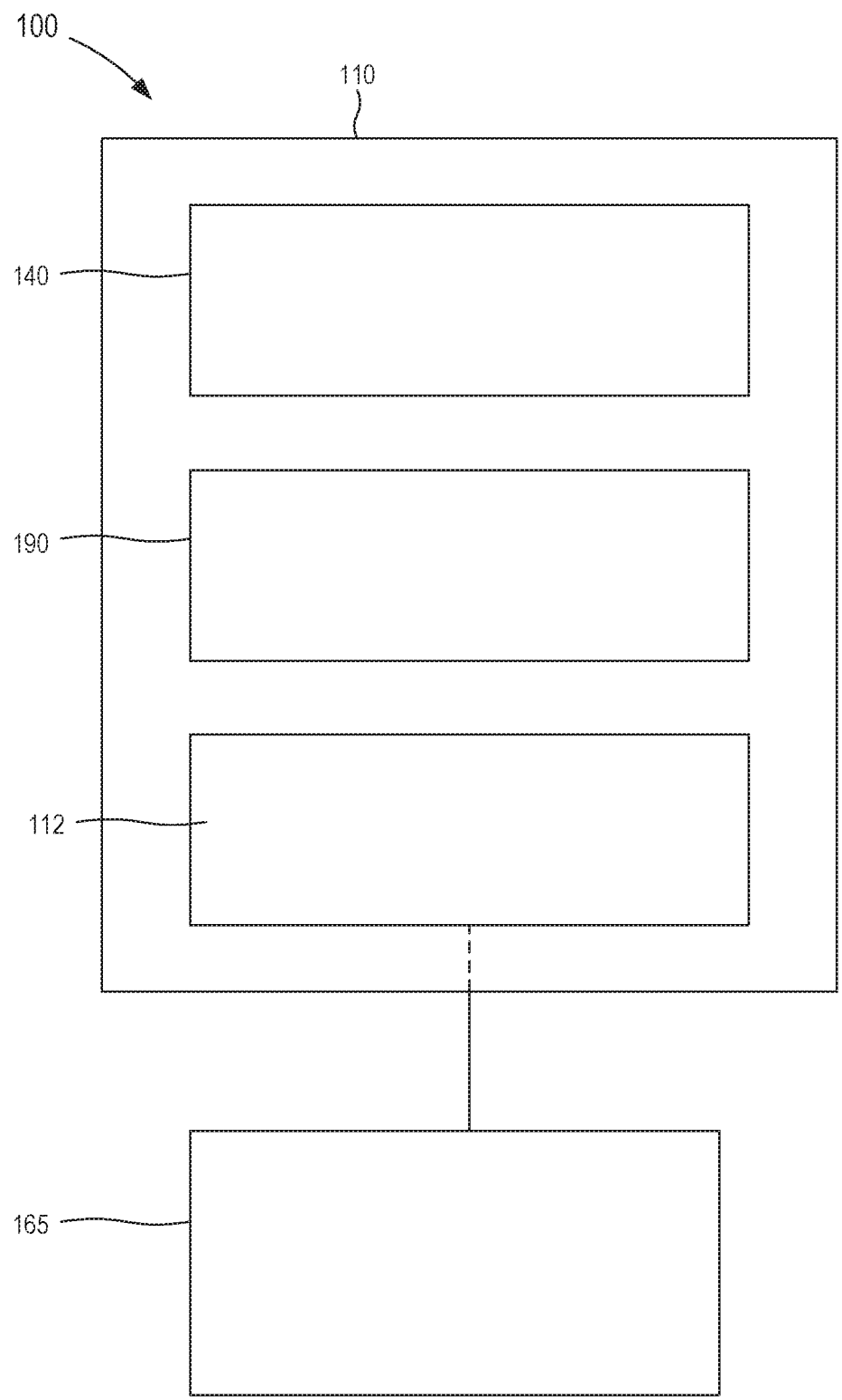
FIG. 1 is a schematic illustration of a semi-autonomous robot according to an embodiment.

The devices and methods described herein can be used, for example, in at least semi-autonomous floor sweeping, vacuuming, and/or scrubbing. In some embodiments, an apparatus includes a frame, a drive system supported by the frame, an electronics system supported by the frame, and a cleaning assembly coupled to the frame. The drive system is configured to move the frame along a surface. The cleaning assembly is configured to engage the surface to transfer detritus from the surface to a storage volume supported by the frame. The electronics system has at least a processor and a memory. The processor is configured to define a path along which the drive system travels and is configured to redefine a path along which the drive system travels based on at least one signal received from at least one sensor.

In some embodiments, a semi-autonomous cleaning robot includes a frame, a drive system, a cleaning assembly, and an electronics system. The drive system is supported by the frame and is configured to move the frame along a surface. The drive system has at least one wheel configured to rotate about a first axis and a second axis non-parallel to the first axis. The cleaning assembly is coupled to the frame and is configured to engage the surface to transfer detritus from the surface to a storage volume supported by the frame. The electronics system is supported by the frame and has at least a processor and a memory. The processor is configured to execute a set of instructions stored in the memory associated with defining a path. The drive system is configured to move the cleaning assembly along the path and the cleaning assembly is configured to engage the surface to transfer detritus from the surface to the storage volume. The processor is configured to define a redefined path along which the drive system is configured to move the cleaning assembly based on receiving at least one signal associated with the path.

In some embodiments, a semi-autonomous cleaning robot includes a frame supporting at least one storage volume, a drive system coupled to the frame, a cleaning assembly coupled to the frame, and an electronics system supported by the frame. The drive system is configured to move the frame along a surface. The drive system has a set of wheels, with each wheel being configured to rotate about a wheel axis in response to an output of a different motor from a set of motors. An angle defined between each wheel axis being substantially equal. Each wheel includes a set of rollers, each of which is configured to rotate about an independent roller axis non-parallel to the wheel axis associated with that wheel. The cleaning assembly is configured to engage the surface to transfer detritus from the surface to the at least one storage volume. The electronics system is configured to send one or more signals, to at least one motor from the set of motors, indicative of an instruction to rotate the associated wheel about the associated wheel axis to move the cleaning assembly along the surface in a predetermined path.

A method of at least semi-autonomous cleaning of a surface using a cleaning robot with an electronics system configured to control at least a portion of the cleaning robot includes defining an initial data set representing a map of the surface to be cleaned based on data received at a processor of the electronics system from at least one sensor included in the cleaning robot. The processor decomposes the initial data set into multiple sector data sets, in which each sector data set represents a sector of the map. An intra-sector data set is defined for each sector data set. Each intra-sector data set represents an intra-sector path along the associated sector of the map based at least in part on a calculated efficiency associated with the cleaning robot cleaning a portion of the surface corresponding to that sector. An inter-sector data set is defined that represents an inter-sector path along the map based at least in part on combining each intra-sector path and a calculated efficiency associated with the cleaning robot moving on the surface and substantially along the inter-sector path to clean the surface.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. For example, a monolithically constructed wall can include a set of detents can be said to form a set of walls. A set of walls can also be fabricated from multiple items that are produced separately and are later joined together (e.g., via a weld, an adhesive, or any suitable method).

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the term "kinematics" describes the motion of a point, object, or system of objects without considering a cause of the motion. For example, the kinematics of an object can describe a translational motion, a rotational motion, or a combination of both translational motion and rotational motion. When considering the kinematics of a system of objects, known mathematical equations can be used to describe to the motion of an object relative to a plane or set of planes, an axis or set of axes, and/or relative to one or more other objects included in the system of objects.

As used herein, the terms "feedback", "feedback system", and/or "feedback loop" relate to a system wherein past or present characteristics influence current or future actions. For example, a drive mechanism is said to be a feedback system wherein the state of the drive mechanism (e.g., position, direction, velocity, acceleration, etc.) is dependent on a current or past state being fed back to the drive mechanism. In some instances, a feedback system can be an electromechanical system including a number of relays, switches, and/or the like that can open or close an electric circuit based on a signal received from a sensor, a flow or a direction of flow of electricity, and/or the like. In some instances, a feedback system can be controlled and/or implemented in a programmable logic controller (PLC) that can use control logic to perform one or more actions based on an input from a system component, a state of an electric circuit, and/or a flow of electric power. In some instances, a PLC can include a control scheme such as, for example, a proportional-integral-derivative (PID) controller. As such, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system.

Electronic devices often implement feedback systems to actively control the kinematics of mechanical systems in order to achieve and/or maintain a desired system state. For example, a feedback system can be implemented to control a force within a system (e.g., a mass-spring system and/or the like) by changing the kinematics and/or the position of one or more components relative to any other components included in the system. Expanding further, the feedback system can determine current and/or past states (e.g., position, velocity, acceleration, force, torque, tension, electrical power, etc.) of one or more components included in the mechanical system and return the past and/or current state values to, for example, a PID control scheme. In some instances, an electronic device can implement any suitable numerical method or any combination thereof (e.g., Newton's method, Gaussian elimination, Euler's method, LU decomposition, etc.). Thus, based on the past and/or current state of the one or more components, the mechanical system can be actively changed to achieve a desired system state.

In some embodiments, a device (e.g., a robot) for autonomous floor sweeping and scrubbing can include an electronics system configured to perform and/or execute a set of instructions and/or modules to control at least one of a drive system, a cleaning assembly, a changeable cleaning head, a vacuum source, a pump, a motor, and/or the like based on one or more signals associated with an operational condition of the robot and/or an environmental condition associated with the area to be cleaned. For example, in some embodiments, the electronics system can include at least a processor, a memory, and a power source, as well as any suitable sensor, encoder, beacon, camera, and/or the like (collectively referred to herein as "sensors") and can perform any number of processes associated with controlling a portion of the robot (e.g., via a feedback control system, PLC, PID, etc.) to maintain safe operation of the robot as well as to provide environmental awareness such as localization and/or mapping. Such sensors can be in communication (e.g., at least indirectly) with the processor and/or a remote control device in communication with the electronics system such as a remote controller, a mobile device, a smartphone, a tablet, a laptop, a personal computer, and/or the like.

By way of example, in some embodiments, the processor and/or other suitable controller can be in communication with one or more laser transceivers, cameras, radios, encoders, inertial measurement units (IMUs), range sensors, and/or any other suitable device configured to send data associated with at least one operational condition, status, state, etc. of the robot. Specifically, a laser transceiver can be a two-dimensional (2-D) laser scanner light-radar (LIDAR) system such as a UTM-30LX made by Hokuyo Automatic Co., based in Japan; a camera can be a three-dimensional (3-D) camera such as a Kinect v2 optical camera and/or sensor made by Microsoft Corp., based in Redmond, Wash., USA; a radio or radio beacon can be radio transceiver (e.g., an ultra-wideband radio) such as a DW1000 made by decaWave, based in Dublin, Ireland; an encoder can be a wheel encoder or the like such as an E3 series optical encoder made by US Digital, based in Vancouver, Wash.; an IMU can be multi-axis, multi-sensor device (e.g., a 3-axis compass, 3-axis gyroscope, and 3-axis accelerometer sensor) such as a PhidgetSpatial 3/3/3 made by Phidgets, based in Calgary, Alberta, Canada; a range sensor can be an infrared (IR) distance sensor such as a GP2Y series made by Sharp, based in Japan. While specific components (e.g., sensors, transceivers, cameras, radios, encoders, IMUs, etc.) are described, the list of components is not an exhaustive listing of electric and/or electronic devices configured to facilitate the operation of the embodiments described herein. Thus, any of the embodiments described herein can include any suitable electric and/or electronic device. Similarly, any of the embodiments described herein can include sensor or the like that are different from those listed above, yet perform substantially the same function.

In some embodiments, a processor of an electronics system included in a robot can execute a set of instructions, code, and/or modules associated with formulating a cleaning fluid. For example, the processor can execute a set of instructions and/or modules such that a predetermined volume of a desired cleaning chemical is mixed with a diluent (e.g., water) to formulate a cleaning fluid having a desired dilution rate for a given floor type, as described in further detail herein. In some embodiments, the electronics system can include a user interface such as a display to allow a user to interact with the robot and/or to graphically represent one or more operating conditions associated with the robot. In some embodiments, the electronics system and/or the processor included therein can be configured to send a signal to a remote control device (described above) indicative of an instruction to present data on a display of the remote control device, which graphically represents the one or more operating conditions of the robot, a status associated with the surface being cleaned, and/or the like. For example, the processor can determine and/or define a progress and/or planning report based on one or more operating conditions of the robot, one or more environmental conditions associated with the area to be cleaned by the robot, and/or a user input and can send a signal to the user interface and/or the remote control device indicative of an instruction to graphically represent data associated with the one or more operating conditions and/or the one or more environmental conditions.

In some embodiments, a robot can include a drive system configured to advance the robot along a surface to place a cleaning assembly (e.g., a cleaning head or the like) into a corner or other tight area without resulting in the robot becoming stuck, trapped, and/or otherwise able to move. In some embodiments, the drive system can allow for cleaning close to edges and corners, cleaning in areas with relatively complex layouts, and/or cleaning a new location without extensive programming. In some embodiments, the drive system can be such that each powered wheel is associated with and/or is driven by its own motor. Moreover, in some embodiments, a drive system of a robot can be configured for holonomic motion, in which the drive system can rotate each wheel about an associated axis while allowing for translation of the robot with three-degrees of freedom in a plane associated with the surface on which the robot is traveling. That is to say, the drive system can be configured for holonomic motion, which can allow for rotation of the wheels and translation of the robot in the x and y direction. In some embodiments, the arrangement of the drive system can allow for precision point turns (e.g., "zero-degree" turns) while against a wall, or in a corner. For example, in some embodiments, the robot can include a cleaning assembly or cleaning head, which can have an edge and/or perimeter on an axis between two driven wheels that extends beyond an edge or perimeter of the robot (e.g., of the drive system) and/or which can be disposed forward of the drive system and/or other portions of the robot. As such, the drive system can position the cleaning assembly and/or cleaning head into corners and/or other objects, allow the cleaning assembly and/or cleaning head to clean an associated area, and then drive out of the corner and/or out of contact with an object while still cleaning.

FIG. 1 is a schematic illustration of device 100 such as, for example, a robot configured to clean a surface, according to an embodiment. The device 100 (also referred to herein as "cleaning robot" or "robot") includes at least a frame 110, a drive system 140, an electronics system 190, and a cleaning assembly 165. The cleaning robot 100 can be used to clean (e.g., vacuum, scrub, disinfect, etc.) any suitable surface area such as, for example, a floor of a home, commercial building, warehouse, etc. The robot 100 can be any suitable shape, size, or configuration and can include one or more systems, mechanisms, assemblies, or subassemblies (not shown in FIG. 1) that can perform any suitable function associated with, for example, traveling along a surface, mapping a surface, cleaning a surface, and/or the like.

The frame 110 of the robot 100 can be any suitable shape, size, and/or configuration. For example, in some embodiments, the frame 110 can include a set of components or the like, which are coupled to form a support structure configured to support the drive system 140, the cleaning assembly 165, and the electronic system 190. In some embodiments, the frame 110 can include any suitable components such as, for example, sheets, tubes, rods, bars, etc. In some embodiments, such components can be formed from a metal or metal alloy such as aluminum, steel, and/or the like. In other embodiments, such components can be formed from a thermoplastic and/or polymer such as nylons, polyesters, polycarbonates, polyacrylates, ethylene-vinyl acetates, polyurethanes, polystyrenes, polyvinyl chloride (PVC), polyvinyl fluoride, poly(vinyl imidazole), and/or blends and copolymers thereof.

In some embodiments, the frame 110 can include a set of components configured to define one or more inner volumes. For example, the frame 110 can include one or more sheet metal components that can define one or more inner volumes. In other embodiments, the frame 110 can include and/or can be coupled to a body, cover, skin, etc. that can define the one or more inner volumes. In this embodiment, the frame 110 (or body coupled to the frame 110) defines at least detritus volume 112. The detritus volume 112 can be any suitable shape, size, or configuration and can be selectively sealable. For example, in some embodiments, the frame 110 can be coupled to a body of the robot 100, which defines the detritus volume 112. The body can include a lid or cover configured to close, cover, and/or otherwise obstruct an opening of the body in fluid communication with the detritus volume 112 (e.g., via a tube, conduit, channel, opening, etc.). Moreover, as shown in FIG. 1, the cleaning assembly 165 can be in fluid communication with the detritus volume 112. Thus, the cleaning assembly 165 can transfer refuse, detritus, fluid, and/or the like from the surface on which the robot 100 is moving to the detritus volume 112. Similarly, the frame 110 can define and/or can be coupled to a body that can define an electronics system volume, a cleaning solution volume, a solution recovery volume, a dry debris volume, and/or any other suitable volume.

The drive system 140 of the robot 100 is coupled to and/or is otherwise supported by the frame 110. The drive system 140 can include one or more wheels configured to roll along a surface to move the robot 100 thereon. In some embodiments, the one or more wheels can be, for example, omniwheels or the like. In such embodiments, the wheels can be coupled to the frame and can be configured to rotate about an axis in response to a force. The wheels define, for example, a circumference along which a set of rollers are disposed. The set of rollers can be relatively small rollers, which are each configured to rotate about an axis associated with that roller. The axis of each roller can be, for example, perpendicular to the axis about which the wheel rotates. In this manner, as the wheel is rotated about its axis, the rollers disposed along the circumference of the wheel can be configured to rotate about the associated axis, which in turn, can advance the robot 100 in any suitable direction. In other words, the drive system 140 can be configured for holonomic motion.

In some embodiments, the drive system 140 can include one or more motors configured to power (e.g., drive, rotate, spin, engage, activate, etc.) the drive system 140. In some embodiments, the motor(s) can be configured to rotate the wheels of the drive system 140 at any suitable rate and/or any suitable direction (e.g., forward or reverse). In some embodiments, the drive system 140 can be a differential drive system including a first wheel coupled to a first motor and a second wheel coupled to a second motor. The first wheel and the second wheel, for example, can be disposed on opposite sides of the frame 110. In some embodiments, the electronic system 190 can be operatively coupled (e.g., electrically connected) to the first motor and the second motor such that the electronic system 190 can send an electronic signal associated with operating the motors. In addition, the drive system 140 can include one or more wheels that are coupled to the frame 110 in a passive arrangement. That is to say, the drive system 140 can include any suitable number of wheels that are not coupled to a motor.

In some embodiments, a drive system of a robot can be a differential drive system, a single steerable wheel drive system, and/or an omnidirectional drive system. In some embodiments, a differential drive system and/or an omnidirectional drive system can use two or more motors, which each rotate an associated wheel to drive a robot along a surface. Such a wheel, for example, can be an omnidirectional wheel (also referred to herein as "omni-wheel") configured to provide rotation about at least two axes, which can allow the robot to travel in any suitable direction. In some embodiments, a single steerable wheel drive system can use at least one motor to rotate the steerable wheel to drive the robot along the surface and/or at least one motor or other input mechanism to steer the steerable wheel.

In some embodiments, the motors can include a clutch, a brake, or the like configured to substantially lock the motors in response to a signal or a lack of a signal from the electronics system 190. Similarly stated, the motors can be placed in a locked configuration to limit movement of the robot 100 in response to a flow electric power or a lack of electric power from the electronics system 190. In some instances, the electronics system 190 can be configured to send a first signal to the first motor to cause the first motor to rotate the first wheel in a first rotational direction and can send a second signal to the second motor to cause the second motor to stop a rotation of the second wheel in a second rotational direction opposite the first rotational direction. As such, the electronics system 190 can send a set of signals to the drive system 140 to cause the robot 100 to turn in response to the signals from the electronics system 190, as described in further detail herein. In some embodiments, the arrangement of the drive system 140 can allow the robot 100 to place the cleaning assembly 165 into corners and/or other tight areas that otherwise could be missed with some known drive systems.

Although the drive system 140 is described above as including a first wheel and a second wheel coupled to a first motor and a second motor, respectively, in other embodiments, the drive system 140 can include any suitable number of wheels and/or motors. For example, in some embodiments, the drive system 140 can include three wheels, each of which is coupled to its own motor. In some embodiments, the wheels can be coupled to the frame 110 in a substantially triangular arrangement or the like. For example, in some embodiments, the wheels can be disposed at an angle relative to the other wheels such as, for example, 120 degrees. As described above, each wheel can be an omni-wheel or the like. Therefore, the electronics system 190 can be configured to send a set of signals to the drive system 140 and more particularly to one or more motors included in the drive system 140 to cause the one or more motors to rotate its associated wheel, thereby moving the robot 100 in a desired direction.

In other embodiments, the drive system 140 can include a single steerable wheel assembly and any suitable number of passive wheels (as described above). The steerable wheel assembly can include at least one motor configured to rotate a wheel included in the steerable wheel assembly. The steerable wheel assembly can be rotatably coupled to the frame 110. In some embodiments, the steerable wheel assembly can include a motor configured to rotate the steerable wheel assembly relative to the frame 110. In this manner, the electronic system 190 can send a set of signals to the drive system 140 to cause the wheel to rotate about a first axis and the steerable wheel assembly to rotate about a second axis perpendicular to the first axis. Thus, the drive system 140 can move the robot 100 in any suitable direction in response to a set of signals received from the electronics system 190.

The cleaning assembly 165 included in the robot 100 can be any suitable shape, size, and/or configuration. As described above, the cleaning assembly 165 is coupled to and/or is otherwise supported by the frame 110. More particularly, in some embodiments, the cleaning assembly 165 can be coupled to and/or can be suspended from the frame 110 via any suitable linkage or the like. In some embodiments, such linkage can, for example, allow movement of the cleaning assembly 165 relative to the frame 110. For example, in some embodiments, the linkage can be configured to move the cleaning assembly 165 closer to or away from the frame 110, which in turn, can move the cleaning assembly 165 away from or closer to a surface along which the robot 100 moves. In some embodiments, the robot 100 can include an actuator and/or the like configured to move the linkage relative to the frame 110 to place the cleaning assembly 165 in a desired position.

The cleaning assembly 165 can include any suitable cleaning mechanism, brush, roller, disc, scrubber, orbital, and/or the like configured to engage the surface on which the robot 100 travels. For example, in some embodiments, the cleaning assembly 165 can include a housing or the like that can define a vacuum chamber, and can include one or more cylindrical brushes rotatably coupled to the housing and at least partially disposed in the vacuum chamber. The one or more brushes can be operably coupled to a motor configured to rotate the one or more brushes relative to the housing. In some embodiments, the cleaning assembly 165 can include a cleaning head or the like can include one or more of a cylindrical cleaning member, a disc cleaning member, an orbital cleaning member, and/or the like. Such a cleaning head and/or the one or more cleaning members included therein can be swappable from one type (e.g., a cylindrical cleaning member) to another type (e.g., an orbital cleaning member), thereby allowing the cleaning assembly 165 to clean different types of surfaces.

In some embodiments, the robot 100 can include a skirt or the like (not shown in FIG. 1) that can form a squeegee and/or the like circumscribing at least a portion of the robot 100 to direct detritus toward the cleaning assembly 165. For example, in some embodiments, the skirt can be coupled to the frame 110 and can be configured to extend beyond a rear portion of the robot 100 such that at least a portion of the skirt is in contact with the surface. In some embodiments, the portion of the skirt in contact with the surface can have a width or length that is greater than a width of the frame 110. In some embodiments, at least a portion of the skirt is formed from and/or includes a substantially resilient, compliant, and/or otherwise flexible material that can be deformed when placed in contact with the surface. Thus, as the robot 100 is moved along the surface (e.g., via the drive system 140), the skirt can trail the robot 100 to limit and/or substantially prevent the robot 100 from passing over detritus. In some embodiments, the skirt can be coupled to the frame 110 via a bias member and/or spring configured to exert a force on a portion of the skirt to maintain contact between the skirt and the surface. As such, the skirt can be used as a squeegee or the like configured to limit and/or substantially prevent the robot 100 from passing over a fluid. Said another way, the skirt can act as a squeegee or the like that can absorb and/or direct a fluid such that substantially all the fluid (e.g., a used cleaning fluid or the like) is absorbed and/or entrained in a flow of detritus entering the cleaning assembly 165.

The cleaning assembly 165 can also include a pump or the like configured to generate a negative pressure within the vacuum chamber. In some embodiments, the pump can be coupled to the housing and in fluid communication with the vacuum chamber. In other embodiments, the pump can be disposed, for example, within the detritus volume 112 of the frame 110 and in fluid communication with the vacuum chamber via a tube, conduit, channel, opening, port, etc. The cleaning assembly 165 is in communication with the electronics system 190 and is configured to send a signal to and/or receive a signal from the electronics system 190 associated with the operation of the cleaning assembly 165. For example, in some embodiments, the electronics system 190 can send a signal to the cleaning assembly 165 that can cause the linkage coupling the cleaning assembly 165 to the frame 110 to be actuated, can cause the pump to transition from an "on" operational state to an "off" operational state and/or to change a flow rate through the pump, can cause the motor operably coupled to the one or more brushes to transition from an "on" operational state to an "off" operational state and/or to change an output speed thereof, and/or the like. Thus, the cleaning assembly 165 can be configured to engage the surface on which the robot 100 travels to clean the surface. Moreover, in some embodiments, the electronics system 190 can control, for example, a pressure exerted by a cleaning member, brush, disc, orbital, and/or cleaning head against the surface being cleaned.

As described above, the electronics system 190 included in the robot 100 can control at least a portion thereof. The electronic system 190 can include at least a memory, a processor, and an input/output (I/O) interface. The memory can be, for example, a random access memory (RAM), a memory buffer, a hard drive, a read-only memory (ROM), an erasable programmable read-only memory (EPROM), and/or the like. In some embodiments, the memory stores instructions to cause the processor to execute modules, processes, and/or functions associated with controlling one or more mechanical and/or electrical systems included in the robot 100, as described above. The processor of the electronics system 190 can be any suitable processing device such as general-purpose processor (GPP), a central processing unit (CPU), an accelerated processing unit (APU), a field programmable gate array (FPGA), an application specific integrated circuit (ASIC). The processor can be configured to run or execute a set of instructions or code stored in the memory associated with the operation of one or more mechanical and/or electrical systems included in the robot 100. The I/O interface can be, for example, a Universal Serial Bus (USB) interface; an Institute of Electrical and Electronics Engineers (IEEE) 1394 interface (FireWire); a Thunderbolt™ interface; a Serial ATA (SATA) interface or external Serial ATA (eSATA) interface; a network interface card (including one or more Ethernet ports and/or a wireless radios such as a wireless fidelity (WiFi®) radio, a Bluetooth® radio, or the like). The I/O interface is configured to send signals to and/or receive signals from the processor. Similarly, the I/O interface can be configured to receive data from and/or send data to any suitable electric and/or electronic device included in the robot 100.

In some embodiments, the electronics system 190 can be configured to control any suitable portion of the robot 100 using, for example, a feedback control method such as a PID control scheme and/or the like. For example, the I/O interface can receive signals associated with an operating condition or the like from one or more electric and/or electronic components such as one or more motors, pumps, actuators, and/or sensors (as described above) included in the robot 100 (not shown in FIG. 1). Upon receipt, the I/O interface can send data associated with the signals to the processor, which in turn, can execute a set of instructions associated with controlling a subsequent action of the drive system 140 and/or the cleaning assembly 165, based at least in part on the data received from the I/O interface. The processor can then send data associated with the subsequent action to the I/O interface, which in turn, can send a signal indicative of an instruction to perform the subsequent action to an associated electric and/or electronic component (e.g., a motor, actuator, pump, etc.).

By way of example, in some embodiments, the processor can execute a set of instructions, code, and/or modules associated with at least temporarily maintaining the robot 100 within a predetermined distance from an object such as a wall. More specifically, in some instances, the robot 100 can be configured to circumscribe an area that is to be cleaned by first traveling parallel and/or adjacent to a set of walls defining the area. In such instances, the processor can receive signals from one or more sensor (e.g., such as those described above) and based on data included therein, can define an operational condition of, for example, the drive system 140 that is operable in maintaining the robot 100 and/or an edge or perimeter of the cleaning assembly 165 within a predetermined distance from the wall (e.g., within 10 cm, within 5 cm, within 1 cm, and/or the like), as described in further detail herein.

In some instances, the I/O interface can receive data associated with a user input or the like and can send the data to the processor. The user input, for example, can be associated with one or more system parameters or operating conditions (e.g., a cleaning fluid formula, a flow rate at which the cleaning fluid is to be dispensed, a cleaning head and/or brush speed, a desired speed of the robot 100, a map, floor plan, floor type, etc. of a surface to be cleaned by the robot 100, an updated map and/or floor plan of the surface incorporating one or more changes in the environment, and/or the like. In this manner, the electronics system 190 can be configured to control the robot 100 in at least a semi-autonomous manner based at least in part on data associated with an operating condition of the robot 100, an environmental condition associated with the environment with which the robot 100 is operating, a user input, and/or the like.

In some instances, the I/O interface can be configured to transmit data over a wired and/or wireless network (not shown in FIG. 1) to a remote electronic device (e.g., an external device) such as a handheld controller, a computer, a laptop, a mobile device, a smartphone, a tablet, and/or the like (not shown in FIG. 1). For example, the remote electronic device can include at least a processor, a memory, and a display and can run, for example, a personal computer application, a mobile application, a web page, and/or the like. In this manner, a user can manipulate the remote electronic device such that data associated the robot 100 is graphically represented on the display of the remote electronic device, as described in further detail herein. Moreover, the I/O interface can receive from the remote electronic device data associated with any of the system parameters and/or operating conditions described above, and/or any other control data.

FIGS. 2-8 illustrate a device 200 such as, for example, a robot configured to clean a surface, according to an embodiment. The device 200 (also referred to herein as "cleaning robot" or "robot") includes at least a frame 210, a drive system 240, an electronics system 290 (FIGS. 5-7), and a cleaning assembly 265. The cleaning robot 200 can be used to clean (e.g., vacuum, scrub, disinfect, etc.) any suitable surface area such as, for example, a floor of a home, commercial building, warehouse, etc. The robot 200 can be any suitable shape, size, or configuration and can include one or more systems, mechanisms, assemblies, or subassemblies that can perform any suitable function associated with, for example, traveling along a surface, mapping a surface, cleaning a surface, and/or the like.

The frame 210 of the robot 200 can be any suitable shape, size, and/or configuration. For example, in some embodiments, the frame 210 can include a set of components or the like, which are coupled to form a support structure configured to support the drive system 240, the cleaning assembly 265, and the electronic system 290. More particularly, in this embodiment, the frame 210 includes a storage portion 211 and a support portion 220 (see e.g., FIGS. 2-6). As described above with reference to the frame 110, the frame 210 can include any suitable components such as, for example, sheets, tubes, rods, bars, etc. In some embodiments, such components can be formed from a metal or metal alloy such as aluminum, steel, and/or the like. In other embodiments, such components can be formed from a thermoplastic and/or polymer such as nylons, polyesters, polycarbonates, polyacrylates, ethylene-vinyl acetates, polyurethanes, polystyrenes, polyvinyl chloride (PVC), polyvinyl fluoride, poly(vinyl imidazole), and/or blends and copolymers thereof. As shown in FIGS. 2-5, in this embodiment, the frame 210 can include a set of mounts 219 each of which is configured to support an electronic component included in the electronics system 290 (e.g., each support a laser emitter/sensor 294 included in the electronics system 290).

Figure 2:
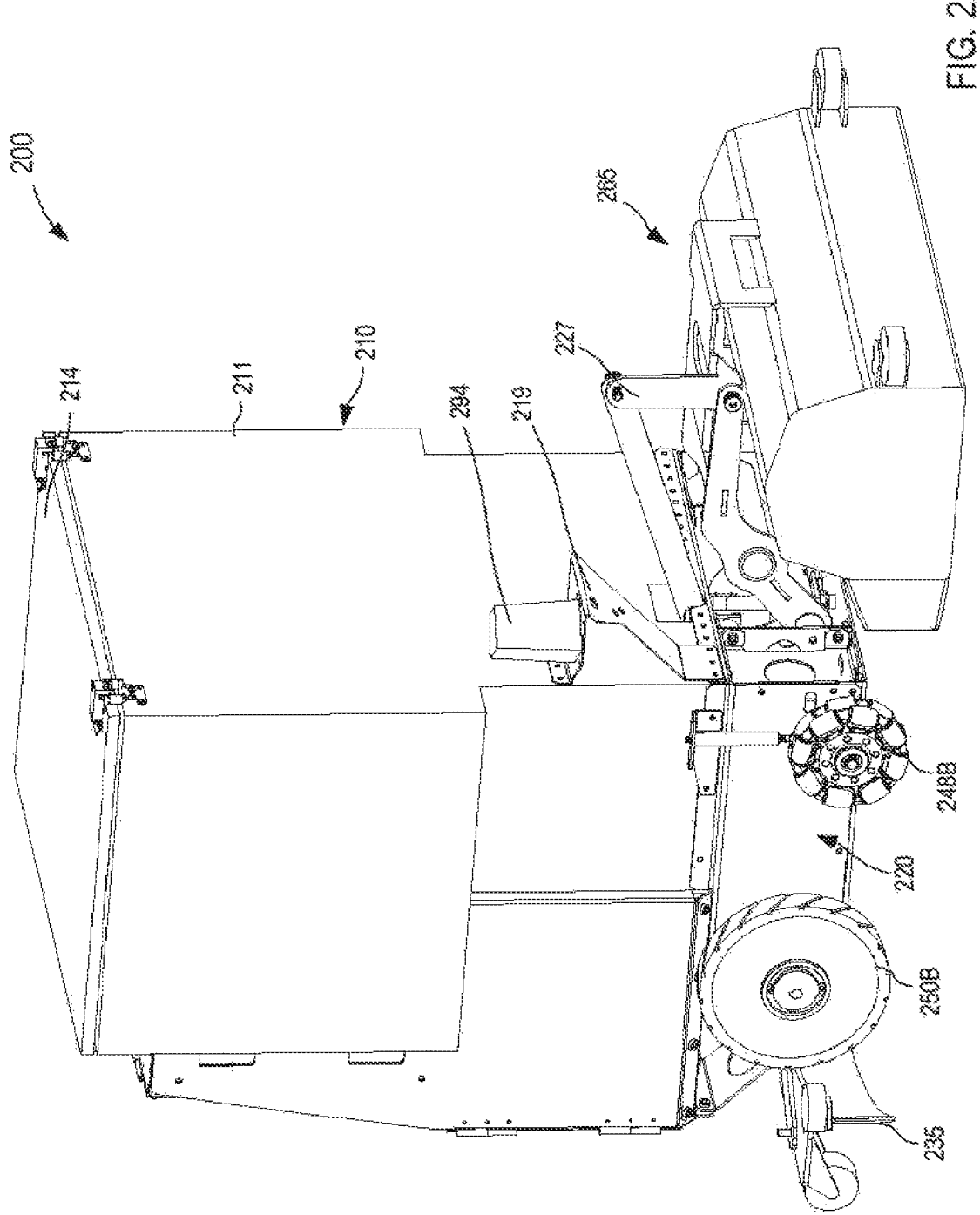
FIGS. 2-4 are a front perspective, rear perspective, and top perspective view of a semi-autonomous robot according to an embodiment.
Figure 5:
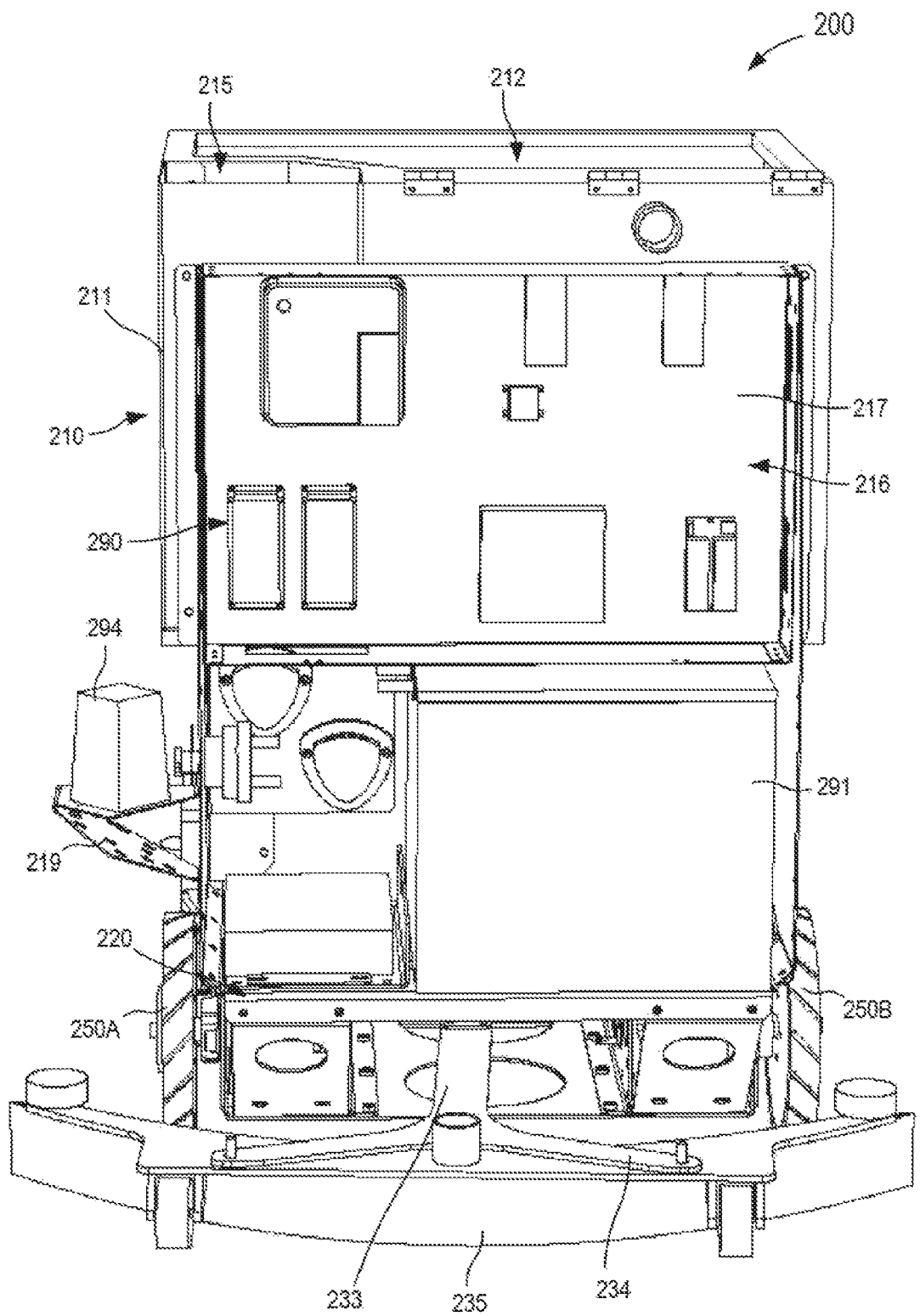
FIG. 5 is a rear view of the semi-autonomous robot of FIG. 2 with an electronics cover removed.

The storage portion 211 of the frame 210 can include a set of components configured to define a detritus cavity 212 (see e.g., FIG. 4), a vacuum source cavity 215 (see e.g., FIG. 4), and an electronics system cavity 216 (see e.g., FIG. 5). The detritus volume 212 can be any suitable shape, size, or configuration. As shown in FIG. 2, the storage portion 211 of the frame 210 defines an opening 213 configured to place the detritus volume 212 in fluid communication with the cleaning assembly 265. Thus, the cleaning assembly 265 can transfer refuse, detritus, fluid, and/or the like from the surface on which the robot 200 is moving to the detritus volume 212, as described in further detail herein.

The vacuum source cavity 215 is configured to receive, store, and/or otherwise house a vacuum source 285. The vacuum source 285 can be any suitable device and/or mechanism configured to generate a negative pressure differential, which in turn, can result in a suction force. For example, the vacuum source 285 can be a vacuum pump (e.g., a piston driven pump, a rotary vane pump, a rotary screw pump, a diaphragm pump, and/or the like) that can draw a flow of fluid (e.g., a gas such as air) therethrough. Although not shown in FIGS. 2-6, the storage portion 211 of the frame 210 can define an opening configured to place the detritus volume 212 in fluid communication with the vacuum source cavity 215. As such, when the vacuum source 285 is in an "on" operational state (e.g., receiving a flow of electric power), the vacuum source 285 can be configured to generate a negative pressure differential, which in turn, can create a suction force within the detritus cavity 212. Moreover, with the detritus cavity 212 being in fluid communication with the cleaning assembly 265 via the opening 213, the suction force within the detritus cavity 212 can draw refuse, detritus, fluid, dirt, and/or the like from the cleaning assembly 265 and into the detritus cavity 212, as described in further detail herein. While not shown in FIGS. 2-6, the robot 200 can include any suitable filter or the like disposed within the opening configured to place the detritus volume 212 in fluid communication with the vacuum source cavity 215. Thus, the filter can limit an amount of undesirable detritus from being drawn into the vacuum source 285.

As shown in FIG. 5, the electronics system cavity 216 is configured to receive the at least a portion of the electronics system 290. More specifically, the storage portion 211 of the frame 210 can include a wall 217 on which at least a portion of the electronics system 290 is mounted. In some embodiments, the wall 217 can be configured to physically and fluidically isolate the detritus cavity 212 and the vacuum source cavity 215 from the electronics system cavity 216. In this manner, the electronic components are not exposed to a volume of detritus transferred into the detritus cavity 212. In some embodiments, the electronics system cavity 216 can be sufficiently large to house at least a portion of the electronics system 290 such as, for example, a printed circuit board (PCB), processor, memory, radios, power distribution components, a battery 291, and/or the like.

Although not shown in FIGS. 2-8, in some embodiments the storage portion 211 can define any other suitable cavity, volume, reservoir, and/or the like. For example, in some embodiments, a storage portion can include a dry detritus cavity and a wet detritus cavity. In such embodiments, the dry detritus cavity can be configured to receive substantially dry debris such as refuse, dirt, dust, etc., which can be collected, for example, during a vacuuming process or the like. Similarly, the wet detritus cavity can be configured to receive a substantially wet detritus, which can result, for example, from using a cleaning fluid and one or more brushes to scrub a surface and subsequently drawing the used cleaning fluid into the wet detritus cavity.

In some embodiments, a storage portion can define a cleaning fluid cavity, which can include one or more volumes, which selectively can be placed in fluid communication to allow one or more solid, powdered, and/or fluid products to be mixed to form a cleaning fluid. By way of example, a storage portion of a frame can include a cleaning fluid cavity with a cleaning product volume and a diluent volume. In some instances, a robot and more particularly, an electronics system included therein can send a signal to one or more pumps or the like that can transfer at least a portion of a cleaning product disposed in the cleaning product volume into the diluent volume (or vice versa) to mix the cleaning product with a diluent such as water. In other embodiments, such a cleaning fluid cavity can define a mixing volume within which the cleaning product and the diluent are mixed.

Figure 3:
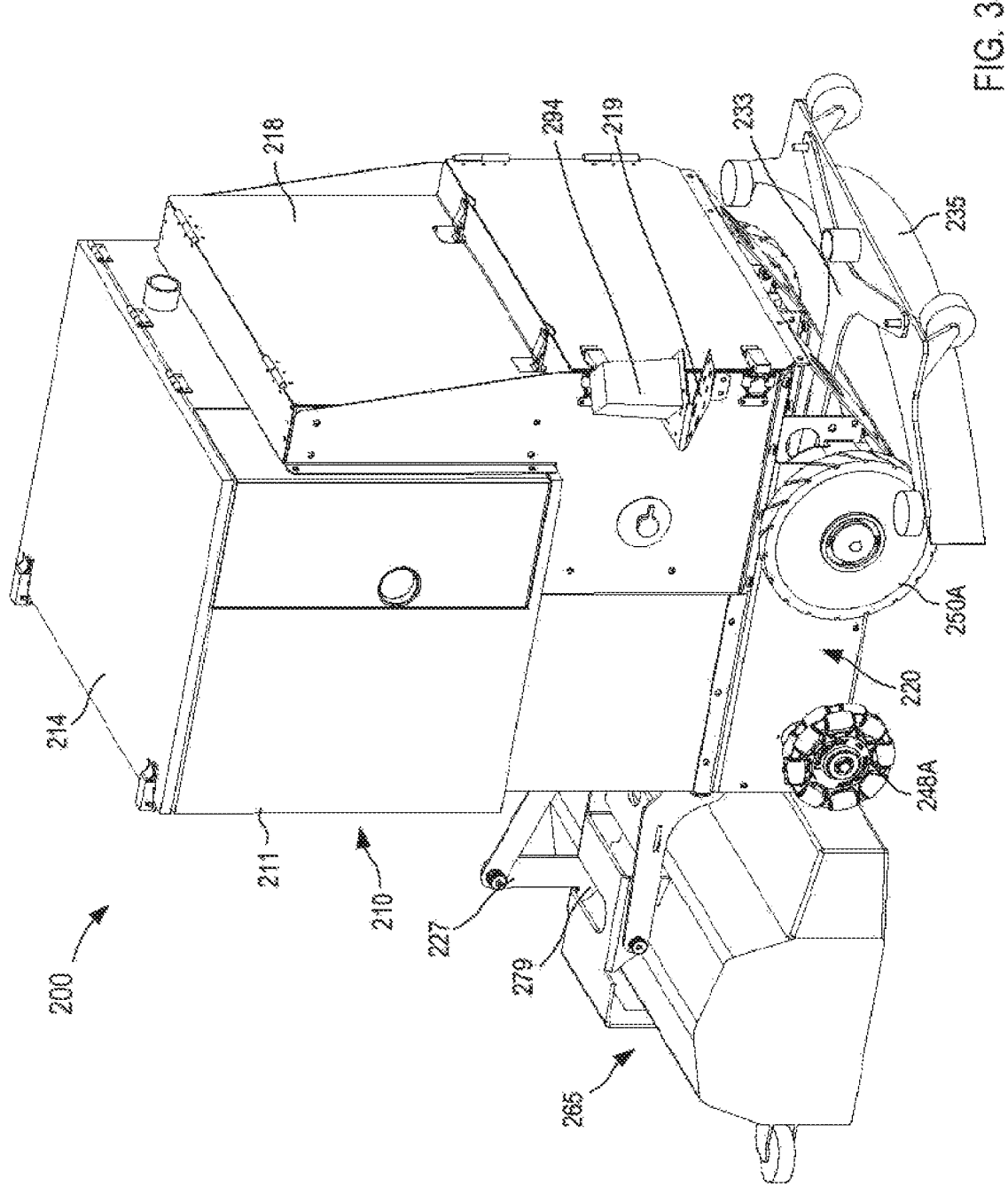
Figure 4:
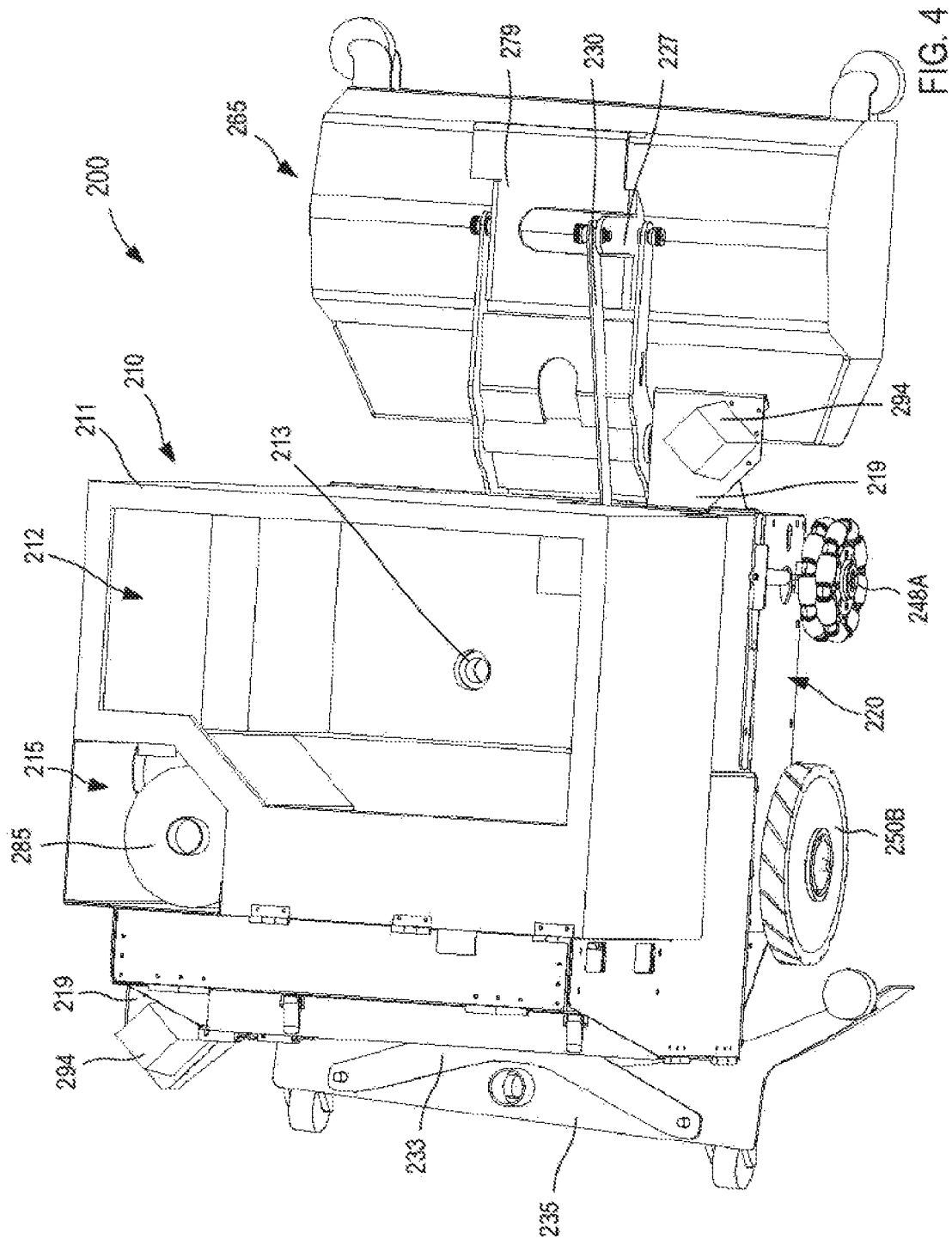

As shown in FIGS. 2 and 3, the storage portion 211 of the frame 210 includes a first lid 214 configured to selectively cover the detritus cavity and the vacuum source cavity 215, and a second lid 218 configured to selectively cover the electronics system cavity 216. Said another way, the first lid 214 can be moved from a first position, in which the first lid 214 covers the detritus cavity 212 and the vacuum source cavity 215, to a second position, in which a user can access the detritus cavity 212 and/or the vacuum source cavity 215. Similarly, the second lid 218 can be moved from a first position, in which the second lid 218 covers the electronics system cavity 216, to a second position, in which the user can access at least a portion of the electronics system 290.

Figure 6:
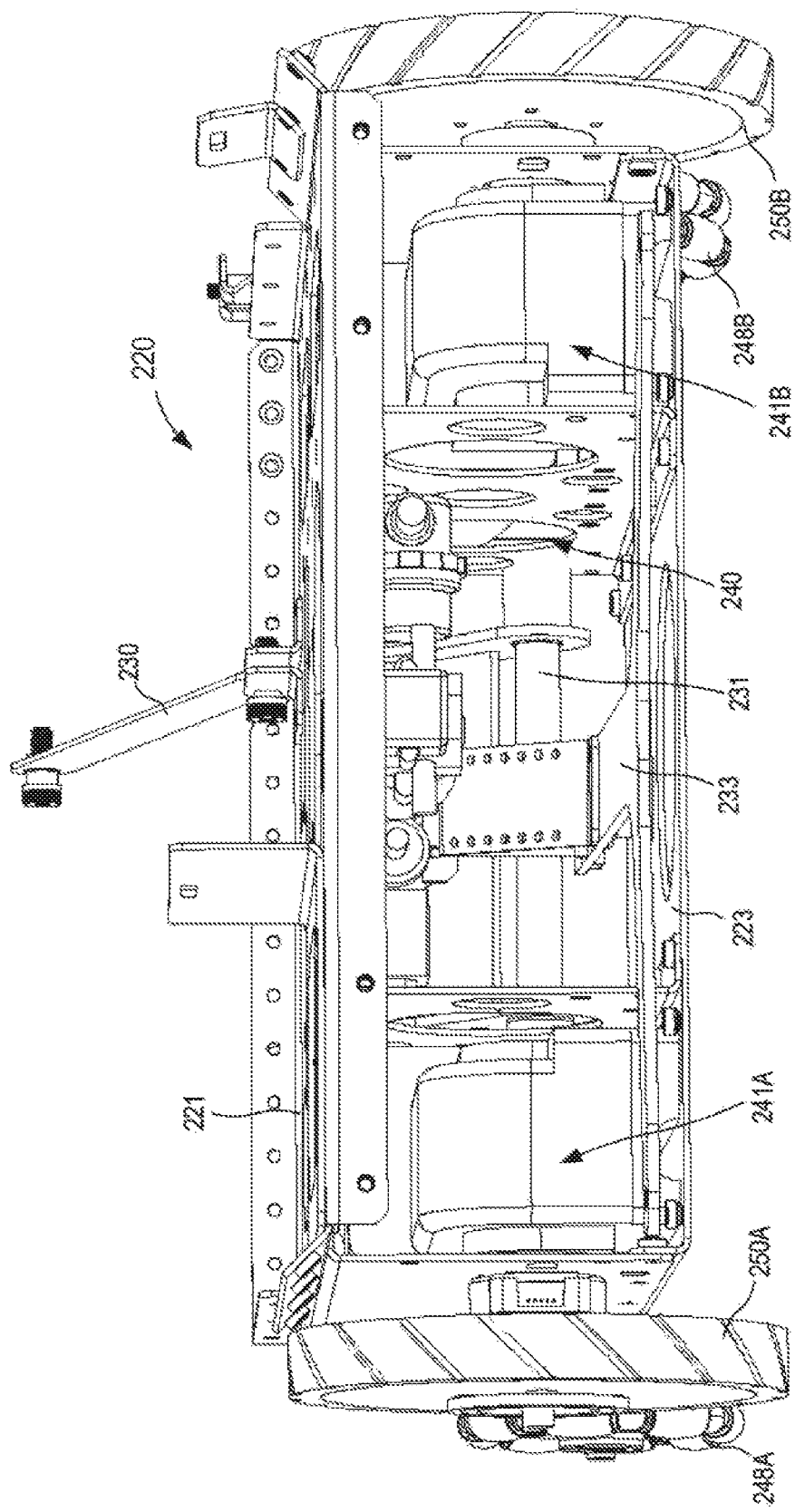
FIG. 6 is a rear perspective view of a portion of a frame and a drive system included in the semi-autonomous robot of FIG. 2.
Figure 7:
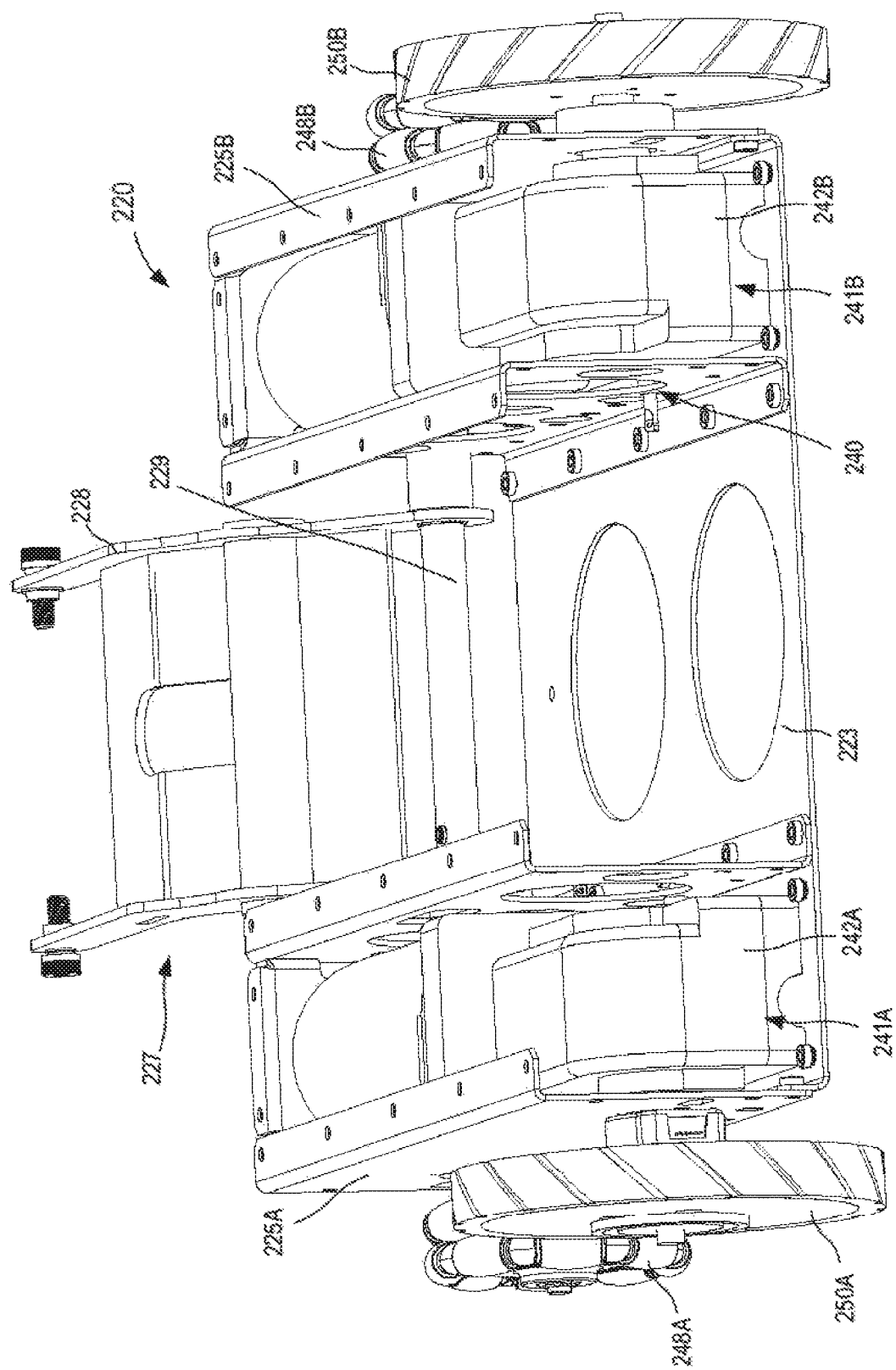
FIG. 7 is a top perspective view of a portion of the frame and the drive system included in the semi-autonomous robot of FIG. 2.

As described above, the frame 210 also includes a support portion 220 (see e.g., FIGS. 5-7). The support portion 220 can be any suitable shape, size, and/or configuration. For example, the support portion 220 can include any suitable component, part, mechanism, linkage, and/or the like configured to support, for example, the storage portion 211 of the frame 210, the drive system 240, and/or the cleaning assembly 265. In this embodiment, the support portion 220 includes a top plate 221, a bottom plate 223, a cleaning assembly mount 227, a rear skirt mount 233, and at least one drive mechanism mount, as shown in FIGS. 5 and 6. More particularly, the support portion 220 includes a first drive mechanism mount 225A and a second drive mechanism mount 225B coupled between the top plate 221 and the bottom plate 223. The first drive mechanism mount 225A is configured to couple to and/or to support a first drive mechanism 241A included in the drive system 240 and the second drive mechanism mount 225B is configured to couple to and/or to support a second drive mechanism 241B of the drive system 240, as described in further detail herein.

The top plate 221 can be coupled to the storage portion 211 of the frame 210 to couple the support portion 220 thereto. The bottom plate 223 is opposite the top plate 221 and is configured to support the drive mechanism mounts 225A and 225B. The rear skirt mount 233 is coupled to the bottom plate 222 and includes an end portion 234 coupled to a rear skirt 235 (see e.g., FIG. 5). In some embodiments, the rear skirt 235 can be configured to engage a surface along which the robot 200 travels to reduce an amount of debris not entrained in the cleaning assembly 265, as described in further detail herein. The cleaning assembly mount 227 can be any suitable mount, linkage, assembly, device, etc. configured to movably couple the cleaning assembly 265 to the support portion 220. For example, as shown in FIGS. 6 and 7, the cleaning assembly mount 227 includes a coupling linkage 228, a pivot member 229, and an actuating arm 230. The coupling linkage 228 is rotatably coupled to the pivot member 229 at a first end and is configured to couple to a mounting portion 279 of the cleaning assembly 265 at a second end (see e.g., FIGS. 4 and 7). Similarly, the actuating arm 230 is coupled to the top plate 221 at a first end and is coupled to the mounting portion 279 of the cleaning assembly 265 at a second end. Although not shown in FIGS. 2-8, the robot 200 can include an actuator or the like configured to move the actuating arm 230 relative to the support portion 220 to similarly move the cleaning assembly 265 relative to the support portion 220, as described in further detail herein. As such, the cleaning assembly 265 can be coupled to the support portion 220 of the frame 210 and can be moved relative support portion 220 to place the cleaning assembly 265 in a desired portion relative to the surface along which the robot 200 will travel. Moreover, in some instances, the cleaning assembly 265 can be moved relative to the support portion 220 to modulate an amount of pressure exerted by a cleaning member and/or cleaning head on the surface (e.g., based on floor type, type and/or amount of detritus, and/or the like).

As described above, the drive system 240 of the robot 200 is coupled to and/or is otherwise supported by the support portion 220 of the frame 210. The drive system 240 can any suitable system, mechanism, machine, assembly, etc. configured to move the robot 200 along a surface. For example, in this embodiment, the drive system 240 includes the first drive mechanism 241A and the second drive mechanism 241B (see e.g., FIGS. 6 and 7). As described above, the first drive mechanism 241A is coupled to the first drive mechanism mount 225A of the support portion 220 of the frame 210 and the second drive mechanism 241B is coupled to the second drive mechanism mount 225B of the support portion 220.

The first drive mechanism 241A includes a motor 242A, a first wheel 248A, and a second wheel 250A. Similarly, the second drive mechanism 241B includes a motor 242B, a first wheel 248B, and a second wheel 250B. In some embodiments, the first drive mechanism 241A and the second drive mechanism 241B can be substantially similar in form and function. Thus, the following discussion of the first drive mechanism 241A applies to the second drive mechanism 241B and as such, the second drive mechanism 241B is not described in further detail herein.

As shown in FIG. 7, the second wheel 250A is coupled to an output (not shown) of the motor 242A. The second wheel 250 can be any suitable size or configuration. In some embodiments, the second wheel 250A can be directly coupled to the output of the motor 242A. In other embodiments, the second wheel 250A can be indirectly coupled to the output of the motor 242, for example, via a belt drive, chain drive, gear drive, and/or any other suitable intervening structure. In some embodiments, the motor 242A and/or the second wheel 250A can include an encoder, tachometer, accelerometer, and/or any other suitable sensor or the like configured to determine, for example, a rotational position, velocity, and/or acceleration of the second wheel 250A and/or the output of the motor 242A. As described in further detail herein, such an encoder and/or sensor can be in communication with the electronics system 290 and can send signals to and/or receive signals from the electronics system 290 associated with the operation of the first drive mechanism 241A. As described above, the second drive mechanism 241B can be arranged in a substantially similar manner as the first drive mechanism 241A and thus, can send signals to and/or receive signals from the electronics system 290 associated with the operation of the second drive mechanism 241B.

Figure 8:
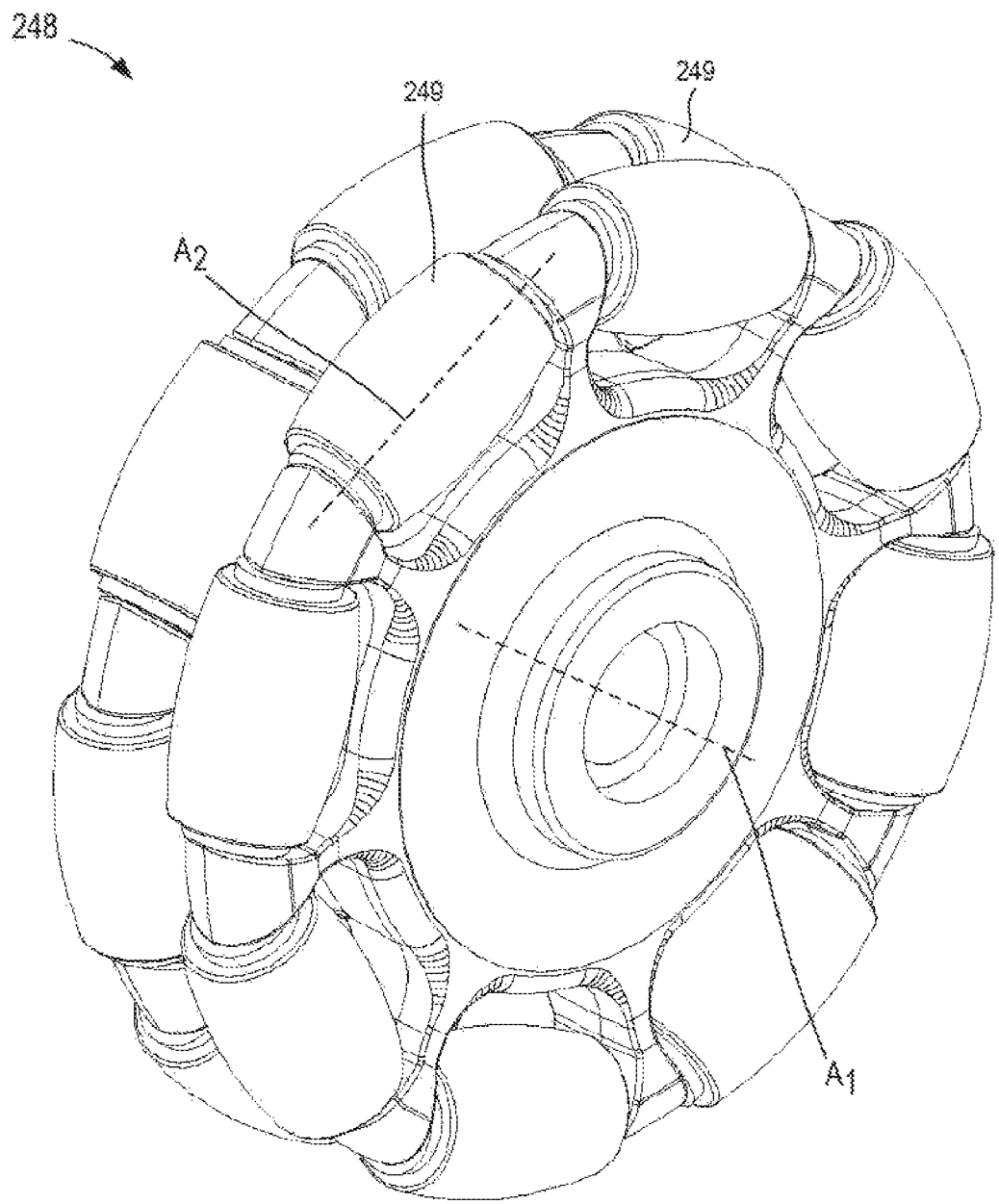
FIG. 8 is a perspective view of a wheel included in the drive system of FIG. 6.

The first wheel 248A included in the first drive mechanism 241A can be any suitable size and/or configuration. The first wheel 248A is rotatably coupled to the support portion 220 of the frame 210 and is configured to rotate about an axis $A_1$, as shown in FIG. 8. In this embodiment, the first wheel 248A can be, for example, an omni-wheel, a mecanum wheel, and/or the like that defines a circumference and that includes a set of rollers 249 rotatably disposed along the circumference. More specifically, in this embodiment, the first wheel 248 includes two adjacent sets of rollers disposed along the circumference of the wheel such that the rollers 249 included in one set of rollers are offset along the circumference from the rollers 249 included in the other set of rollers. The rollers 249 can be relatively small rollers, which are each configured to rotate about an axis associated with that roller 249 (e.g., the roller 249 is configured to rotate about its associated axis $A_2$ as shown in FIG. 8). The axis of each roller 249 (e.g., as shown with the axis $A_2$) can be, for example, perpendicular to the axis $A_1$ about which the wheel 248 rotates. In this manner, as the wheel 248 is rotated about its axis $A_1$, each roller 249 disposed along the circumference of the wheel 248 can be configured to rotate about its associated axis (e.g., $A_2$), which in turn, can advance the robot 200 in any suitable direction. While shown and described as being perpendicular, in other embodiments, an axis of rotation for each roller 449 can be disposed at any suitable angle relative to the axis $A_1$. For example, in some embodiments, the axis of rotation for each roller 449 can be disposed at about a 45 degree angle relative to the axis $A_1$.

As described above, the first drive mechanism 241A and the second drive mechanism 241B can receive signals from and/or can send signals to the electronics system 290 associated with operation of the drive system 240. In some instances, the electronics system 290 can send substantially equivalent signals and/or a substantially equal amount of electric power to the motor 242A of the first drive mechanism 241A and the motor 242B of the second drive mechanism 241B and, in response, the motors 242A and 242B can rotate the second wheels 250A and 250B, respectively, with substantially the same velocity (e.g., rotational speed and direction). As such, the drive system 240 can move the robot 200 along a surface (e.g., a floor to be cleaned) in a substantially straight direction (e.g., in a direction tangential to the rotational motion relative to a plane associated with the surface). That is to say, when the first drive mechanism 241A and the second drive mechanism 241B receive substantially the same input from the electronics system 290, the motor 242A of the first drive mechanism 241A and the motor 242B of the second drive mechanism 241B rotate the second wheels 250A and 250B, respectively, with the substantially the same velocity, which in turn, moves the robot 200 forward.

In some instances, the first drive mechanism 241A can receive an input from the electronics system 290 different from an input received by the second drive mechanism 241B, which in some instances, can operable in changing a translational velocity and/or direction of the robot 200 relative to the surface. In some instances, the first drive mechanism 241A can receive an input from the electronics system 290 such that the motor 242A of the first drive mechanism 241A rotates the second wheel 250A in a first rotational direction, while the second drive mechanism 241B receives an input from the electronics system 290 such that the motor 242B of the second drive mechanism 241B rotates the second wheel 250B in a second rotational direction, opposite the first rotational direction. In such instances, the opposite rotational direction between the second wheels 250A and 250B can result in a reduced turning radius when compared to, for example, the second wheel 250A being held in a fixed position while the second wheel 250B was rotated (or vice versa). In some instances, such an arrangement can be, for example, a "zero-degree turn" arrangement or the like. As such, the arrangement of the robot 200 can be such that the cleaning assembly 265 can be placed into corners and/or other tight spaces (e.g., within five centimeters of a wall or corner), which might otherwise result in the robot 200 becoming stuck and/or the like, as described in further detail herein.

Referring back to FIGS. 2-4, the cleaning assembly 265 included in the robot 200 can be any suitable shape, size, and/or configuration. As described above, the cleaning assembly 265 is coupled to and/or is otherwise supported by the support portion 220 of the frame 210. More particularly, in some embodiments, the cleaning assembly 265 includes the mounting portion 279, which is coupled to the cleaning assembly mount 227 of the support portion 220 of the frame 210. As described above, in some embodiments, the arrangement of the cleaning assembly mount 227 included in the support portion 220 of the frame 210 and the mounting portion 279 of the cleaning assembly 265 can be such that the cleaning assembly 265 can be moved relative to the frame 210 (e.g., via an actuator and/or the actuating arm 230 of the support portion 220). For example, in some embodiments, the cleaning assembly 265 can be moved closer to or away from the frame 210, which in turn, can move the cleaning assembly 265 away from or closer to, respectively, a surface along which the robot 200 moves.

Although not specifically shown in FIGS. 2-8, the cleaning assembly 265 can include any suitable cleaning mechanism, brush, scrubber, and/or the like configured to engage the surface on which the robot 200 travels. For example, in some embodiments, the cleaning assembly 265 can include a housing or the like that can define a vacuum chamber, and can include one or more cylindrical brushes rotatably coupled to the housing and at least partially disposed in the vacuum chamber. The one or more brushes can be operably coupled to a motor configured to rotate the one or more brushes relative to the housing. The cleaning assembly 265 can also include a pump or the like configured to generate a negative pressure within the vacuum chamber. In some embodiments, the pump can be coupled to the housing and in fluid communication with the vacuum chamber. In such embodiments, the pump can be configured to transfer a flow of a cleaning fluid or the like from a storage volume (e.g., a cleaning fluid cavity, as described above) to the cleaning assembly 265 and, in turn, the cleaning assembly 265 can dispense, disperse, spray, etc. the cleaning fluid onto the surface being cleaned by the cleaning assembly 265. In other embodiments, the pump can be, for example, the vacuum source 285 disposed in the vacuum cavity 215 of the frame 210 and in fluid communication with the cleaning assembly 265 via the opening 213, as described above. In still other embodiments, the robot 200 can include a pump configured to transfer a cleaning fluid to the cleaning assembly 265 and the vacuum source 285 configured to transfer detritus from the cleaning assembly 265 and into the detritus cavity 212. In some embodiments, the cleaning assembly 265 can be substantially similar to or the same as any of the cleaning assemblies described herein.

At least a portion of the cleaning assembly 265 is in communication with the electronics system 290 and is configured to send signals to and/or receive signals from the electronics system 290 associated with the operation of the cleaning assembly 265. For example, in some instances, the electronics system 290 can send a signal to the cleaning assembly 265 and/or an actuator that can be operable in moving the cleaning assembly 265 relative to the frame 210. In some instances, the electronics system 290 can send a signal operable in transitioning a pump (e.g., the vacuum source 285 and/or the like) between an "off" operational state and an "on" operational state and/or to change a flow rate through the pump. Moreover, in some instances, the electronics system 290 can be configured to control a flow rate through the pump and/or the vacuum source 285 based at least in part on data received from one or more sensors (e.g., based on a velocity of the robot). In other instances, the electronics system 290 can send a signal operable in transitioning a motor of the cleaning assembly 265 between an "off" operational state and an "on" operational state, which in turn, can be operable in stopping a rotation of a set of brushes or starting a rotation of the set of brushes, respectively. Thus, the cleaning assembly 265 can be configured to engage the surface on which the robot 200 travels to clean the surface, as described in further detail herein.

As described above, the electronics system 290 included in the robot 200 can control at least a portion of the drive system 240 and/or the cleaning assembly 265. As described above, the electronic system 290 can include at least a memory, a processor, and an input/output (I/O) interface. Moreover, the electronics system 290 can include any suitable radio, power distribution component, the battery 291, and/or the like. In some embodiments, the battery 291 can be a high energy density battery such as a $LiFePO_4$ battery. In some embodiments, the battery 291 a 51.2 Volt (V), 60 Ampere/hour (A/h) LF-G48V-60 battery made by BatterySpace, based in California, USA. The memory, the processor, and/or the I/O interface can be substantially similar to the respective component included in the electronics system 190 described above with reference to FIG. 1. Thus, the memory, the processor, and/or the I/O interface are not described in further detail herein.

The electronics system 290 can be configured to control any suitable portion of the robot 200 using, for example, a feedback control method such as a PID control scheme and/or the like. For example, the electronics system 290 can include and/or can be in communication with one or more electric and/or electronic components such as any number of cameras, transceivers (e.g., radio beacons, light transceivers, and/or the like), encoders, odometers, tachometers, accelerometers, inertial measurement units (IMUs), proximity sensors, relay logics, switches, and/or the like (collectively referred to herein as "sensors"). In some embodiments, the electronics system 290 can include and/or can be in communication with any of the sensors described above. As such, the sensors can sense, detect, and/or otherwise determine one or more operating conditions associated with the robot 200 and/or one or more environmental conditions associated with the environment within which the robot 200 is disposed, as described in detail above.

Expanding further, in this embodiment, the electronics system 290 includes and/or is in communication with two laser transceivers 294 coupled to the frame 210 via the mounts 219. Although not shown in FIGS. 2-8, the electronics system 290 can also include and/or can be in communication with one or more encoders, odometers, accelerometers, and/or IMUs included in the drive system 240. The laser transceivers 294, for example, can be a light-radar (LIDAR) and can be configured to emit a laser beam (e.g., visible light, infrared light, and/or the like) and configured to sense and/or otherwise determine an amount and/or delay of reflection, refraction, dissipation, and/or the like associated with the emitted laser beam. As such, the laser transceiver 294 can be configured to sense a relative position of objects within an environment and/or the like. While not shown in FIGS. 2-8, the robot 200 can include any other suitable device configured to determine one or more conditions associated with the operation of the robot 200 such as, for example, one or more cameras, video recorders, sound wave and/or radio wave transceivers, proximity sensors, contact and/or pressure sensors, and/or the like. Moreover, such devices and/or sensors can be configured to send signals to and/or receive signals from the I/O interface of the electronics system 290.

In some instances, the I/O interface can send data associated with one or more signals received from the laser transceivers 294 (or any other suitable sensor) to the processor. In turn, the processor can execute a set of instructions, code, modules, etc. associated with controlling one or more subsequent action of the drive system 240 and/or the cleaning assembly 265, based at least in part on the data received from the I/O interface. The processor can then send data associated with the one or more subsequent action to the I/O interface, which in turn, can send a signal indicative of an instruction to perform the one or more subsequent action to an associated electric and/or electronic component (e.g., an actuator such as the actuator coupled between the frame 210 and the cleaning assembly 265 (not shown in FIGS. 2-8), a pump such as the vacuum source 285, a motor such as the motors 242A and 242B of the drive system 240).

For example, in some embodiments, the laser transceiver 294 can sense proximity between a portion of the robot 200 and an object, and can send signals associated therewith to the I/O interface. Based at least in part on a predetermined criteria and/or threshold associated with the proximity data (e.g., stored in the memory or the like), the processor can perform and/or execute one or more processes and/or modules operable in determining a subsequent action of at least a portion of the robot 200. For example, in some instances, the processor can perform and/or execute one or more processes operable in at least temporarily stopping the robot 200 (e.g., withholding electric power from the drive system 240 and/or other suitable means of preventing movement of the robot 200 along the surface). As a result, the robot 200 can be configured to at least pause and/or otherwise stop when, for example, the processor determines the proximity between the robot 200 and an object satisfies the criteria (e.g., is within a predetermined proximity). In some instances, the robot 200 can be paused and/or stopped for a sufficient time to determine if the object is moving relative to the stationary robot 200. In some instances, if the object is stationary, the robot 200 and/or one or more sensors can collect data associated with the object and/or the surface and can, for example, redefine or re-map a cleaning path and/or the like.

While the I/O interface is described above as receiving one or more signals and/or inputs from the laser transceivers 294 and/or any other suitable sensor(s), etc., in some instances, the I/O interface can receive data associated with a user input or the like and can send the data to the processor, which in response, can define one or more subsequent action of at least a portion of the robot 200. In some instances, the user input can be associated with one or more system parameters or operating conditions (e.g., a cleaning fluid formula; a flow rate at which the cleaning fluid is to be dispensed; a cleaning head and/or brush speed; a desired speed of the robot 200; a map, floor plan, floor type, etc. of a surface to be cleaned by the robot 200; an updated map and/or floor plan of the surface incorporating one or more changes in the environment; and/or the like). For example, in some instances, the user can enter, select, and/or otherwise input data presented on a user interface (e.g., a display such as a touchscreen display or the like). In other instances, the I/O interface can receive a signal associated with a user input at a remote control device such as a mobile device, smartphone, tablet, laptop, PC, and/or the like. For example, the electronics system 290 and/or the I/O interface can include a network interface card or the like that can have a wireless radio such as a wireless fidelity (WiFi®) radio, a Bluetooth radio, and/or any other suitable wireless radio that can be in communication with the remote control device via one or more networks. Thus, the electronics system 290 can be configured to control at least a portion of the robot 200 in response to signals received from the laser transceivers 294 and/or any other suitable sensor, as well as any suitable user input via a user interface and/or via a remote electronic device.

In some instances, the I/O interface can be configured to receive signals (e.g., from the laser transceivers 294 and/or from a user input at a user interface) associated with an original mapping of the surface to be cleaned and/or an initializing of the robot 200 relative to the surface. For example, in some instances, prior to a first cleaning of a surface, a user can manually guide the robot 200 along the surface to define a map of the surface. In such instances, the drive system 240 can be configured to provide power to the motors 242A and 242B to rotate the second wheels 250A and 250B to assist the user in directing the robot 200. In other instances, the drive system 240 need not provide power to the motors 242A and 242 to rotate the second wheels 250A and 250B. As the user directs (e.g., pushes and/or steers) the robot 200 along the surface, the robot 200 can be configured to sense, determine, calculate, define, and/or otherwise receive information associated with the area to be cleaned. For example, as the user is directing (e.g., pushing and/or steering) the robot 200 along the surface, the laser transceivers 294 can emit a laser beam and can receive at least a portion of the reflected laser beam to sense a proximity of objects along and/or near the path of the robot 200. Similarly, an encoder, odometer, accelerometer, and/or other sensor included in and/or associated with the drive system 240 can be configured to sense, determine, calculate, define, and/or otherwise receive information associated with an output of the motors 242A and/or 242B, a rotation of the second wheels 250A and/or 250B, and/or the like. In some embodiments, any other suitable sensor such as a GPS sensor, a proximity sensor, sound and/or radio wave sensor, camera, etc. can also sense and/or determine information associated with the robot 200 as the user directs the robot 200 along the surface to be cleaned.

As such, the I/O interface can receive data from the laser transceivers 294 and/or other sensors and can send data associated therewith to the processor. In response, the processor can define a map, floor plan, layout, etc. associated with the surface to be cleaned. In some instances, based on the mapping and/or initializing of the robot 200, the electronic system 290 (e.g., the processor included therein) can define and/or determine a desired plan for cleaning the surface. For example, in some instance, the processor can execute a set of instructions or code associated with decomposing the map, layout, and/or graph of the surface into sectors, paths, subpaths, etc. along which the robot 200 can travel based on efficiency, resource usage, desired areas of attention (e.g., areas along the surface that are dirtier than others), and/or the like. Once the cleaning plan is defined, the robot 200 can begin cleaning the surface according to the cleaning plan. In this manner, the electronics system 290 can be configured to control the robot 200 in at least a semi-autonomous manner based at least in part on data associated with an operating condition of the robot 200, an environmental condition associated with the environment with which the robot 200 is operating, a user input, and/or the like.

In some instances, the processor can execute a set of instructions, code, and/or modules associated with at least temporarily maintaining the robot 200 within a predetermined distance from an object such as a wall. More specifically, in some instances, the robot 200 can be configured to circumscribe an area that is to be cleaned by first traveling substantially parallel and/or adjacent to a set of walls defining the area. In such instances, the processor can receive signals from one or more sensor (e.g., such as those described above) and based on data included therein, can define an operational condition of at least the drive system 240. For example, in some instances, the laser transceivers 294 can emit a laser beam and based on a quantity and/or quality of the laser beam reflected and/or refracted back to the laser transceiver 294, which can then sense, define, assign, and/or otherwise determine a value or the like representing a proximity of at least a portion of the robot 200 to the set of walls. As such, the laser transceiver 294 can send a signal associated with the value to the processor (e.g., via the I/O interface). Upon receipt, the processor can execute a set of instructions, code, and/or modules (e.g., stored in memory) to define, for example, a current and/or immediately past position of at least a portion of the robot 200 relative to the set of walls.

In a similar manner, the processor, via the I/O interface, can receive a set of signals associated with an operating condition of, for example, the drive system 240 from any suitable sensor, encoder, odometer, accelerometer, and/or the like. For example, the set of signals can be associated with an output of the motors 242A or 242B and/or a rotational characteristic of the second wheels 250A and 250B. In some embodiments, the set of signals can include data associated with an amount of electric power used by the motors 242A and 242B, a rotational speed, rotational position, rotational acceleration, etc. of the output of the motors 242A and 242B and/or the second wheels 250A and 250B, and/or the like. Similarly, the processor can receive data associated with and/or from any other suitable portion of the robot 200 within a very short amount of time (e.g., substantially concurrently, or within a few processor clock cycles, and/or the like). Thus, the processor can execute a set of instructions, code, and/or modules to determine a current (or immediately past) operational state of the robot 200, which can include, for example, a velocity and/or acceleration of the robot 200, a position of the robot 200 relative to a calculated and/or desired position, an operational state of the drive system 240 and/or the cleaning assembly 265, and/or the like. Moreover, the processor can evaluate the operational state of the robot 200 relative to a predetermined and/or desired operational state of the robot 200 according to, for example, a predetermined and/or calculated cleaning plan and based on data associated with the evaluation, can define a new operational state (e.g., an operational state immediately following the current operational state) for any suitable portion of the robot 200.

By way of example, in some instances, the processor can receive signals from any suitable sensor, odometer, accelerometer, encoder, etc. and can use data included in the signals to determine, for example, a velocity of the robot 200. In some embodiments, the processor can be configured to execute a set of instructions, code, and/or modules based at least in part on determining the velocity of the robot 200. For example, in some embodiments, the processor can be configured to control the drive system 240 based on determining the velocity of the robot 200 to maintain the velocity of the robot 200 within a predetermined range according to, for example, a phase of a cleaning operation. For example, in some embodiments, the robot 200 can be configured to move with a first velocity during, for example, an initializing and/or mapping a second velocity during, for example, a wall following phase, and a third velocity during, for example, a turning phase. In some instances, the first velocity, the second velocity, and the third velocity can each be different. Therefore, if the processor determines, based on data received from one or more sensors and/or based on a predetermined cleaning plan, that the robot 200 is beginning, for example, a wall following phase of the cleaning plan, the processor can determine a current velocity of the robot 200 and can define an updated operational condition of the drive system 240 such that the drive system 240 moves the robot 200 substantially with the second velocity.

In some embodiments, the processor can be configured to control an operational condition of at least a portion of the cleaning assembly 265 based at least in part of the velocity of the robot 200. Specifically, in some embodiments, the processor can be configured to send a signal, for example, to the motor (not shown) to increase or decrease a rotational speed of the brushes when a velocity of the robot 200 decreases or increases, respectively. Similarly, the processor can be configured to send a signal to a pump or the like configured to transfer a flow of a cleaning fluid to the cleaning assembly 265. Specifically, in some instances, the processor can send a signal to the pump to increase or decrease a flow rate therethrough when the velocity of the robot 200 decreases or increases, respectively. In a similar manner, the processor can send a signal to the vacuum source 285 to control a flow rate therethrough based on a velocity of the robot 200. In some instances, by basing, for example, a speed of rotation of the brushes, a flow rate of a cleaning fluid, and/or a flow rate through the vacuum source, an amount of electric power to operate the robot 200 can be reduced, which in turn can increase an amount of time the battery 210 can provide electric power.

In some instances, the processor can evaluate a distance between the robot 200 and, for example, the wall relative to the predetermined distance from the wall (described above). In instances in which the processor determines at least a portion of the robot 200 is beyond the predetermined distance from the wall (e.g., more than 10 cm, more than 5 cm, more than 1 cm, and/or the like), the processor can define a subsequent action to be performed by the drive system 240 to direct the robot 200 toward the wall. More specifically, the electronics system 290 can send a signal to the motor 242A of the first drive mechanism 241A and a signal to the motor 242B of the second drive mechanism 241B, which can result in, for example, the motor 242A of the first drive mechanism 241A rotating the second wheel 250A at a first rotational speed. Similarly, the signal sent to the motor 242B of the second drive mechanism 241B can result in the motor 242B rotating the second wheel 250B at a second rotational speed different that the first rotational speed. Thus, if the wall is adjacent to a right side of the robot 200, the first rotational speed can be greater than the second rotational speed, which in turn, steers the robot 240 toward the wall. In this manner, the electronic system 290 can perform a similar process any number of times to actively control the operational state of the robot 200. Similarly, the processor can be configured to execute a set of instructions or code associated with determining a current operating condition of any suitable portion of the robot 200 and, in response, can execute a set of instructions or code to define an updated operating condition of that portion of the robot 200 or of a different portion of the robot 200 based at least in part on a predetermined cleaning plan or the like.

In some instances, once the robot 200 has cleaned and/or traveled along a perimeter of the surface being cleaned, the electronic device 290 can be configured to update the condition associated with maintaining the robot 200 within a predetermined distance from the wall. For example, in some instances, the electronic device 290 (e.g., the processor) can update the predetermined distance based on, for example, a width of the robot 200 and/or the cleaning assembly 265. That is to say, the processor can update the predetermined distance from the wall such that the robot 200 travels at a distance from the wall that is equal to about the width of the cleaning assembly 265. Said yet another way, the processor can update the predetermined distance from the wall such that the robot 200 travels in concentric paths. In some instances, such concentric paths can partially overlap to ensure an area of the surface is not missed. In other instances, once the robot 200 has cleaned and/or traveled along the perimeter of the surface, the processor can execute a set of instructions and/or code associated with a different phase of the cleaning plan, for example, not based on proximity of the robot 200 to the wall. In other words, after completing the processes and/or the like associated with a first phase (e.g., a wall following phase) of a cleaning plan, the processor can execute a set of processes associated with a second phase of the cleaning plan that can be independent of the wall following phase.

While the electronic system 290 is described above as performing one or more processes, for example, to maintain the robot 200 within a predetermined distance from a wall, in other embodiments, the electronic system 290 can be configured to preform one or more processes, for example, when the robot 200 encounters and/or comes into contact with an object. For example, in some instances, an object can be in or on a path along which the robot 200 is traveling and the drive system 240 can be configured to move the robot 200 along the path, for example, until the cleaning assembly 265 and/or any other suitable portion of the robot 200 is placed in contact with and/or brought within a predetermined distance of the object. As such, the laser transceivers 294 and/or any other suitable sensor (as described above) can sense the contact with and/or the proximity to the object and can send a signal associated therewith to the processor.

In response, the processor can perform and/or execute a set of instructions associated with, for example, stopping a rotational output of the motors 242A and/or 242B of the drive system 240. As such, the robot 200 can be configured to stop when a portion of the robot 200 contacts the object and/or comes within a predetermined proximity of the object. In some instances, the robot 200 can be configured to pause for a predetermined time and at the end of the predetermined time, the processor can receive a signal from the laser transceiver 294 and/or other suitable sensor associated with a proximity of the object at the end of the predetermined time. If, for example, the object has moved from the path and is no longer an obstacle, the processor can be configured to execute a set of instructions that resume the operation of the robot 200 according to the defined cleaning path. If, however, the object has not moved, the processor can determine the object is stationary and in response, the processor can execute a set of instructions or code associated with navigating around the object. For example, the processor can execute a set of instructions, code, and/or modules associated with updating or remapping the surface to define an updated cleaning path and/or plan. The processor can then execute a set of instructions, code, and/or modules to begin an updated cleaning operation based on the updated cleaning path and/or plan. For example, the processor can send a signal to the motors 242A and/or 242B that can cause the motors 242A and/or 242B to rotate the second wheels 250A and/or 250B, respectively, in a direction such that the cleaning assembly 265 and/or any other portion of the robot 200 is moved away from the object. Once beyond a predetermined distance from the object, the processor can execute a set of instructions, code, and/or modules that can cause the motors 242A and/or 242B to move the robot 200 according to the updated cleaning path and/or plan. Thus, the robot 200 can be configured to adjust and/or alter the path along which the robot 200 is traveling in response to contacting and/or coming within a predetermined distance of an object.

Although not shown in FIGS. 2-8, in some embodiments, the robot 200 can include one or more cameras such as those described herein can be configured to capture an image and/or a video of the object and can send data associated with the image and/or video to the processor. Upon receipt, the processor can execute a set of instructions, code, and/or modules associated with analyzing the image and/or the video to determine and/or recognize the object. For example, the processor can be configured to determine if the object is stationary, movable, delicate, and/or the like, and based on the determination, can define one or more subsequent actions for a portion of the robot 200. For example, in some instances, the processor can determine the object is a ball or the like that is movable and that is too large to become entrained in the cleaning assembly 265. Based on this determination, the processor can send a signal to the motors 242A and/or 242B to continue moving the robot 200 along the cleaning path. Conversely, if the processor determines the object is not movable such as a newly installed structure or the like not included in the original mapping of the surface, the processor can send a signal to the motors 242A and 242B to navigate around the object and once beyond a predetermined distance, to return to the cleaning path (as described above). Thus, the robot 200 can be adaptive and can be configured to update the cleaning plan based on a change of the surface to be cleaned and/or the environment in which the robot 200 is disposed. In some embodiments, the updated cleaning plan can be based on a remapping of the surface and a defining of an updated path along which the robot 200 will travel. The updated path can be, for example, a path most likely to avoid the object and/or any other new or unmapped object or change.

After executing a cleaning plan or the like, the electronics system 290 can be configured to evaluate the area of the surface that was cleaned with a desired area of the surface to be cleaned (e.g., defined by the cleaning plan and/or the updated cleaning plan). If the electronics system 290 determines a portion of the surface was not cleaned, the robot 200 can be configured to move to and clean that portion of the surface. Similarly, the electronics system 290 (e.g., the processor) can be configured to evaluate and/or record water and/or cleaning fluid not collected during the cleaning operation (e.g., not vacuumed). If water and/or cleaning is found on the surface, the robot 200 can be configured to move to and clean (e.g., vacuum, suction, squeegee, etc.) the water and/or cleaning fluid. While described above as being performed after executing the cleaning plan, in other embodiments, the electronics system 290 can control the robot 200 to clean missed surfaces and/or remove excess water from the surface during the cleaning operation. In such instances, the electronics system 290 can be configured to redefine the cleaning path and/or otherwise remap the surface in response to deviating from the cleaning plan.

As described above, in some instances, the I/O interface can be configured to transmit data over a wired and/or wireless network to a remote electronic device (e.g., an electronic device external to the robot 200) such as a handheld controller, a mobile device, a smartphone, a tablet, a laptop, a PC, and/or the like (not shown in FIGS. 2-8). For example, the remote electronic device can include at least a processor, a memory, and a display and can run, for example, a personal computer application, a mobile application, a web page, and/or the like. In this manner, a user can manipulate the remote electronic device such that data associated with the robot 200 is graphically represented on the display of the remote electronic device. More specifically, in some instances, the user can manipulate the remote electronic device to open, for example, a personal computer application or a mobile application associated with the robot 200. In some instances, the application can be configured to send signals to and/or receive signals from the electronics system 290 via a wireless network and the Internet. In some embodiments, the application can be a web browser or the like.

In some instances, the data can be associated with a status of the robot 200 and/or a report on the cleaning plan such as an amount of life in the battery 291, a fill volume of a cleaning fluid, a fill volume of the fluid recovery volume, a fill volume of, for example, the detritus volume 212, a velocity of the robot 200, a percentage of completion of the cleaning plan, a relative position of the robot 200, and/or the like. In some instances, the remote electronic device can be configured to present the data, for example, in a graph, a chart, a report, an interactive image, a video, a live stream, and/or any other suitable manner. In some instances, the electronics system 290 can send a signal to the remote electronic device associated with an error or the like, which can be presented on the display of the remote electronic device in the form of an alert or the like. As such, a user can monitor the progress of the robot 200 remotely via the remote electronic device substantially in real time and based on the monitoring, the user can, for example, manipulate the remote electronic device to remotely control the robot 200.

For example, if the robot 200 becomes stuck, the user via the user interface on the remote electronic device can control the robot 200 to remotely move the robot 200 to an unstuck position. In some instances, data associated with the remote control of the robot 200 received by the electronics system 290 can have a priority and/or other indication such that the processor performs one or more processes based on the data rather than the cleaning plan. That is to say, the user can remotely control the robot 200, which in turn, can override the cleaning plan. Once the processor executes and/or preforms the processes associated with the remote control, the processor can execute a set of processes associated with, for example, remapping and/or redefining the cleaning plan. In some embodiments, the remote electronic device can send a signal to the electronics system 290 associated with an instruction to power down and/or transition to an "off" operational state (e.g., the remote electronic device can be, for example, a remote kill device). Moreover, while the robot 200 is described above as being manually initialized by the user directing robot 200 around the surface, in some embodiments, a remote electronic device can include data representing a map or layout of a surface to be cleaned, which can be graphically represented on the display of the remote electronic device to allow a user to virtually initialize the robot 200.

Referring now to FIGS. 9-17, at least a portion of a device 300 such as a semi-automated robot is illustrated according to an embodiment. The portion of the device 300 includes at least a frame 310, a drive system 340, and a cleaning assembly 365. The device 300 can be included in, for example, a cleaning robot used to clean (e.g., vacuum, scrub, disinfect, etc.) any suitable surface area such as, for example, a floor of a home, commercial building, warehouse, etc., as described in detail above. For example, the device 300 can be included in the robot 200 described above with reference to FIGS. 2-8. More specifically, the portion of the robot 200 can be adapted to receive the device 300 such that the support portion of the frame 220, the drive system 240, and the cleaning assembly 265 is replaced by the frame 310, the drive system 340, and the cleaning assembly 365, respectively. Thus, other portions of the device 300 are not described in further detail herein.

The frame 310 of the device 300 (also referred to herein as "robot") can be any suitable shape, size, and/or configuration. For example, as described above with reference to the robot 200, the frame 310 can include a storage portion (not shown in FIGS. 9-17) and a support portion 320. The storage portion can be substantially similar to the storage portion 211 of the frame 210 in FIGS. 2-5 and thus, is not described in further detail herein. The support portion 320 can be any suitable shape, size, and/or configuration. For example, the support portion 320 can include any suitable component, part, mechanism, linkage, and/or the like configured to support, for example, the drive system 340, and/or the cleaning assembly 365. In this embodiment, the support portion 320 includes at least a top plate 321 that defines an opening 322 and a bottom plate 323 that defines opening 324, which can be coupled to house at least the drive system 340. Although not shown in FIGS. 9-17, the support portion 320 of the frame 310 can include any suitable component, part, mechanism, linkage, and/or the like configured to couple the cleaning assembly 365 to the frame 310. For example, in some embodiments, the frame 310 can include a cleaning assembly mount such as the cleaning assembly mount 227 illustrated in FIG. 7.

Figure 9:
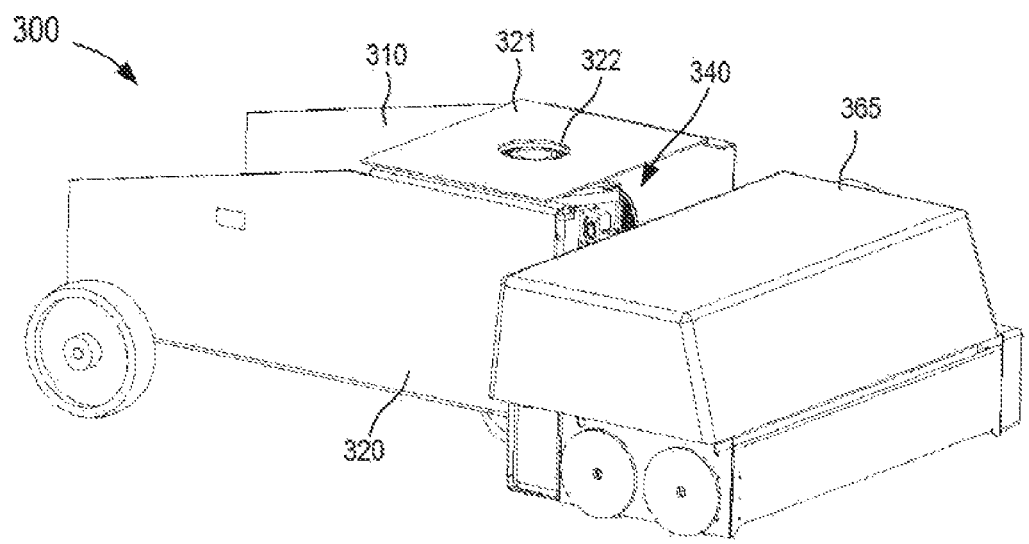
FIGS. 9 and 10 are a perspective view and a rear view, respectively, of a semi-autonomous robot according to an embodiment.
Figure 10:
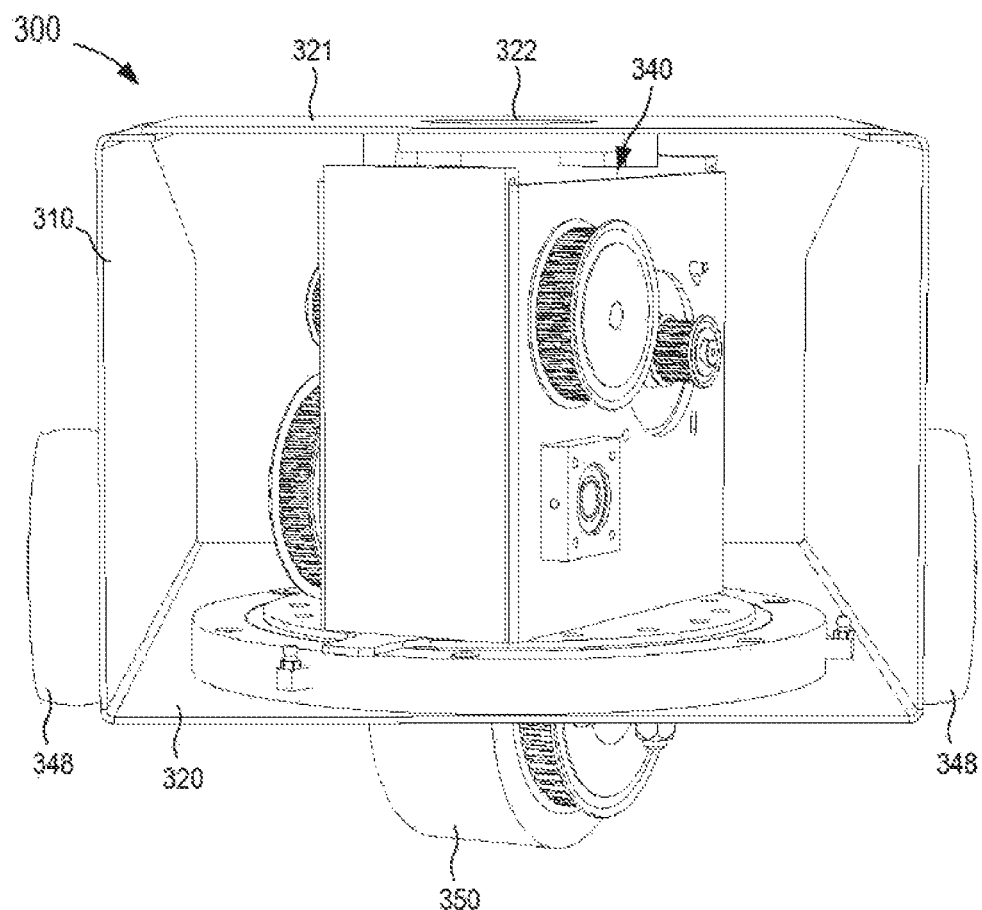
Figure 11:
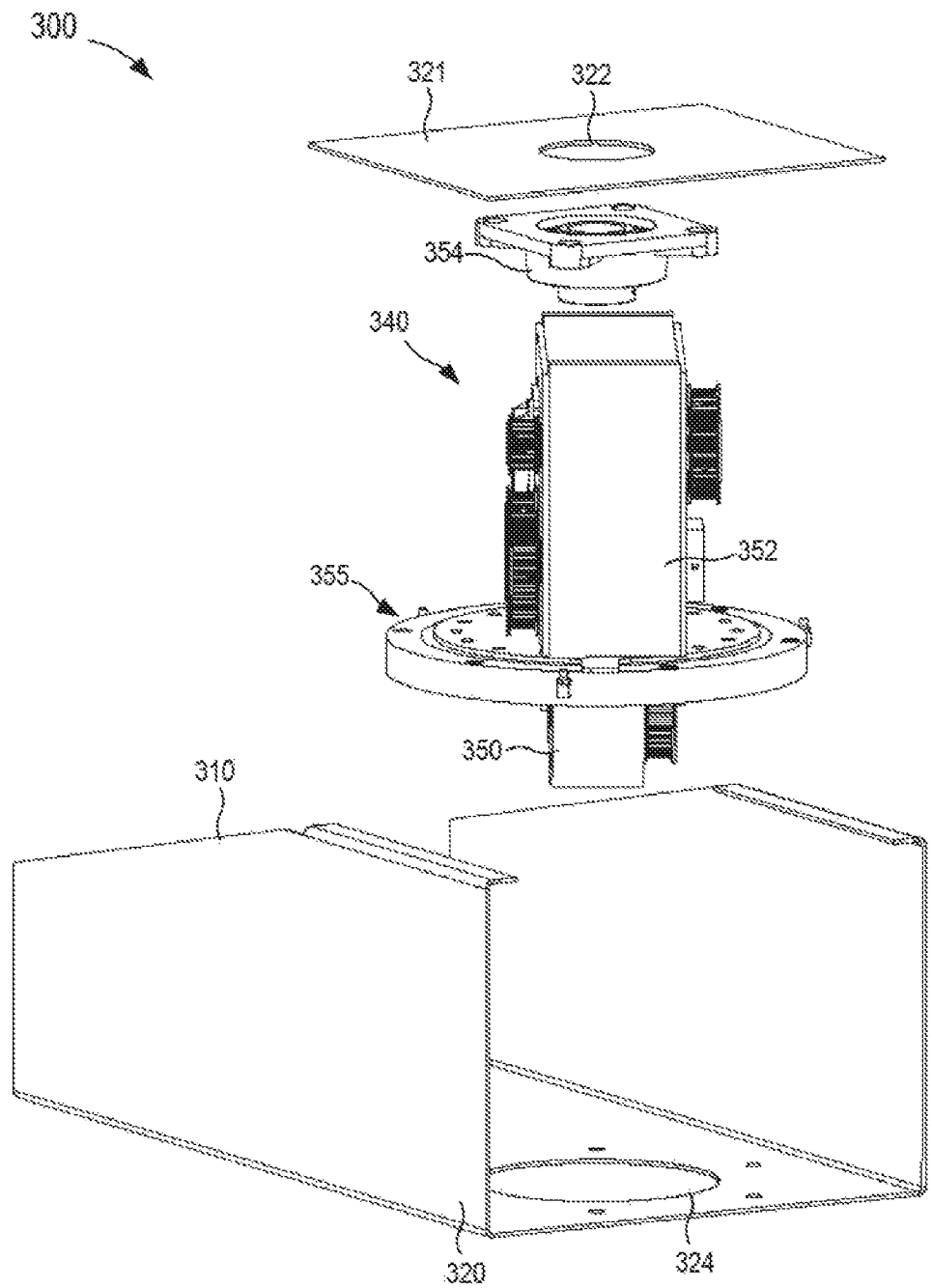
FIG. 11 is an exploded view of a portion of the semi-autonomous robot of FIG. 9.

As described above, the drive system 340 of the robot 300 is coupled to and/or is otherwise supported by the support portion 320 of the frame 310. The drive system 340 can be any suitable system, mechanism, machine, assembly, etc. configured to move the robot 300 along a surface. For example, in this embodiment, the drive system 340 can include a single steerable wheel assembly and any suitable number of passive wheels (as described above). As shown in FIGS. 9-11, the drive system 340 is rotatably coupled to the frame 110 such that a portion of the drive system 340 is aligned with the opening 322 defined by the top plate 320 and such that a wheel 350 of the drive system 340 extends through the opening 324 defined by the bottom plate 323. In this manner, one or more motors can be configured to rotate a wheel and/or at least a portion of the drive system 340 to move the robot 300 along a surface.

As shown in FIGS. 11-15, the drive system 340 includes a motor 342, a set of pulleys 346, a set of bearings 347, a wheel 350, a support structure 352, and a rotation subassembly 355. The motor 342 can be any suitable motor configured to rotate an output 343 (see e.g., FIG. 13). The support structure 352 is configured to be coupled to and/or to support the motor 343, the set of pulleys 346, the set of bearings 347, and the rotation subassembly 355. For example, the support structure 352 can be metal plates, metal alloy plates, thermoplastic plates, and/or the like, which can be configured to provide structural support and/or rigidity to the drive system 340. Moreover, the support structure 352 can define a number of openings configured to receive, for example, a portion of the motor 342 and/or a portion of one or more drive shafts (not shown in FIGS. 11-15), as described in further detail herein.

Figure 13:
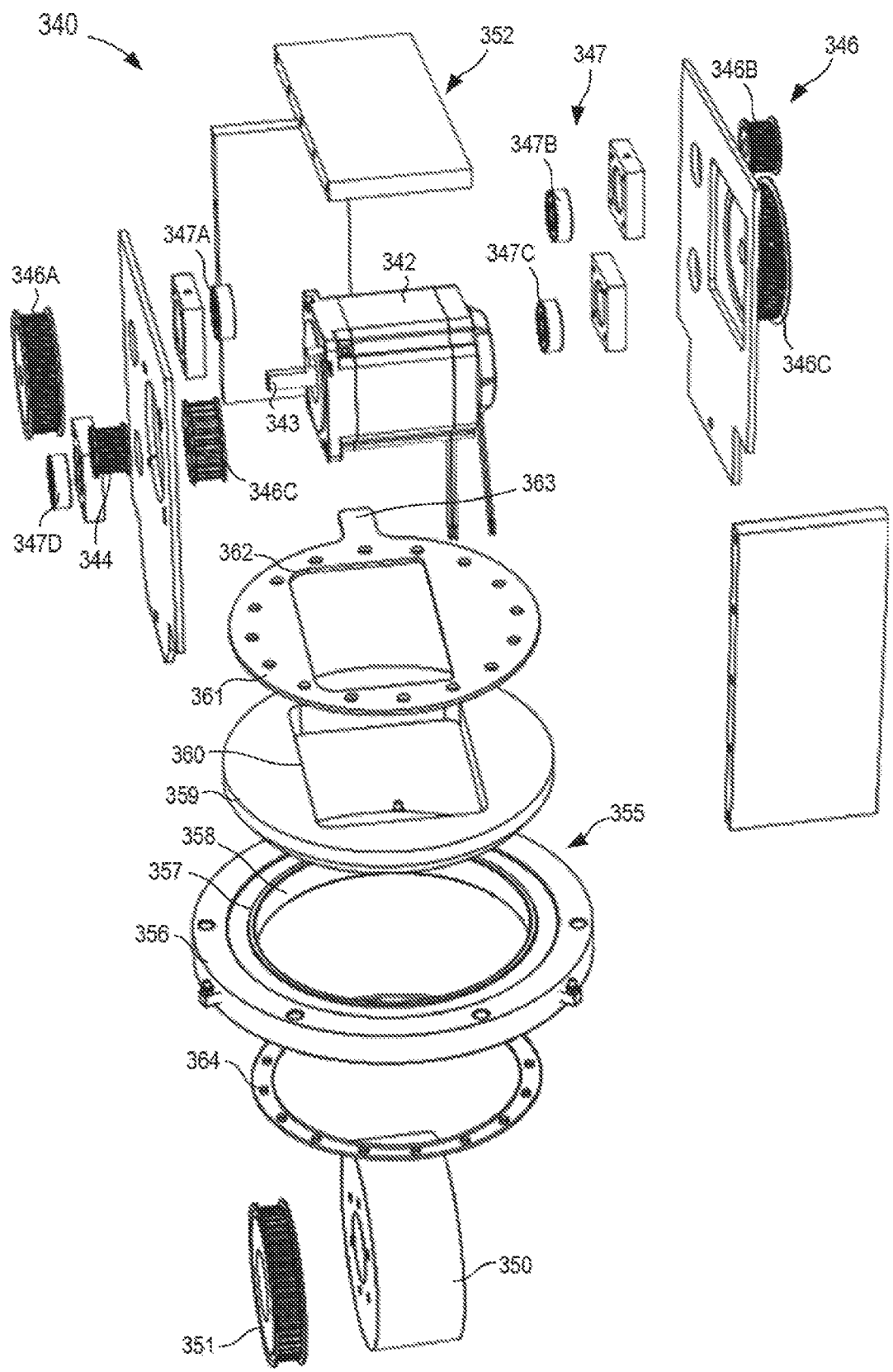
FIG. 13 is an exploded view of the drive system of FIG. 12.

The rotation subassembly 355 can be fixedly coupled to the support structure 352 of the drive system 340 and fixedly coupled to the bottom plate 323 of the frame 310. The rotation subassembly 355 can include any suitable number of plates, rings, components, etc. configured for relative movement between one or more portions thereof, which in turn, can allow the drive system 340 to be rotated relative to the frame 310 to steer the robot 300. For example, as shown in FIG. 13, the rotation subassembly 355 includes a mounting ring 356, a support plate 359, an actuator plate 361, and a coupling ring 364. The mounting ring 356 is configured to be fixedly coupled to the bottom plate 323 of the frame 310 (e.g., via any suitable number of mechanical fasteners, a weld, and/or the like). As shown, in this embodiment, the mounting ring 356 is a substantially annular ring having a recessed surface 357 and defining an opening 358.

The support plate 359 can be any suitable shape, size, and/or configuration. For example, as shown in FIG. 13, the support plate 359 is a plate having a substantially circular cross-sectional shape and defining an opening 360. The opening 360 is configured to receive a portion of the support structure 352 and a portion of the wheel 350, as described in further detail herein. In some embodiments, the configuration of the support plate 359 can be based on and/or associated with at least a portion of the mounting ring 356. For example, at least a portion of the support plate 359 can be rotatably disposed within the mounting ring 356. More specifically, although not shown in FIGS. 11-15, the support plate 359 can include and/or can form a flange that can be in contact with the recessed surface 357 of the mounting ring 356, while a portion of the support plate 359 extends through the opening 358 defined by the mounting ring 356. In some embodiments, the mounting ring 356 and/or the support plate 359 can include a surface finish, a coating, a lubricant, and/or the like that can reduce an amount of friction associated with a rotation of the support plate 359 along the surface of the mounting ring 356 defining the recess 357. For example, in some embodiments, the mounting ring 356 can include one or more grease fittings or the like that can receive a flow of grease, which can flow via one or more channels to the surface defining the recess 357. Thus, the support plate 359 can be rotated relative to the mounting ring 356 with a relatively low amount of friction.

Figure 12:
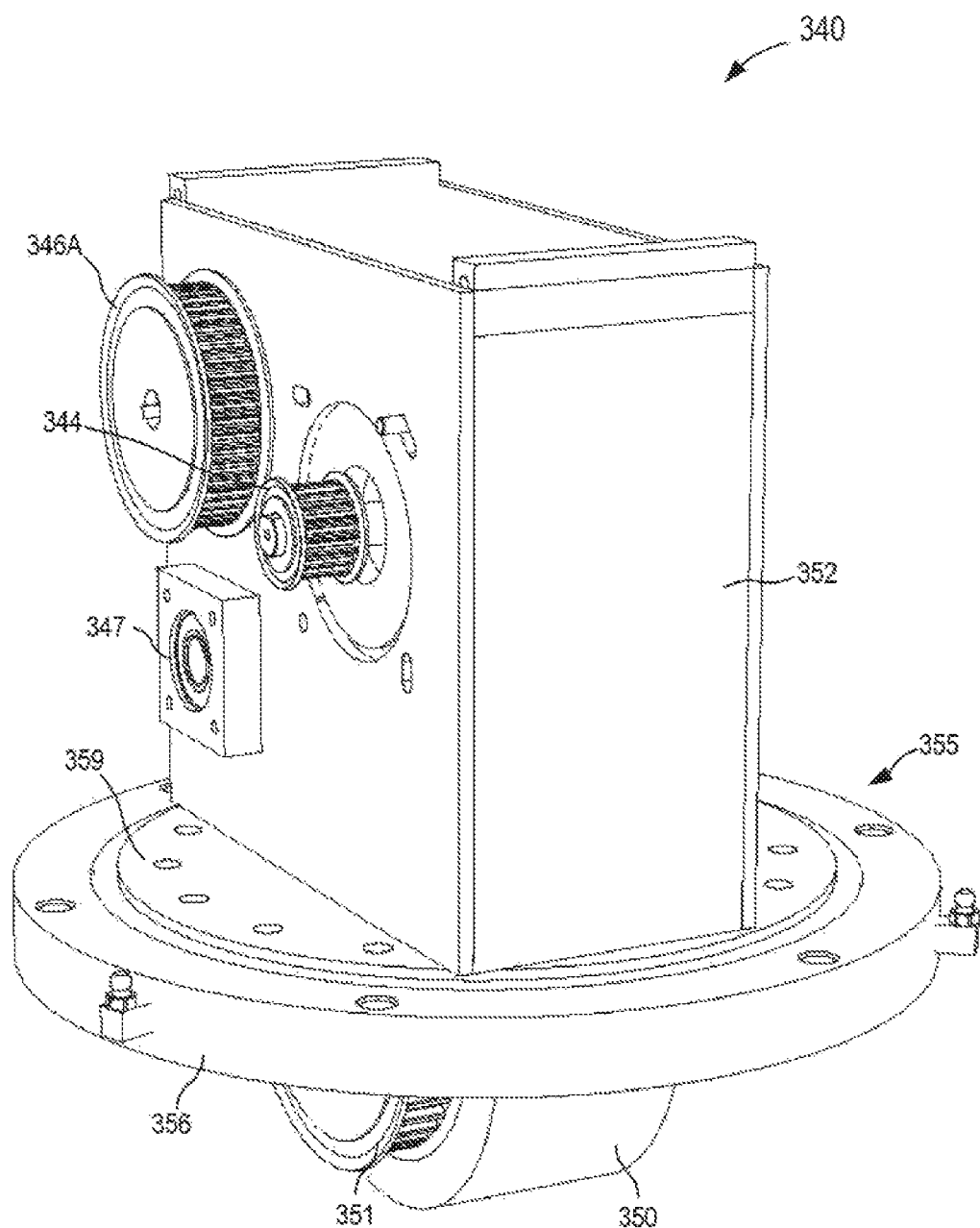
FIG. 12 is a perspective view of a drive system included in the semi-autonomous robot of FIG. 9.

The actuator plate 361 can be any suitable shape, size, and/or configuration. For example, in this embodiment, the actuator plate 361 has an engagement portion 363 and defines an opening 362. The opening 362 is configured to receive a portion of the support structure 352 and a portion of the wheel 350, as described in further detail herein. As shown in FIGS. 12 and 13, the actuator plate 361 can be coupled to a surface of the support plate 359 and can be coupled to a portion of the support structure 352, thereby coupling the support structure 352 to the support plate 359. Moreover, as shown in FIG. 13, the coupling ring 364 can be disposed on a side of the mounting ring 356 opposite a side on which the actuator plate 361 is disposed. In some embodiments, the arrangement of the actuator plate 361 and the coupling ring 364 can be such that any suitable number of fasteners can extend therebetween, thus coupling the actuator plate 361 to the coupling ring 364. In such embodiments, for example, the actuator plate 361 and the coupling ring 364 can be configured to limit a movement of support plate 359 in an axial direction (e.g., in a direction of an axis about which the support plate 359 rotates. In other words, the actuator plate 361 and the coupling ring 364 can collectively couple the support plate 359 to the mounting ring 356 while allowing the support plate 359 to rotate relative to the mounting ring 356.

Although not shown in FIGS. 9-17, in some embodiments, the robot 300 can include a steering actuator or the like configured to engage the engagement portion 363 of the actuator plate 361. For example, in some instances, the steering actuator can be actuated (e.g., in response to a signal received from an electronics system such as the electronics system 290 described in detail above) to move the engagement portion 363 from a first position to a second position. More specifically, with the actuator plate 361 coupled to the support plate 359, actuation of the steering actuator can result in the engagement portion 363 being moved from a first position to a second position, which in turn, can result in the support plate 359 being rotated relative to the mounting ring 356.

As described above, the drive system 340 includes the motor 342, the set of pulleys 346, the set of bearings 347, and the wheel 350. The wheel 350 can be any suitable wheel and includes and/or is coupled to a wheel pulley 351, as described in further detail herein. As shown, for example, in FIGS. 14 and 15, the wheel 350 can be coupled to a portion of the support structure 352 that extends through the openings 358, 360, and 362 of the mounting ring 356, support plate 359, and actuator plate 361, respectively. For example, in some embodiments, the wheel 350 can be configured to rotate about an axle or the like (not shown) coupled to and/or suspended from the support structure 352. Thus, the wheel 350 can be rotated about the axle, for example, to move the robot 300 along the surface, as described in further detail herein.

Figure 14:
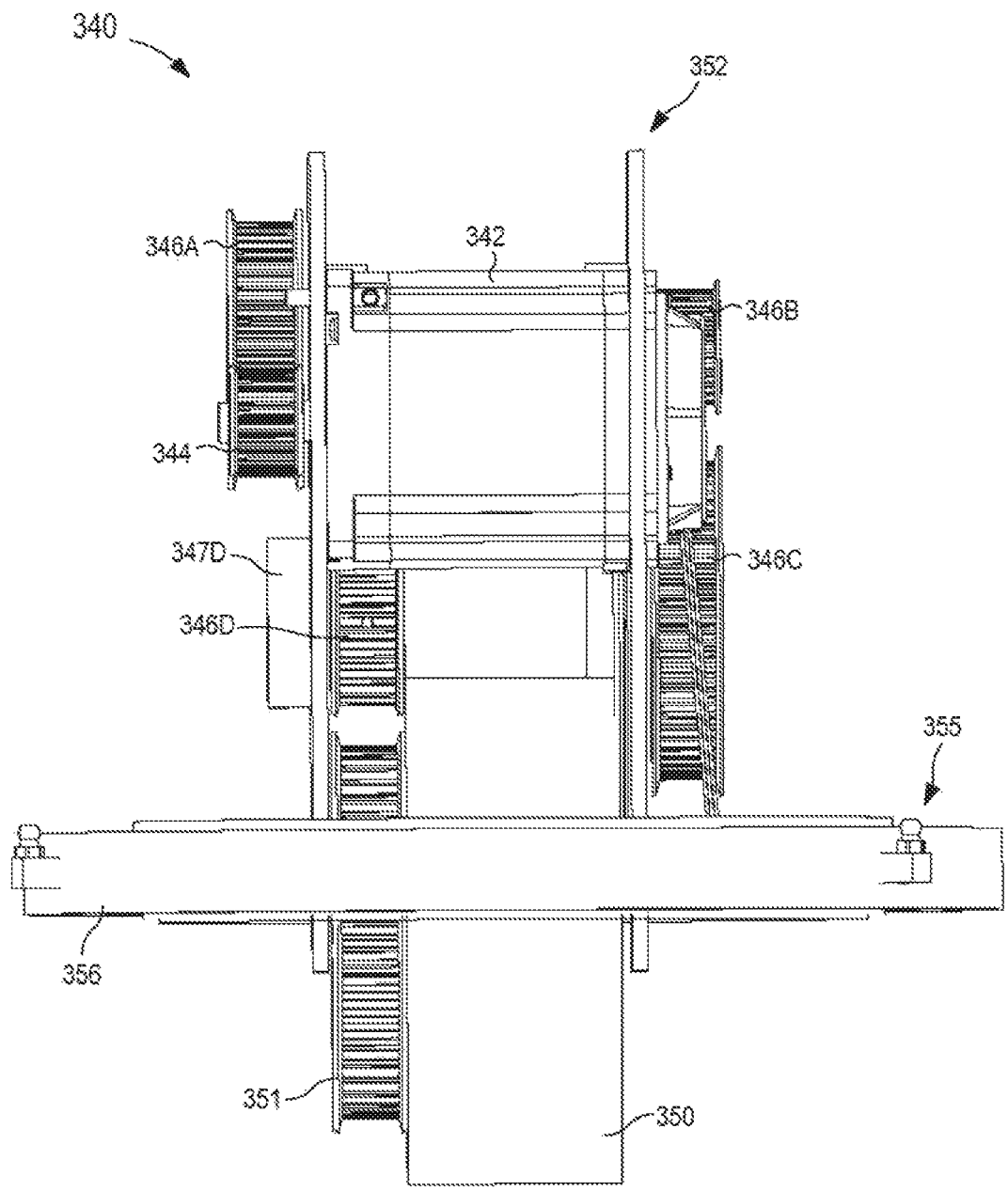
FIGS. 14 and 15 are a front view and a rear view, respectively, of the drive system of FIG. 12.
Figure 15:
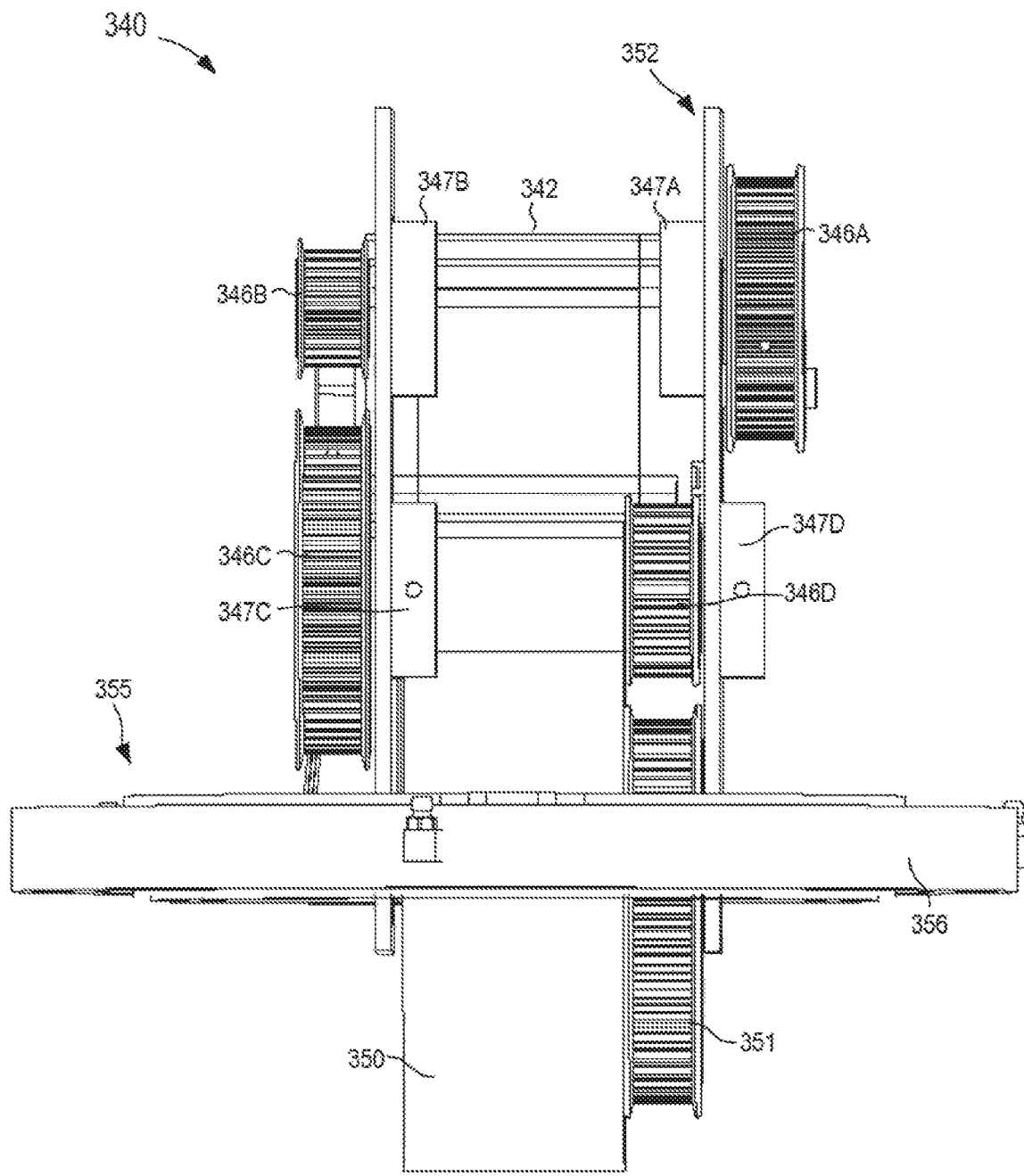

The motor 342 of the drive system 340 is coupled to the support structure and maintained in a substantially fixed position relative thereto. The motor 342 includes an output 343 to which an output pulley 344 is coupled, as shown in FIGS. 13-15. Each bearing included in the set of bearings 347 is coupled to a portion of the support structure 352. In this manner, the set of bearings 347 can be configured to support any number of drive shafts or the like (not shown in FIGS. 9-17) to which at least one associated pulley from the set of pulleys 347 is coupled. For example, in this embodiment, the drive system 340 includes a first bearing 347A and a second bearing 347B configured to support a first drive shaft (not shown), and a third bearing 347C and a fourth bearing 347D configured to support a second drive shaft (not shown). Moreover, the drive system 340 includes a first pulley 346A coupled to a first end of the first drive shaft and second pulley 346B coupled to a second end of the first drive shaft, and a third pulley 346C coupled to a first end of the second drive shaft and a fourth pulley 347D coupled to a second end of the second drive shaft.

Although not shown in FIGS. 11-15, the drive system 340 includes a set of belts coupled to the pulleys to form a pulley system. For example, such a pulley system can have a belt that operably couples the output pulley 344 to the first pulley 346A, a belt that operably couples the second pulley 346B to the third pulley 346C, and a belt that operably couples the fourth pulley 346D to the wheel pulley 351. Thus, with the first pulley 346A and the second pulley 346B coupled to the same drive shaft and with the third pulley 346C and the fourth pulley 346D, the motor 342 can rotate the output 343 and the output pulley 344, which in turn, results in a rotation of the wheel 350. In some embodiments, the size, number, position, and/or arrangement of the set of pulleys 346 can be such that an overall pulley ratio between the output pulley 344 and the wheel pulley 351 is equal to a predetermined value. As such, the drive system 340 can be improved and/or otherwise placed in a desired configuration, for example, to decrease an amount of electric power and/or torque associated with the motor 342 to rotate the wheel 350, increase an amount of torque associated with the wheel 350, define a maximum rotational velocity of the wheel 350, and/or the like.

As described above with reference to the robot 200, the robot 300 can include an electronics system (not shown) configured to send signals to and/or receive signals from the drive system, which result in a rotation of the wheel 350 and/or a rotation of the rotation subassembly 355. Thus, the drive system 340 can move the robot 300 along a surface. In some embodiments, the electronics system can receive signals associated with an operating condition of the drive system 340 based on data associated with a user input, a sensor, a control device, an encoder, a camera, etc., as described in detail above. In some instances, the arrangement of the drive system 340 (e.g., using the wheel 350 to propel as well as steer the robot 300) can result in a reduced turning radius when compared to, for example, a robot using two wheels that receive power and steer the robot (e.g., an arrangement similar to a front wheel drive vehicle). In some instances, such an arrangement, for example, can place the cleaning assembly 365 into corners and/or other tight spaces (e.g., within five centimeters of a wall or corner), which might otherwise result in the robot 300 becoming stuck and/or which might otherwise be missed. Thus, such control methods, control systems, feedback systems, etc. can function similar to those described above and are therefore, not described in further detail herein.

Figure 16:
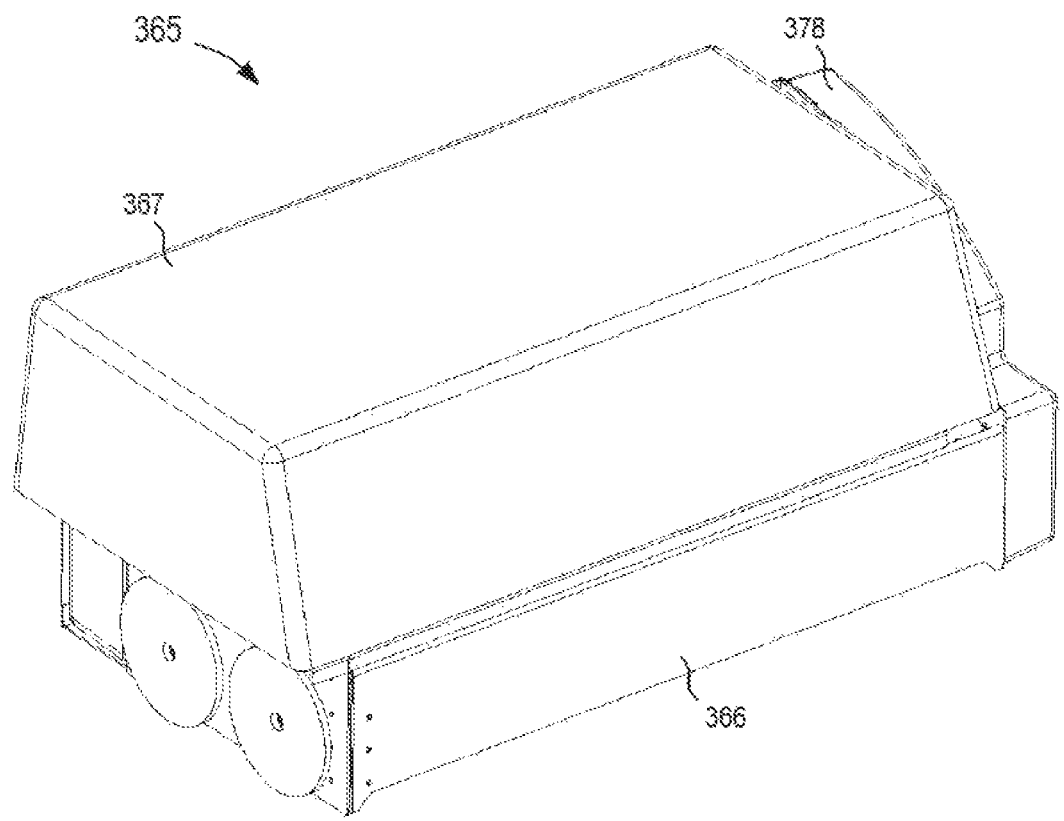
FIG. 16 is a perspective view of a cleaning assembly included in the semi-autonomous robot of FIG. 9.
Figure 17:
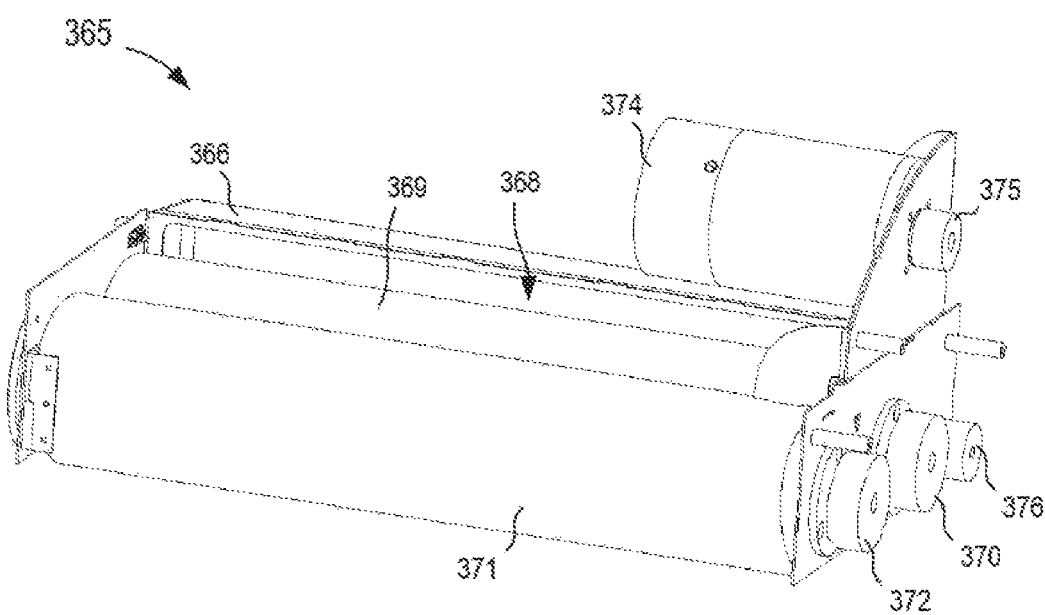
FIG. 17 is a perspective view of the cleaning assembly of FIG. 16 without a cover.

As shown in FIGS. 16 and 17, the robot 300 includes the cleaning assembly 365. The cleaning assembly 365 included in the robot 300 can be any suitable shape, size, and/or configuration. The cleaning assembly 365 is coupled to and/or is otherwise supported by the support portion 320 of the frame 310. For example, as described above with reference to the robot 200, the frame 310 can include a cleaning assembly mount (not shown in FIGS. 9-17) that can be coupled to a mounting portion (not shown in FIGS. 9-17) of the cleaning assembly. Thus, the arrangement of the cleaning assembly 365 and the frame 310 can allow the cleaning assembly 365 to be moved relative to the frame 310 (e.g., via an actuator and/or any suitable linkage). For example, in some embodiments, the cleaning assembly 365 can be moved closer to or away from the frame 310, which in turn, can move the cleaning assembly 365 away from or closer to, respectively, a surface along which the robot 300 moves.

The cleaning assembly 365 includes frame 366, a cover 367, a shroud 378, a first brush 369, a second brush 371, and a motor 374. The cover 367 is coupled to the frame 366 and is configured to cover, house, and/or enclose at least a portion of the cleaning assembly 365. More particularly, the cover 367 can couple to the frame 366 to define an inner volume 368 that can house at least a portion of the motor 374, the first brush 369, and the second brush 371. In some embodiments, at least a portion of the inner volume 368 can define, for example, a suction volume or the like within which a negative pressure can be formed to draw detritus into the cleaning assembly 365 and ultimately into a detritus volume or the like. For example, as described above, the robot 300 can include a vacuum pump and/or motor that can be in communication with the inner volume 368 and configured to form a negative pressure differential that can be operable in drawing detritus into the cleaning assembly 365.

The motor 374 of the cleaning assembly 365 can be any suitable motor configured, for example, to rotate the first brush 369 and the second brush 371. More specifically, the motor 374 includes an output 375 that can be operably coupled to a first pulley 370 fixedly coupled to the first brush 369, a second pulley 372 fixedly coupled to the second brush 371, and a tensioner pulley 376 via a belt or chain (not shown in FIGS. 16 and 17). As such, the motor 374 can rotate the output pulley 375, which in turn, rotates the first pulley 370, the second pulley 372, and the tensioner pulley 376. Therefore, with the first pulley 370 fixedly coupled to the first brush 369 and with the second pulley 372 fixedly coupled to the second brush 371, the motor 374 can be configured to rotate the first brush 369 and the second brush 371. Moreover, as shown in FIG. 16, the shroud 378 can be configured to cover and/or house at least a portion of the output pulley 375, the first pulley 370, the second pulley 372, and the tensioner pulley 376.

In some embodiments, the arrangement of the cleaning assembly 365 can be such that the motor 374 rotates the first brush 369 and the second brush 371 in substantially the same rotational direction. In other embodiments, the motor 374 can be configured to rotate the first brush 369 in a first rotational direction and the second brush 371 in a second rotational direction, opposite the first rotational direction. In still other embodiments, the cleaning assembly 365 can include a first motor configured to rotate the first brush 369 and a second motor configured to rotate the second brush 371 independent of the first brush 369. In this manner, the first brush 369 and the second brush 371 can be rotated, for example, to sweep and/or scrub the surface to entrain debris and/or detritus within the inner volume 368. Moreover, a negative pressure produced by a vacuum source or the like (as described above) can draw the debris and/or detritus into a storage volume or the like (e.g., similar to the detritus volume 212 defined by the storage portion 211 of the frame 210 described above with reference to FIG. 4).

At least a portion of the cleaning assembly 365 can be in communication with the electronics system (not shown) and can be configured to send signals to and/or receive signals from the electronics system associated with the operation of the cleaning assembly 365. For example, in some instances, the electronics system can send a signal to the cleaning assembly 365 and/or an actuator or the like that can be operable in moving the cleaning assembly 365 relative to the frame 310. In some instances, the electronics system can send a signal operable in transitioning a pump and/or the motor 374 between an "off" operational state and an "on" operational state. For example, in some instances, the electronics system can send a signal operable in transitioning the motor 374 from an "off" operational state and an "on" operational state, which in turn, can be operable in starting a rotation of the first brush 369 and the second brush 371, respectively. Moreover, in some instances, the electronics system can be configured to control and/or modulate an amount of pressure exerted by a cleaning member and/or cleaning head on the surface (e.g., based on floor type, type and/or amount of detritus, and/or the like).

As described in detail above, the robot 300 can move along the surface in at least a semi-autonomous manner such that the cleaning assembly 365 cleans the surface. In some embodiments, the arrangement of the drive system 340, the cleaning assembly 365, and the electronics system (not shown in FIGS. 9-17) can allow the robot 300 to place the cleaning assembly 365 into relatively tight spaces and/or corners without becoming stuck. In some instances, the drive system 340 can be configured to move the robot 300 along the surface to place the cleaning assembly 365 within a relatively small distance from a wall, corner, and/or other obstacle (e.g., within 5 centimeters or less of an object). Thus, the robot 300 can be configured to clean the surface in substantially the same manner as described in detail above with reference to the robot 200.

Referring now to FIGS. 18-28, a device 400 such as, for example, a robot configured to clean a surface is illustrated according to an embodiment. The device 400 (also referred to herein as "cleaning robot" or "robot") includes at least a frame 410, a drive system 440, an electronics system 490, and a cleaning assembly 465. The cleaning robot 400 can be used to clean (e.g., vacuum, scrub, disinfect, etc.) any suitable surface area such as, for example, a floor of a home, commercial building, warehouse, etc. The robot 400 can be any suitable shape, size, or configuration and can include one or more systems, mechanisms, assemblies, or subassemblies that can perform any suitable function associated with, for example, traveling along a surface, mapping a surface, cleaning a surface, and/or the like.

The frame 410 of the robot 400 can be any suitable shape, size, and/or configuration. For example, in some embodiments, the frame 410 can include a set of components or the like, which are coupled to form a support structure configured to support the drive system 440, the cleaning assembly 465, and the electronic system 490. More particularly, in this embodiment, the frame 410 includes a storage portion 411 (see e.g., FIGS. 18-20) and a support portion 420 (see e.g., FIGS. 20-24). As described above with reference to the frame 110, the frame 410 can include any suitable components such as, for example, sheets, tubes, rods, bars, etc. In some embodiments, such components can be formed from a metal or metal alloy such as aluminum, steel, and/or the like. In other embodiments, such components can be formed from a thermoplastic and/or polymer such as nylons, polyesters, polycarbonates, polyacrylates, ethylene-vinyl acetates, polyurethanes, polystyrenes, polyvinyl chloride (PVC), polyvinyl fluoride, poly(vinyl imidazole), and/or blends and copolymers thereof. In some embodiments, the frame 410 can include and/or can support a body or the like configured to enclose at least a portion of the robot 400.

Figure 20:
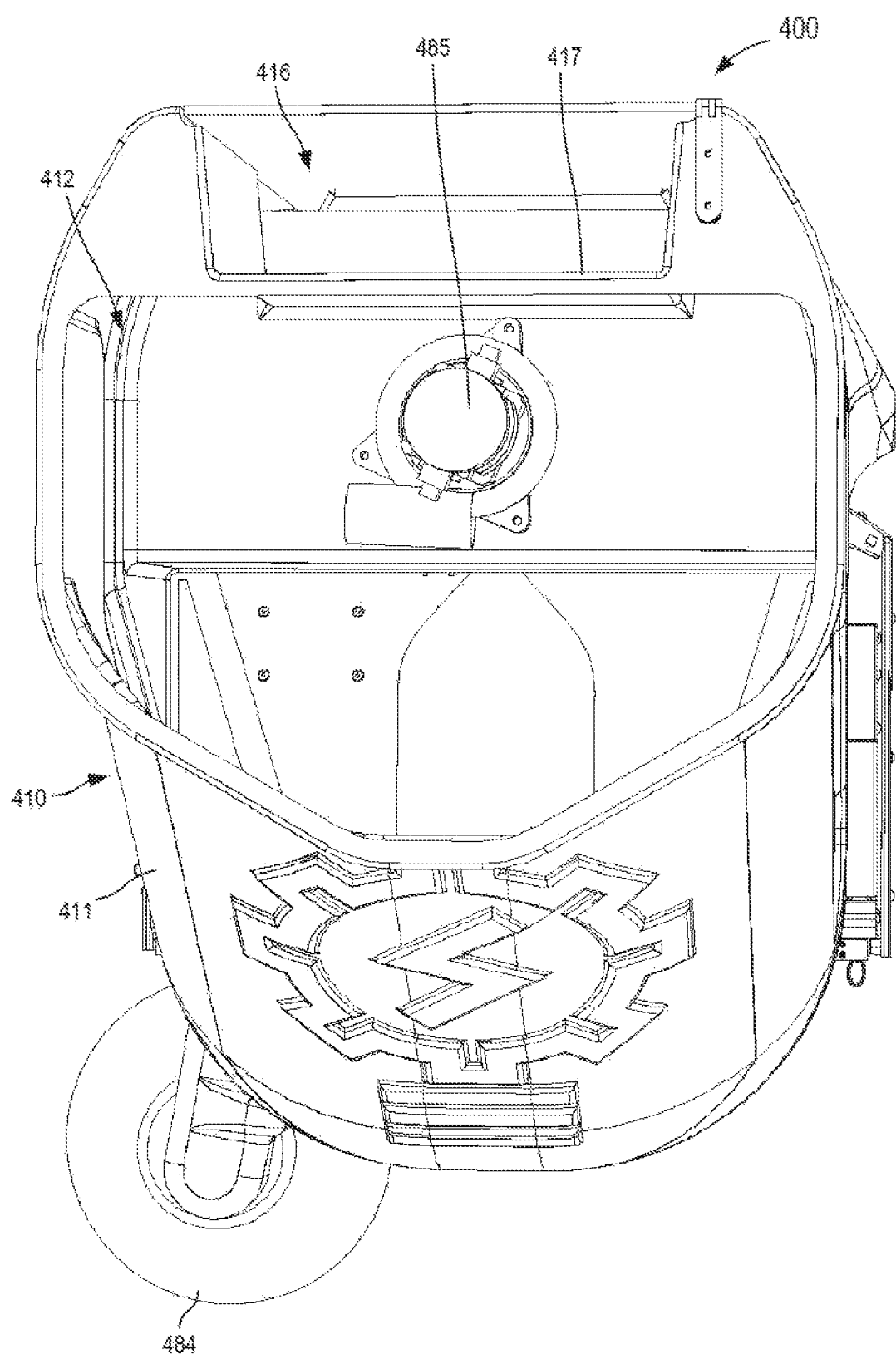
FIG. 20 is a top view of the semi-autonomous robot of FIG. 18 with a lid removed.
Figure 21:
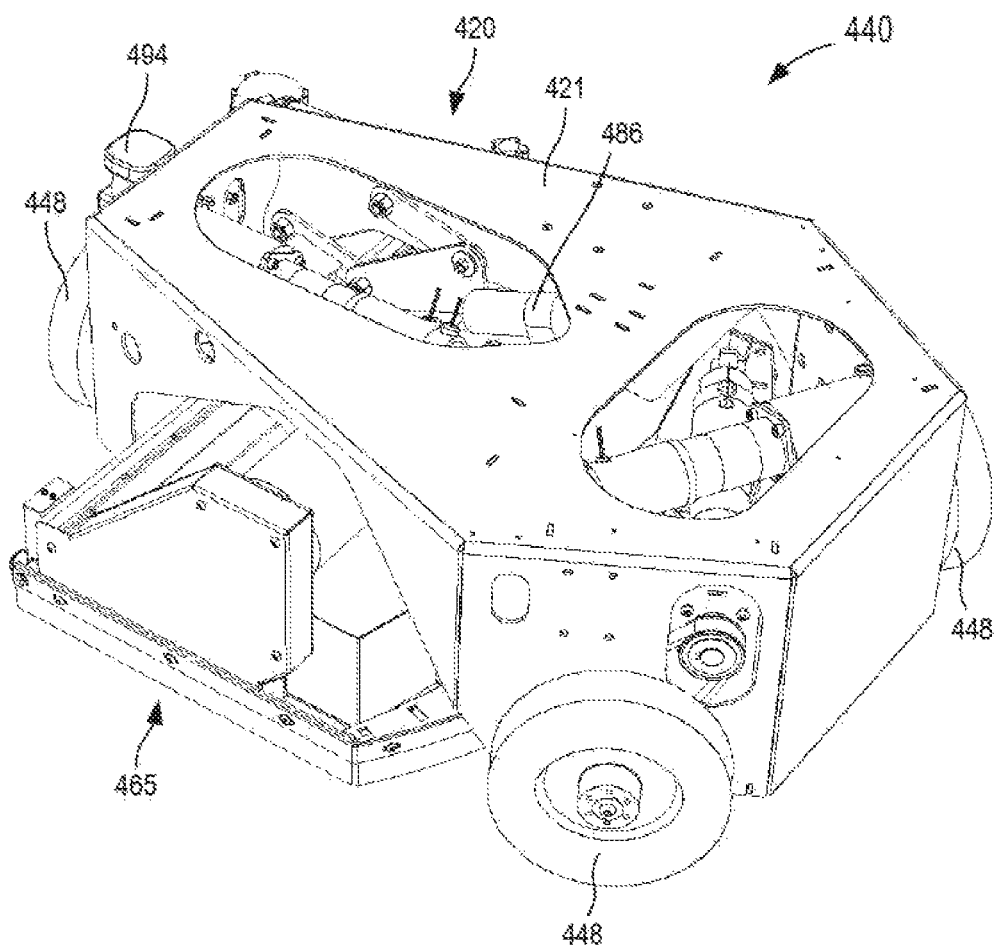
FIG. 21 is a perspective view of a portion of a frame, a drive system, and a cleaning assembly included in the semi-autonomous robot of FIG. 18.

The storage portion 411 of the frame 410 can include a set of components configured to define a detritus cavity 412 and an electronics system cavity 416 (see e.g., FIG. 20). In some embodiments, the storage portion 411 of the frame 410 can be, for example, a body of the robot 400 supported by the support portion 420 of the frame 410. That is to say, in some embodiments, the robot 400 can include a body or the like that can define the detritus cavity 412 and/or the electronics system cavity 416.

The detritus cavity 412 can be any suitable shape, size, or configuration. Although not shown, the frame 410 and/or the body of the robot 400 can define an opening configured to place the detritus cavity 412 in fluid communication with the cleaning assembly 465. Thus, the cleaning assembly 465 can transfer refuse, detritus, fluid, and/or the like from the surface on which the robot 400 is moving to the detritus cavity 412, as described in further detail herein. Furthermore, as shown in FIG. 20, the detritus cavity 412 can store and/or house a vacuum source 485 that can be configured to generate a negative pressure differential within the detritus cavity 412, which in turn, can result in a suction force exerted on and/or within the cleaning assembly 465. For example, the vacuum source 485 can be a vacuum pump (e.g., a piston driven pump, a rotary vane pump, a rotary screw pump, a diaphragm pump, and/or the like) that can draw a flow of fluid (e.g., a gas such as air and/or a liquid) therethrough. Thus, the vacuum source 485 can draw refuse, detritus, fluid, dirt, and/or the like from the cleaning assembly 465 and into the detritus cavity 412, as described in further detail herein. While the vacuum source 485 is shown in FIG. 20 as being disposed within the detritus cavity 412, in other embodiments, the vacuum source 485 can be disposed in, for example, a vacuum cavity or the like, as described above with reference to the robot 200.

The electronics system cavity 416 is configured to receive the at least a portion of the electronics system 490. More specifically, the storage portion 411 of the frame 410 can include a wall 417 configured to physically and fluidically isolate the detritus cavity 412 from the electronics system cavity 416. In this manner, electronic components can be disposed in the electronics system volume 416 and not exposed to a volume of detritus transferred into the detritus cavity 412. In some embodiments, the electronics system cavity 416 can be sufficiently large to house at least a portion of the electronics system 490 such as, for example, a printed circuit board (PCB), processor, memory, radios, power distribution components, a battery, and/or the like (not shown in FIGS. 18-28). Although not shown, the storage portion 411 can include one or more removable portions, which can be moved relative to the frame 410 to provide access to the detritus cavity 412 and/or the electronics storage volume 416.

Figure 18:
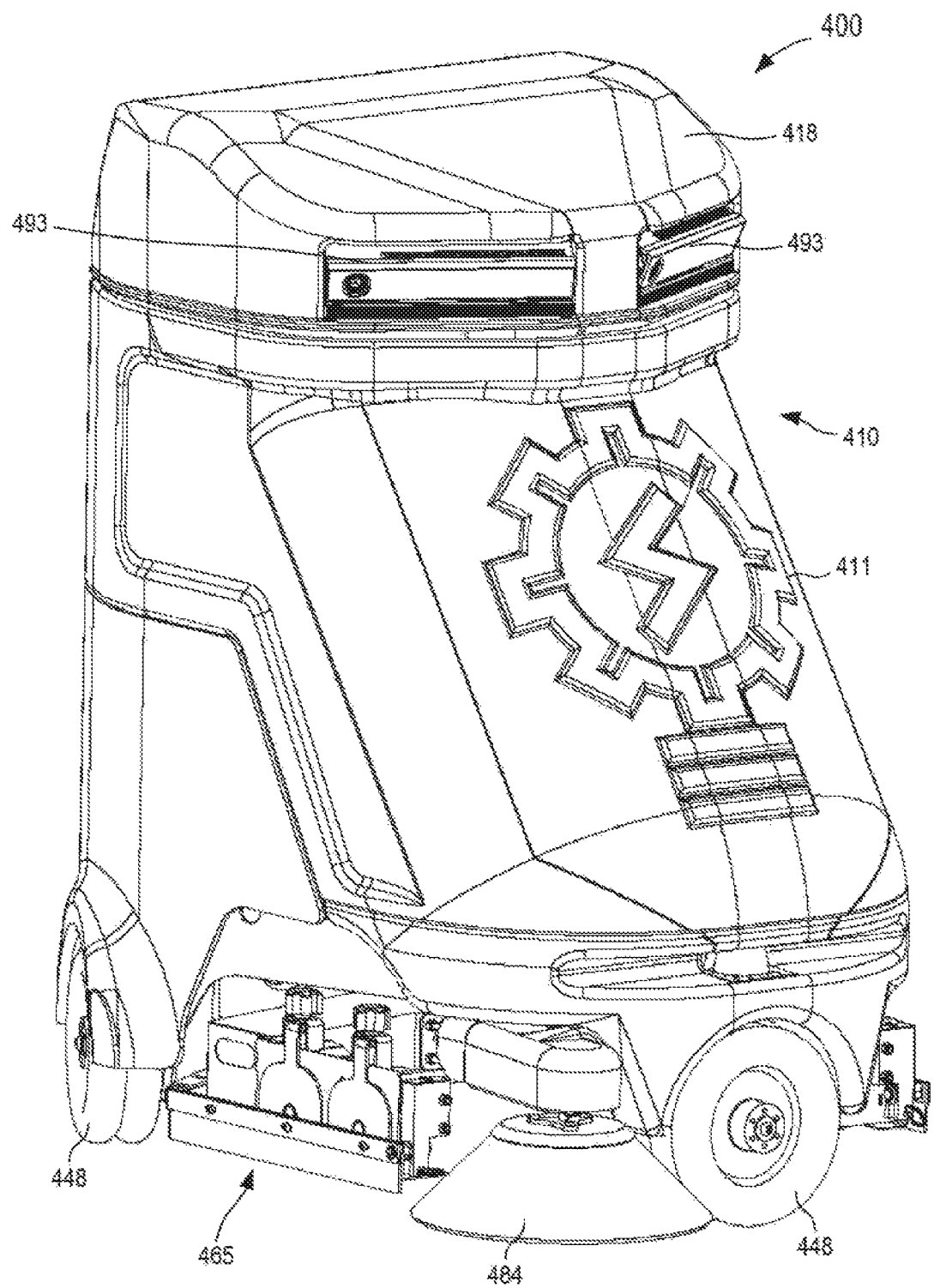
FIGS. 18 and 19 are a front perspective view and a rear perspective view, respectively, of a semi-autonomous robot according to an embodiment.
Figure 19:
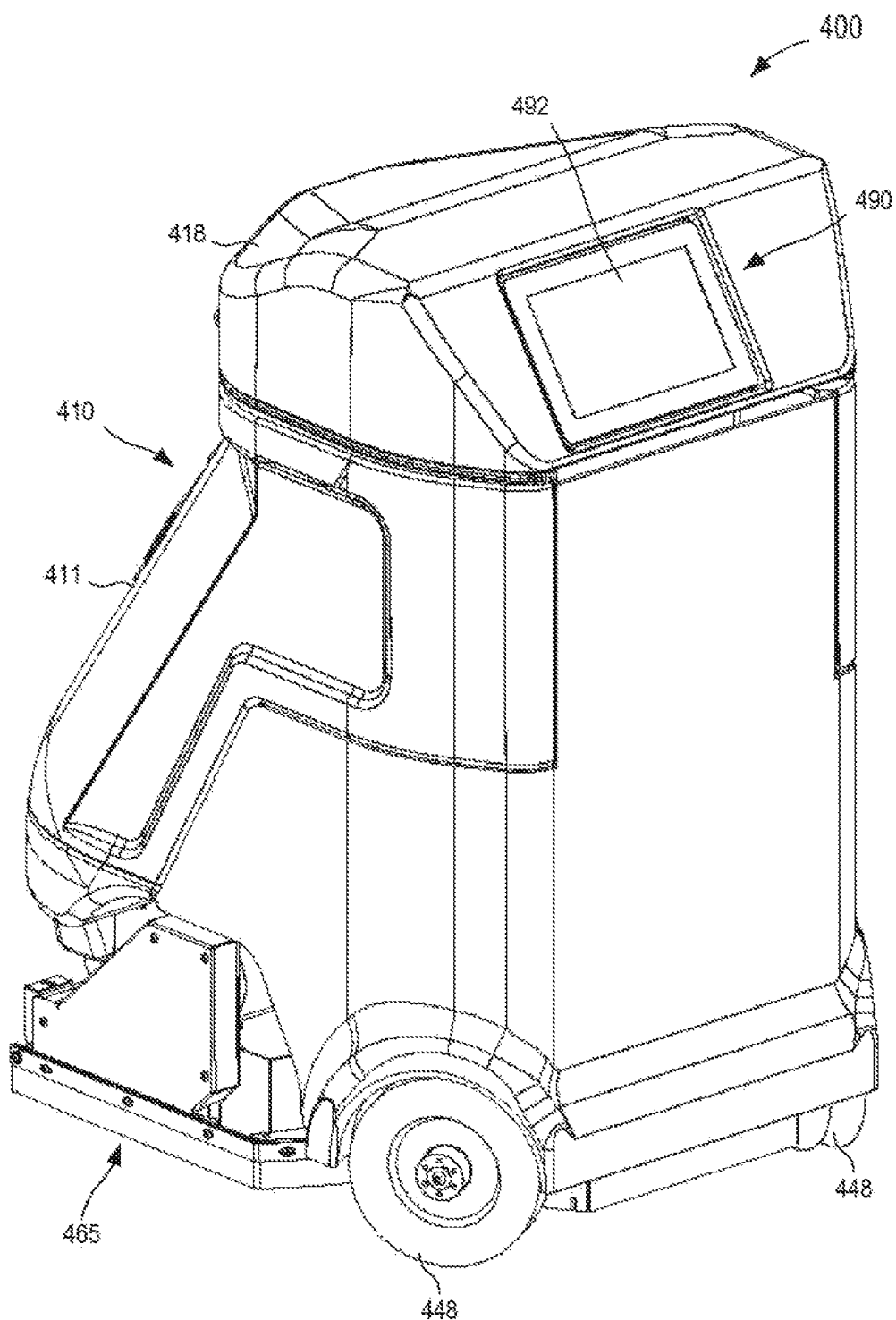

As shown in FIGS. 18 and 19, the storage portion 411 of the frame 410 (and/or a body coupled thereto) includes a cover 418 that covers and/or encloses the electronics system cavity 416 and/or the detritus cavity 412. The cover 418 can be configured to store and/or support one or more electronic components included in the electronics system 490. For example, the cover 418 can be configured to support one or more cameras 493 (see e.g., FIG. 18) and a user interface 492 (see e.g., FIG. 19) of the electronics system 490, as described in further detail herein. In some embodiments, the cover 418 can be movable relative to the storage portion 411 of the frame 410 to allow access to the detritus cavity 412 and/or the electronics system volume 416. For example, in some embodiments, the cover 418 can be coupled to the storage portion 411 of the frame 410 and/or a body coupled thereto via one or more hinges or the like, which can allow the cover 418 to be pivoted relative to the frame 410 to provide access to the detritus cavity 412 and/or the electronics system cavity 416.

As shown in FIGS. 20-24, the support portion 420 include any suitable component, part, mechanism, linkage, and/or the like configured to support, for example, the storage portion 411 of the frame 410, the drive system 440, and/or the cleaning assembly 465. In this embodiment, the support portion 420 includes a top plate 421 and a support structure 425. The top plate 421 can be coupled to the storage portion 411 of the frame 410 to couple the support portion 420 thereto. In addition, the top plate 421 can be configured to support and/or couple to a laser transceiver 494 and/or any other suitable sensor, and/or transceiver included in the electronics system 490 (see e.g., FIG. 21).

The support structure 425 can include any suitable component configured to support at least a portion of the drive system 440, and/or configured to couple any suitable motor, actuator, pump, pulley, etc. to the support portion 420 of the frame 410. For example, the support structure 425 can be coupled to a mounting portion 479 of the cleaning assembly 465 to couple the cleaning assembly 465 to the support portion 420 of the frame 410, as described in further detail herein. In addition, the support portion 420 includes a first drive mechanism mount 452A configured to support a first drive mechanism 441A of the drive system 440, a second drive mechanism mount 452B configured to support a second drive mechanism 441B of the drive system 440, and the third drive mechanism mount 452 configured to support a third drive mechanism 441C of the drive system 440.

As shown in FIGS. 21-25, the drive system 440 can be any suitable system, mechanism, machine, assembly, etc. coupled to the support portion 420 and configured to move the robot 400 along a surface. For example, in this embodiment, the drive system 440 includes the first drive mechanism 441A, the second drive mechanism 441B, and the third drive mechanism 441C. As described above, the first drive mechanism 441A is coupled to the first drive mechanism mount 452A of the support portion 420 of the frame 410, the second drive mechanism 441B is coupled to the second drive mechanism mount 452B of the support portion 420, and the third drive mechanism 441C is coupled to the third drive mechanism mount 452C. In this embodiment, the first drive mechanism 441A, the second drive mechanism 441B, and the third drive mechanism 441C are substantially similar in form and function. Thus, a detailed discussion of, for example, the first drive mechanism 441A applies the second drive mechanism 441B and the third drive mechanism 441C, and as such, the second drive mechanism 441B and the third drive mechanism 441C are not described in further detail herein. The drive mechanisms 441A, 441B, and 441C can differ, however, by coupling to the drive mechanism mounts 452A, 452B, and 452C, respectively, in different positions to allow components of the drive mechanisms 441A, 441B, and/or 441C to extend from the drive mechanism mounts 452A, 452B, and 452C, respectively, without interfering with components from the other drive mechanisms, as shown, for example, in FIGS. 23 and 24.

Figure 22:
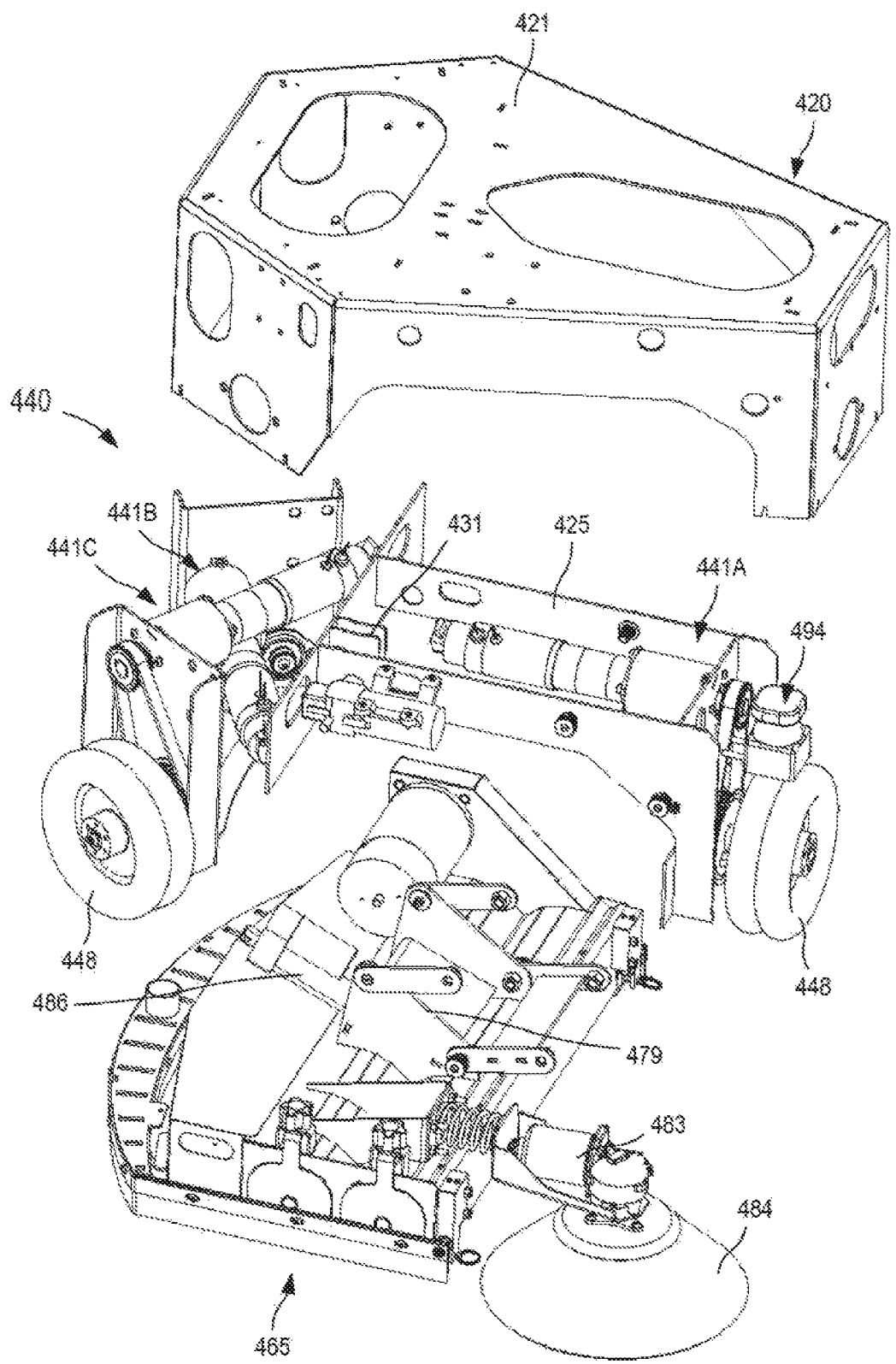
FIG. 22 is an exploded view of the portion of the frame, the drive system, and the cleaning assembly of FIG. 21.
Figure 23:
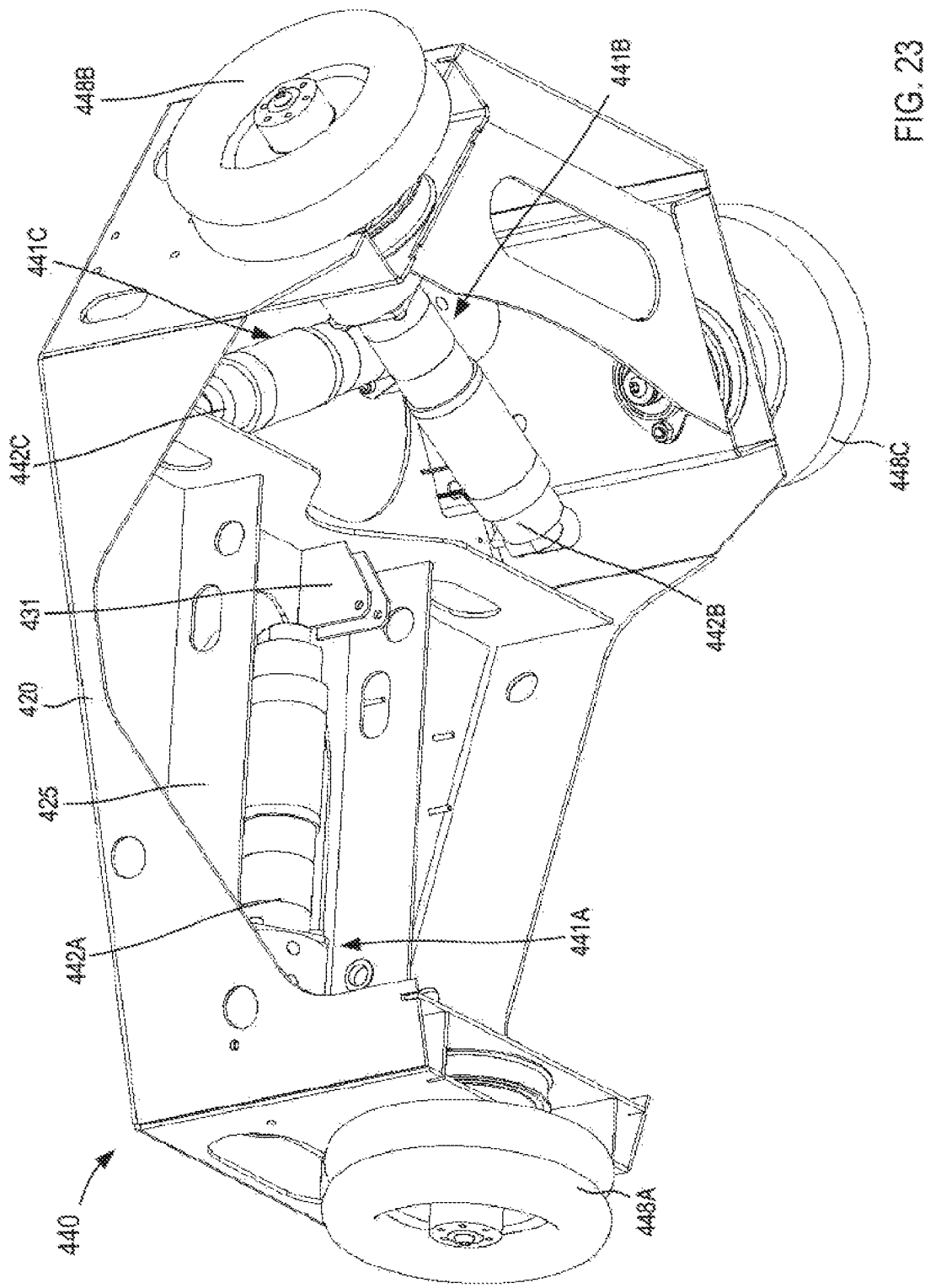
FIG. 23 is a bottom perspective view of the portion of the frame and the drive system of FIG. 21.
Figure 24:
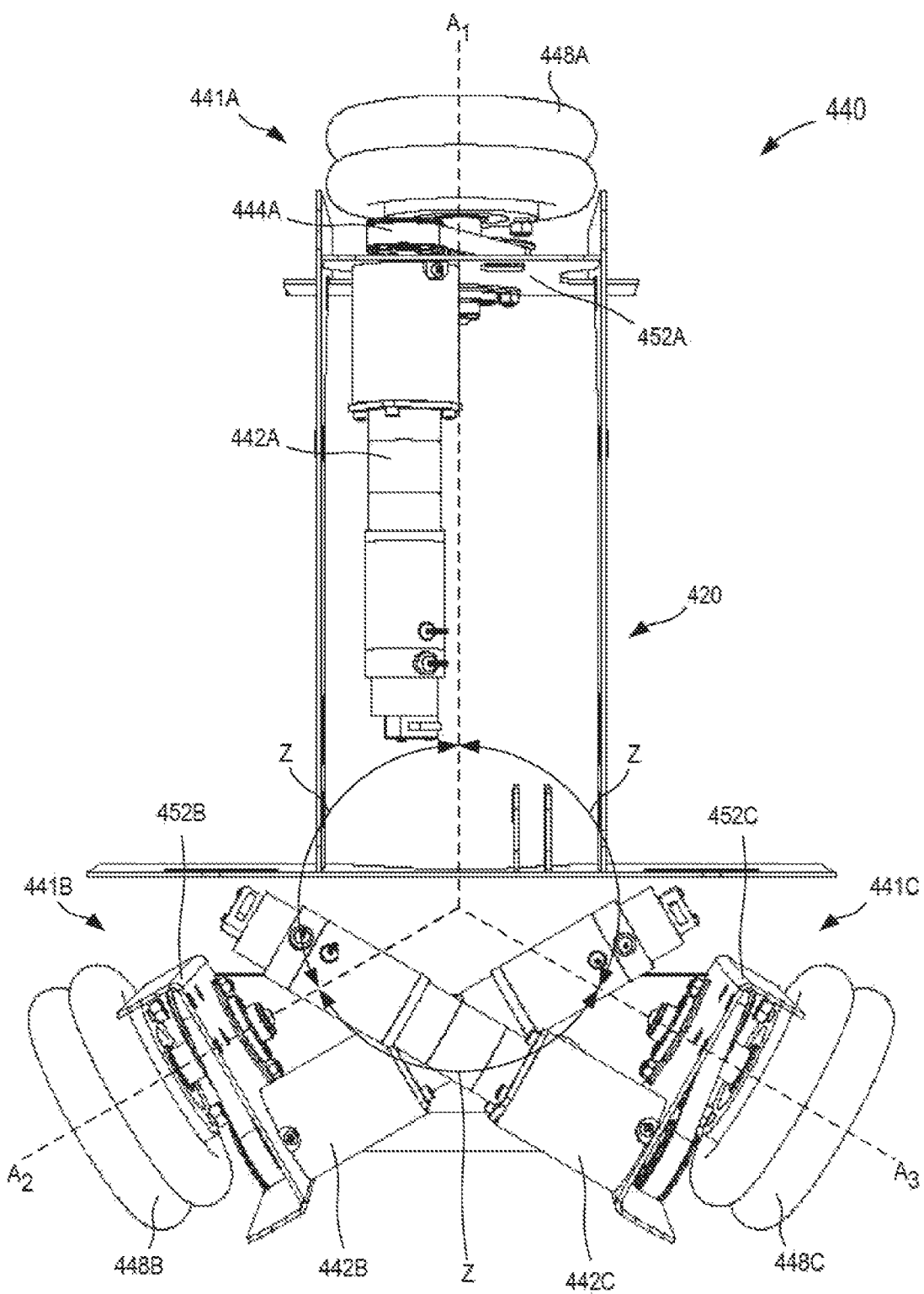
FIG. 24 is a top view of the drive system of FIG. 21.

As shown in FIGS. 22-24, the arrangement of the support portion 420 of the frame 410 and the drive system 440 is such that the drive mechanisms 441A, 441B, and 441C are disposed at a desired angle Z from one another. More specifically, the arrangement of the frame 410 and the drive system 440 can be such that a wheel 448A of the first drive mechanism 441A is configured to rotate about an axis $A_1$ that is disposed at the angle Z angle relative to an axis $A_2$ about which a wheel 448B of the second drive mechanism 441B rotates and relative to an axis $A_3$ about which a wheel 448C of the third drive mechanism 441C rotates. Similarly, the axis $A_2$ associated with the wheel 448B is disposed at the angle Z relative to the axis $A_3$ associated with the wheel $A_3$ (see e.g., FIG. 24). Moreover, in this embodiment, the arrangement of the drive system 240 is such that the angle Z is about 120 degrees. In other embodiments, the angle Z can be any other suitable angle.

Figure 25:
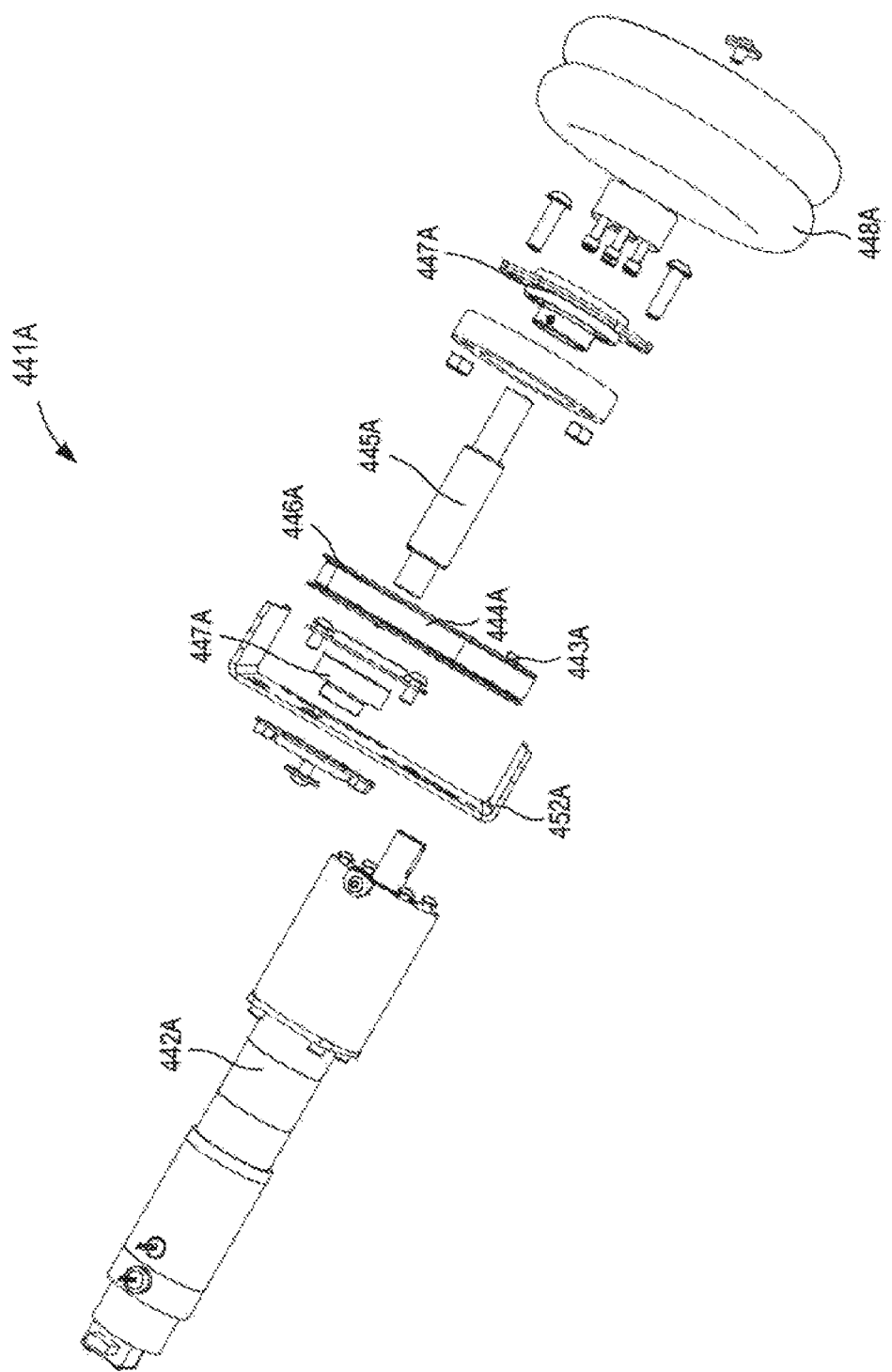
FIG. 25 is an exploded view of a drive mechanism included in the drive system of FIG. 21.

As shown in FIG. 25, the first drive mechanism 441A includes a motor 442A, an output pulley 443A, a drive shaft 445A, a drive pulley 446A, a set of bearings 447A, and the wheel 448A. The motor 442A of the first drive mechanism 441A is fixedly coupled to the first drive mechanism mount 452A and thus, fixedly coupled to the support portion 420 of the frame 410. The motor 442A includes and/or is otherwise coupled to the output pulley 443A. For example, the motor 442A can include an output shaft or the like to which the output pulley 443A is coupled. The drive pulley 446A is fixedly coupled to the drive shaft 445A. As shown in FIGS. 24 and 25, the drive pulley 446A is operatively coupled to the output pulley 443A via a belt 444A. Thus, the drive pulley 446A is configured to rotate in response to the motor 442A rotating the output pulley 443A.

The set of bearings 447A are configured to support the drive shaft 445A and to rotatably couple the drive shaft 445A to the first drive mechanism mount 452A. More particularly, the set of bearings 447A includes a first bearing 447A fixedly coupled to the first drive mechanism mount 452A and configured to receive a first end portion of the drive shaft 445A, and a second bearing 447A coupled to the wheel 448A (e.g., a wheel hub or the like not shown in FIGS. 18-28) and configured to receive a second end portion of the drive shaft 445A. As such, the set of bearings 447A can be configured to support the drive shaft 445A and can allow the drive shaft 445A to rotate relative to the first drive mechanism mount 452A. Conversely, the drive shaft 445A and/or the second bearing 447A can be coupled to the wheel 448A such that rotation of the drive shaft 445A results in an associated rotation of the wheel 448A. In this manner, the motor 442A can receive a flow of electric power that can cause the motor 442A to rotate the output pulley 443A, which in turn, results in an associated rotation of the wheel 448A.

Although not shown in FIGS. 18-28, the wheel 448A included in the first drive mechanism 441A can be substantially similar in form and function to the first wheel 248 with reference to FIG. 8. Specifically, the wheel 448A of the first drive mechanism 441A can be, for example, an omni-wheel, a mecanum wheel, and/or the like that defines a circumference and that includes a set of rollers (not shown in FIGS. 18-28) rotatably disposed along the circumference. In this manner, as the wheel 448A is rotated about its axis (e.g., associated with the drive shaft 445A), each roller disposed along the circumference of the wheel 448A can be configured to rotate about its associated axis, which can be at any suitable angle relative to the axis of rotation of the wheel 448A (e.g., at about 45 degrees, about 90 degrees, about 135 degrees, and/or any other suitable angle).

As described above, second drive mechanism 441B and the third drive mechanism 441C can be substantially similar in form and function to the first drive mechanism 441A. In this manner, a motor 442B of the second drive mechanism 441B can be configured to rotate the wheel 448B and a motor 442C of the third drive mechanism 441C can be configured to rotate the wheel 448C. The wheels 448B and 448C can be omni-wheels, mecanum wheels, and/or the like, as described above with reference to the wheel 448A of the first drive mechanism 441A. Moreover, as described above, the first drive mechanism 441A, the second drive mechanism 441B, and the third drive mechanism 441C are disposed, for example, at about 120 degree angles from each other. In this manner, the electronics system 490 can send signals to the drive mechanisms 441A, 441B, and 441C to drive the robot 400 in any suitable direction along the surface.

By way of example, in some instances, the electronics system 490 can execute a set of processes and/or the like to drive the robot 400 in a forward direction (e.g., perpendicular to the wheel 448A of the first drive mechanism 441A (see, for example, FIG. 24)). In such instances, the second drive mechanism 441B and the third drive mechanism 441C can receive substantially equivalent signals and/or a substantially equal amount of electric power from the electronics system 490 and, in response, to the motor 442B and the motor 442C, respectively, can rotate the wheels 448B and 448C, respectively, with substantially the same speed. Conversely, in such instances, the motor 442A of the first drive mechanism 441A does not receive signals and/or electric power from the electronics system 490. Thus, a force resulting from the rotation of the wheel 448B about its axis $A_2$ and the rotation of the wheel 448C about its axis $A_3$ at substantially the same speed results in a force in the direction of the axis $A_1$ associated with the first drive mechanism 441A. Moreover, with each of the wheels 448A, 448B, and 448C being omni-wheels, mecanum wheels, and/or the like, the resultant force can be such that the rollers of each of the wheels 448A, 448B, and 448C rotate about their associated axes. In this manner, the drive system 400 can move the robot 400 in a forward direction (e.g., parallel to and/or in the direction of the axis $A_1$ associated with the first drive mechanism 441A).

In other instances, the electronics system 490 can execute a set of processes and/or the like to drive the robot 400 in a direction other than the direction along the axis $A_1$. In such instances, the first drive mechanism 441A, the second drive mechanism 441B, and the third drive mechanism 441C can each receive an input from the electronics system 490 that can be, for example, specific to that drive mechanism 441A, 441B, and/or 441C (e.g., signals indicative of different instructions for each drive mechanism 441A, 441B, or 441C and/or different amounts of electric power for each drive mechanism 441A, 441B, or 441C). In response, the first drive mechanism 441A can rotate the wheel 448A about its axis $A_1$ with a desired rotational speed, the second drive mechanism 441B can rotate the wheel 448B about its axis $A_2$ with a desired rotational speed, and the third drive mechanism 441C can rotate the wheel 448B about its axis $A_3$ with a desired rotational speed. Thus, a resultant force associated with the rotation of the wheels 448A, 448B, and 448C can be in any suitable direction (e.g., a direction other than a direction parallel to one of the axes $A_1$, $A_2$, and/or $A_3$. With each of the wheels 448A, 448B, and 448C being omni-wheels, mecanum wheels, and/or the like, the resultant force can be such that the rollers of each of the wheels 448A, 448B, and 448C rotate about their associated axes. In this manner, the drive system 400 can move the robot 400 in any suitable direction by increasing or decreasing an output speed of the motors 442A, 442B, and/or 442C.

The cleaning assembly 465 included in the robot 400 can be any suitable shape, size, and/or configuration. As described above, the cleaning assembly 465 includes the mounting portion 479, which is coupled to the support structure 425 of the frame 410 (see e.g., FIGS. 21 and 22). In some embodiments, the mounting portion 479 of the cleaning assembly 465 can include any suitable linkage and/or mechanism configured to allow the cleaning assembly 465 to be moved relative to the frame 410 via an actuator 486, as shown in FIG. 22. More specifically, the actuator 486 can be coupled to an actuator mount 431 of the support structure 425 and the mounting portion 479 of the cleaning assembly 465. Thus, actuation of the actuator 486, for example, can reconfigure the mounting portion 479 of the cleaning assembly 465 (e.g., change an arrangement of any suitable linkage and/or the like included in the mounting portion 479). Thus, in some embodiments, the cleaning assembly 465 can be moved closer to or away from the frame 410, which in turn, can move the cleaning assembly 465 away from or closer to, respectively, a surface along which the robot 400 moves. For example, in some instances, the cleaning assembly 465 can be moved relative to the frame 410 to modulate and/or control an amount or pressure between a cleaning head and/or cleaning member of the cleaning assembly 465 and the surface. For example, in some instances, a pressure exerted by a cleaning head on a wood floor and/or the like (e.g., in a gym) may be less than a pressure exerted by the cleaning head on a concrete floor and/or the like (e.g., in a warehouse). In other embodiments, the amount of pressure can be modulated based on, for example, a determination of a soil level of the surface being cleaned (e.g., a higher pressure for very dirty floors).

Figure 26:
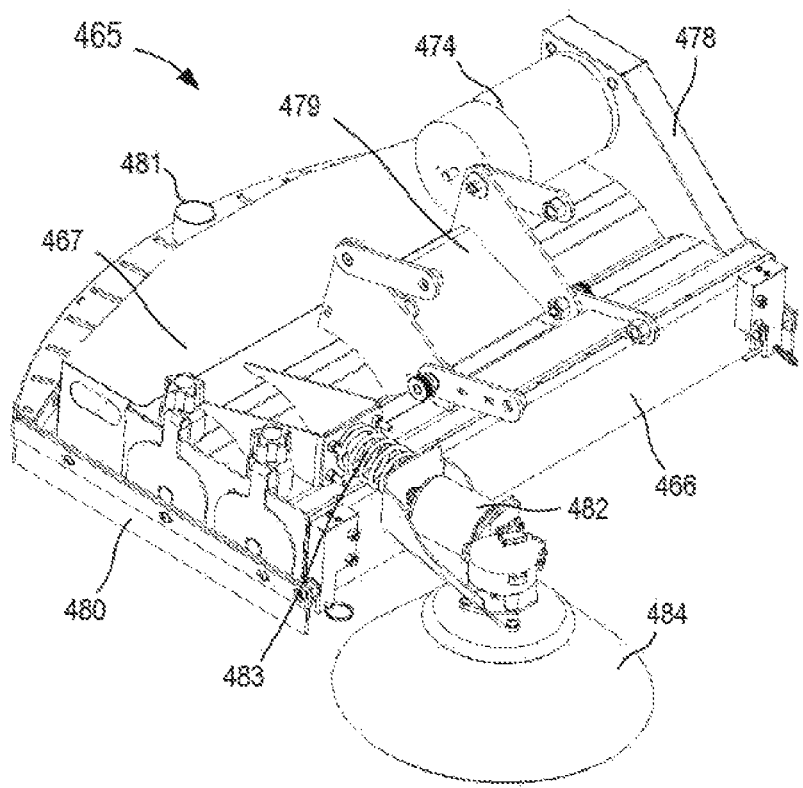
FIGS. 26 and 27 are a top perspective view and a bottom perspective view of the cleaning assembly of FIGS. 21 and 22.
Figure 27:
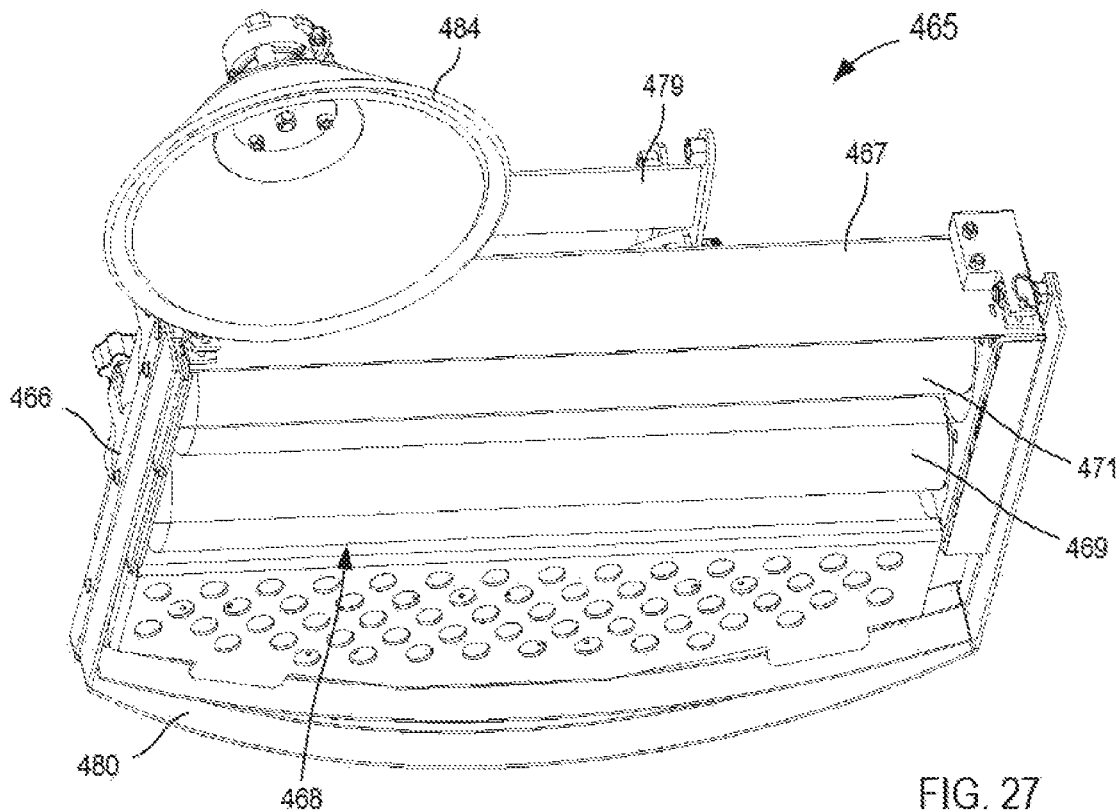
Figure 28:
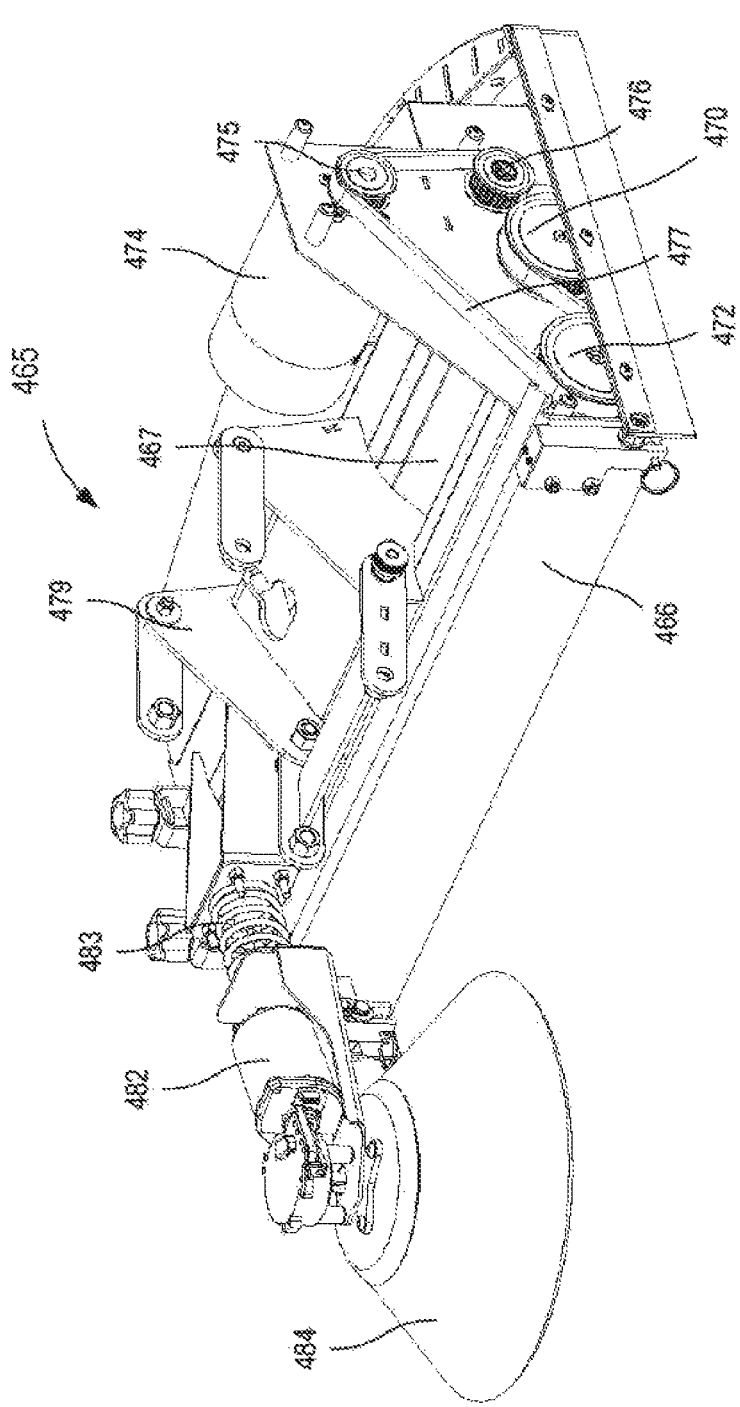
FIG. 28 is a perspective view of the cleaning assembly of FIGS. 21 and 22 with a shroud removed.

As shown in FIGS. 26-28, the cleaning assembly 465 includes frame 466, a cover 467, a shroud 478, a first brush 469, a second brush 471, a third brush 484, and a motor 474. The frame 466 can be configured to support at least a portion of the cleaning assembly 465. As shown in FIG. 26, the frame 466 includes and/or can be coupled to a skirt 480 that can extend from the frame 466 toward a surface to be cleaned. The cover 467 is coupled to the frame 466 and is configured to cover, house, and/or enclose at least a portion of the cleaning assembly 465. More particularly, the cover 467 can couple to the frame 466 to define an inner volume 468 that can house at least a portion of the first brush 469 and the second brush 471, as shown in FIG. 27. In some embodiments, at least a portion of the inner volume 468 can define, for example, a suction volume or the like within which a negative pressure can be formed to draw detritus into the cleaning assembly 465 and ultimately into a detritus volume or the like. For example, as described above, the robot 400 includes the vacuum source 485 that can be in communication with the inner volume 468 of the cleaning assembly 465 via, for example, a port 481 (see e.g., FIG. 26). In this manner, the vacuum source 485 can be configured to form a negative pressure differential within the inner volume 468 that can be operable in drawing detritus into the cleaning assembly 465.

The motor 474 of the cleaning assembly 465 can be any suitable motor configured, for example, to rotate the first brush 469 and the second brush 471. As shown in FIG. 28, the motor 474 includes an output 475 that can be operably coupled to a first pulley 470 fixedly coupled to the first brush 469, a second pulley 472 fixedly coupled to the second brush 471, and a tensioner pulley 476 via a belt 477. As such, the motor 474 can rotate the output pulley 475, which in turn, rotates the first pulley 470, the second pulley 472, and the tensioner pulley 476. Therefore, with the first pulley 470 fixedly coupled to the first brush 469 and with the second pulley 472 fixedly coupled to the second brush 471, the motor 474 can be configured to rotate the first brush 469 and the second brush 471. Moreover, as shown in FIG. 16, the shroud 478 can be configured to cover and/or house at least a portion of the output pulley 475, the first pulley 470, the second pulley 472, and the tensioner pulley 476.

In some embodiments, the arrangement of the cleaning assembly 465 can be such that the motor 474 rotates the first brush 469 and the second brush 471 in substantially the same rotational direction. In other embodiments, the motor 474 can be configured to rotate the first brush 469 in a first rotational direction and the second brush 471 in a second rotational direction, opposite the first rotational direction. In still other embodiments, the cleaning assembly 465 can include a first motor configured to rotate the first brush 469 and a second motor configured to rotate the second brush 471 independent of the first brush 469. In this manner, the first brush 469 and the second brush 471 can be rotated, for example, to sweep and/or scrub the surface to entrain debris and/or detritus within the inner volume 468. Moreover, a negative pressure produced by a vacuum source or the like (as described above) can draw the debris and/or detritus into a storage volume or the like (e.g., similar to the detritus volume 212 defined by the storage portion 211 of the frame 210 described above with reference to FIG. 4). Although the brushes 469 and 471 are shown in FIG. 27 as being substantially cylindrical, in other embodiments, the brushes 469 and 471 can be any suitable configuration. For example, in some embodiments, the brushes 469 and 471 can include a cylindrical base with any suitable number of brushes arranged in any suitable manner along the cylindrical base. In other embodiments, the brushes 469 and 471 can include any suitable number of cords, strings, robes, and/or other cleaning elements extending from the cylindrical base. In still other embodiments, the brushes 469 and 471 can be a disc and/or orbital brush and/or the like.

As described above, the cleaning assembly 465 includes a third brush 484. The third brush 484 can be any suitable cleaning member such as a disc and/or orbital brush. As shown in FIGS. 26-28, third brush 484 can be coupled to and/or otherwise supported by a support arm 482 coupled to the cover 467 and is disposed substantially outside of the inner volume 468 defined by the frame 466 and cover 467. Specifically, the support arm 482 extends from the cover 467 such that the third brush 484 is disposed forward of the frame 466. The support arm 484 can be any suitable configuration and/or support structure. For example, as shown in FIG. 26, the support arm 482 can include a spring 483 or the like configured to allow the third brush 484 to be flexibly coupled to the cover 467. For example, with the third brush 484 being disposed forward of the frame 410, the third brush 484 can be placed in to contact with objects which are not otherwise in contact with the cleaning assembly 465. As such, the arrangement of the spring 483 can be such that at least a portion of a force associated with the impact of the third brush 484 when placed in contact with the object compresses the spring 483. In other words, the spring 483 can be configured to absorb at least a portion of a force associated with the third brush 484 impacting an object. Although not shown in FIGS. 26-28, the third brush 484 can be coupled to a motor configured to rotate the third brush 484 in response to, for example, a signal received from the electronics system 490.

At least a portion of the cleaning assembly 465 can be in communication with the electronics system 490 and can be configured to send signals to and/or receive signals from the electronics system 490 associated with the operation of the cleaning assembly 465. For example, in some instances, the electronics system 490 can send a signal to the actuator 486 that can be operable in actuating the actuator 486 to move the cleaning assembly 465 relative to the frame 410, as described above. In some instances, the electronics system 490 can send a signal operable in transitioning the motor 474 between an "off" operational state and an "on" operational state, which in turn, can be operable in starting a rotation of the first brush 469 and the second brush 471, respectively. Similarly, the electronics system 490 can be configured to send a signal to the motor coupled to the third brush 484, which can be operable in starting or stopping a rotation of the third brush 484.

As described above, the electronics system 490 can be configured to control any suitable portion of the robot 400 using, for example, a feedback control method such as a PID control scheme and/or the like. For example, the electronics system 490 can include and/or can be in communication with one or more electric and/or electronic components such as any number of cameras, transceivers, beacons, encoders, odometers, tachometers, accelerometers, IMUS, proximity sensors, relay logics, switches, and/or the like (collectively referred to herein as "sensors"). In some embodiments, the electronics system 490 can include and/or can be in communication with any of the sensors described above. As such, the sensors can sense, detect, and/or otherwise determine one or more operating condition associated with the robot 400 and/or one or more environmental condition associated with the environment within which the robot 400 is disposed, as described in detail above.

Expanding further, in this embodiment, the electronics system 490 includes and/or is in communication with at least the user interface 492, the cameras 493, and the laser transceiver 494. Although not shown in FIGS. 18-28, the electronics system 490 can also include and/or can be in communication with one or more encoders, odometers, accelerometers, and/or IMUS included in the drive system 440. Similarly, the electronics system 490 can include and/or be in communication with any suitable kill switch device and/or safety device or mechanism, which can be operable in powering down or off the robot 400 when a criteria associated with a potential safety hazard is satisfied. The laser transceivers 494, for example, can be a light-radar (LIDAR) and can be configured to emit a laser beam (e.g., visible light, infrared light, and/or the like) and configured to sense and/or otherwise determine an amount of reflection, refraction, dissipation, and/or the like associated with the emitted laser beam. As such, the laser transceiver 494 can be configured to sense a relative position of objects within an environment and/or the like, as described in detail above with reference to the robot 200 in FIGS. 2-8.

The electronics system 490 can be implemented in any suitable device and/or assembly. For example, the electronics system 490 can include a PCB with at least a processor in communication with a memory. In this manner, the processor can be configured to execute a set of instructions, code, and/or modules (e.g., stored in the memory). In some embodiments, the user interface 492 of the electronics system 490 can be, for example, a tablet or the like. In such embodiments, at least a portion of the electronics system 490 can be implemented in the user interface 492. By way of example, in some embodiments, the user interface 492 (i.e., tablet) can include a processor, a memory, an input/output (I/O) interface, and/or the like. As such, the processor can be configured to execute a set of instructions or code stored in the memory and can send and/or receive signals to any suitable electric and/or electronic component included in the robot 400. In some embodiments, the user interface 492 can implement, for example, a feedback control system or the like, in which the user interface 492 can receive signals from any suitable sensor or the like (e.g., including the laser transceiver 494, the cameras 493, and/or any other sensor described herein), and can execute a set of instructions and/or code associated with defining one or more subsequent actions for any suitable electric and/or electronic component included in the robot. In some embodiments, the user interface 492 can execute a control scheme such as a PID control and/or the like. In other embodiments, the user interface 492 can allow a user to manually operate and/or manage the robot 400. In still other embodiments, the electronics system 490 can be implemented in any other suitable hardware, which can be in communication with the user interface 492. For example, in some embodiments, the user interface 492 is a display or the like configured to present data based on one or more signals received, for example, from a processor. In some embodiments, the user interface 492 can be a tablet configured to communicate with a remote electronic device such as a personal computer or mobile electronic device (e.g., smartphone) via a wired or wireless network and/or the Internet. Moreover, in some instances, the user interface 492 can be removable from the robot 200 while remaining in communication with the remaining portions of the robot 200.

As described in detail above with reference to the robot 200, the electronics system 490 can receive signals associated with one or more operating conditions from the cameras 493, the laser transceiver 494, and/or any other suitable sensor (not shown in FIGS. 18-28). In turn, the electronics system 490 can execute a set of instructions, code, modules, etc. associated with controlling one or more subsequent action of the drive system 440 and/or the cleaning assembly 465, based at least in part on the data received from the sensors. The electronics system 490 can then send signals indicative of instructions to perform the one or more subsequent action to an associated electric and/or electronic component (e.g., the actuator 486 coupled between the frame 410 and the cleaning assembly 465, a pump such as the vacuum source 485, a motor such as the motors 442A, 442B, and 442C of the drive system 440, the motor 474 of the cleaning assembly 465, and/or any other suitable device).

For example, in some instances, the laser transceiver 494 can sense proximity between a portion of the robot 400 and an object, and can send signals associated therewith to the electronics system 490. Based at least in part on a predetermined criteria and/or threshold associated with the proximity data (e.g., stored in the memory or the like), the electronics system 490 (e.g., a processor included therein) can perform and/or execute one or more processes and/or modules operable in determining a subsequent action of at least a portion of the robot 400 (as described in detail above with reference to the robot 200). Similarly, the cameras 493 can capture image and/or video data and can send the data to the electronics system 490. The cameras 493 can be, for example, Kinect v2 cameras, as described above. In some embodiments, the camera 493 can capture discrete pictures and/or can continuously record a video stream, which can include data used by the electronics system 490 to determine a relative position of the robot 400, object recognition and/or verification, real time monitoring, tracking, and/or the like. In some instances, the electronics system 490 can receive imaging data from the cameras 493 and can execute a set of processes to present the imaging data on the user interface 492. In other instances, the electronics system 490 can be configured to send a signal associated with the imaging data to a remote electronic device via a network or the like. In some instances, the camera 493 can capture video data while the robot 400 is operating and can store the video data, which can be later reviewed by a user to verify completion and/or functioning of the robot 400 (e.g., via the user interface 492 and/or the remote electronic device). In this manner, the electronics system 490 can receive signals from any suitable sensor or the like and can control the robot 400 in at least a semi-autonomous manner, as described in detail above with reference to the robot 200 illustrated in FIGS. 2-8. Thus, the control processes and/or the like are not described in further detail herein.

FIGS. 29-40 illustrate a device 500 such as, for example, a robot configured to clean a surface according to another embodiment. The device 500 (also referred to herein as "cleaning robot" or "robot") includes at least a frame 510, a drive system 540, an electronics system 590, and a cleaning assembly 565. The cleaning robot 500 can be used to clean (e.g., vacuum, scrub, disinfect, etc.) any suitable surface area such as, for example, a floor of a home, commercial building, warehouse, etc. The robot 500 can be any suitable shape, size, or configuration and can include one or more systems, mechanisms, assemblies, or subassemblies that can perform any suitable function associated with, for example, traveling along a surface, mapping a surface, cleaning a surface, and/or the like. Moreover, portions of the robot 500 can be similar in at least form and/or function to associated portions of the robots 100, 200, 300, and/or 400 and thus, similar portions are not described in further herein.

The frame 510 of the robot 500 can be any suitable shape, size, and/or configuration. For example, in some embodiments, the frame 510 can include a set of components or the like, which are coupled to form a support structure configured to support the drive system 540, the cleaning assembly 565, and the electronic system 590. More particularly, in this embodiment, the frame 510 includes an upper storage portion 508 (see e.g., FIGS. 29-32), a lower storage portion 536 (see e.g., FIGS. 29-32), an electronics storage portion 517, and a support portion 520 (see e.g., FIGS. 33-36). As described above with reference to the frame 410 of the robot 400, the frame 510 can include any suitable components such as, for example, sheets, tubes, rods, bars, etc. For example, in the embodiment shown in FIGS. 29-40, the frame 510 includes a handle 505 configured to be engaged by a user during initialization and/or manual use of the robot 500. In other embodiments, the frame 510 does not include the handle 505. In some embodiments, the frame 510 can include and/or can support a body or the like configured to enclose at least a portion of the robot 500. For example, in this embodiment, the upper storage portion 508 and the lower storage portion 536 collectively form at least a portion of a body of the robot 500.

The electronics storage portion 517 (see e.g., FIG. 30) is configured to receive at least a portion of the electronics system 590. More specifically, the electronics storage portion 517 of the frame 510 can include a set of walls configured to at least temporarily isolate at least the portion of the electronics system 590. Although not shown, the electronics storage portion 517 can include one or more removable portions, which can be moved relative to and/or can be removed from the frame 510 to access to the electronics system 590 contained therein.

Figure 31:
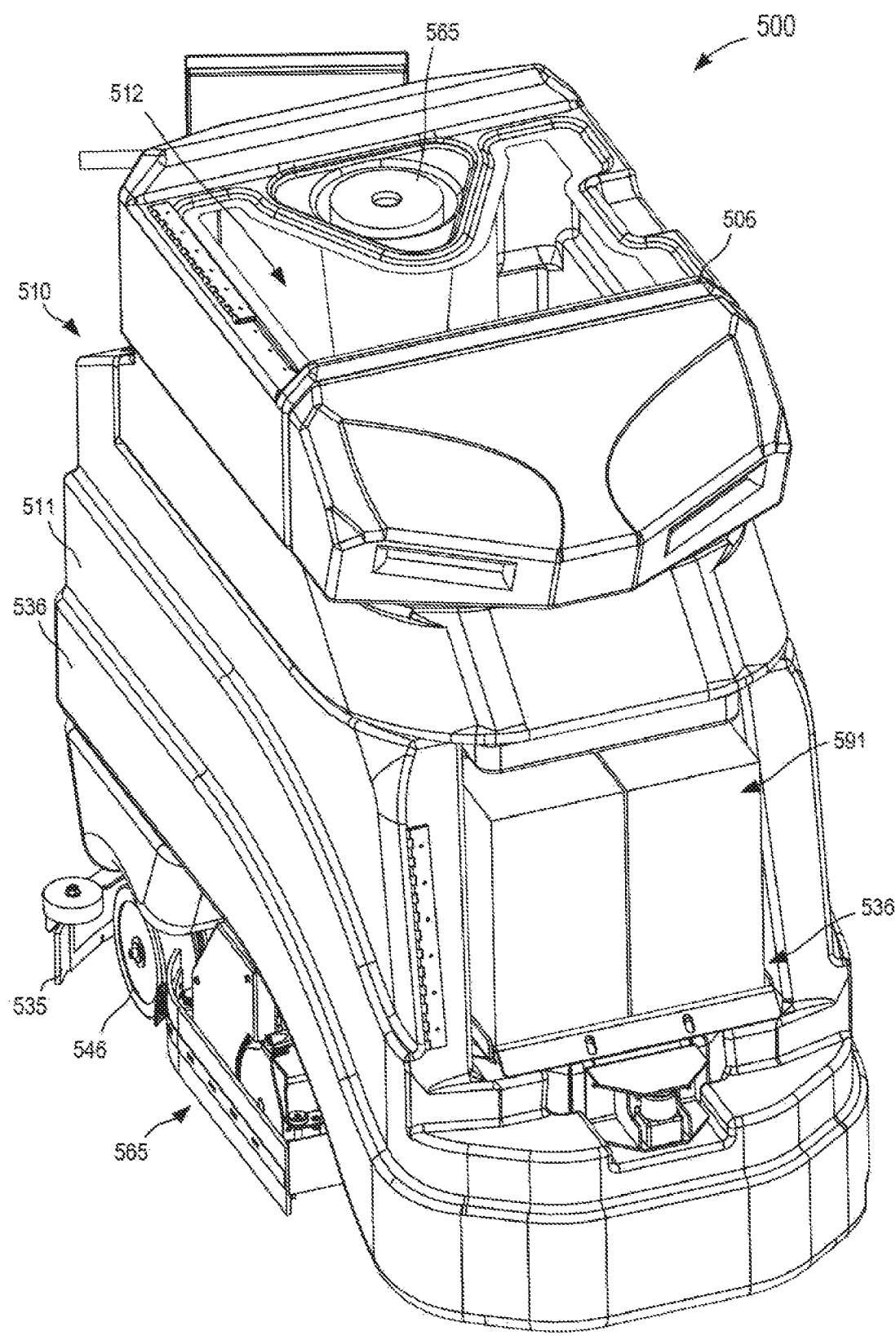
FIG. 31 is a top perspective view of the semi-autonomous robot of FIG. 29 with one or more lids removed.
Figure 32:
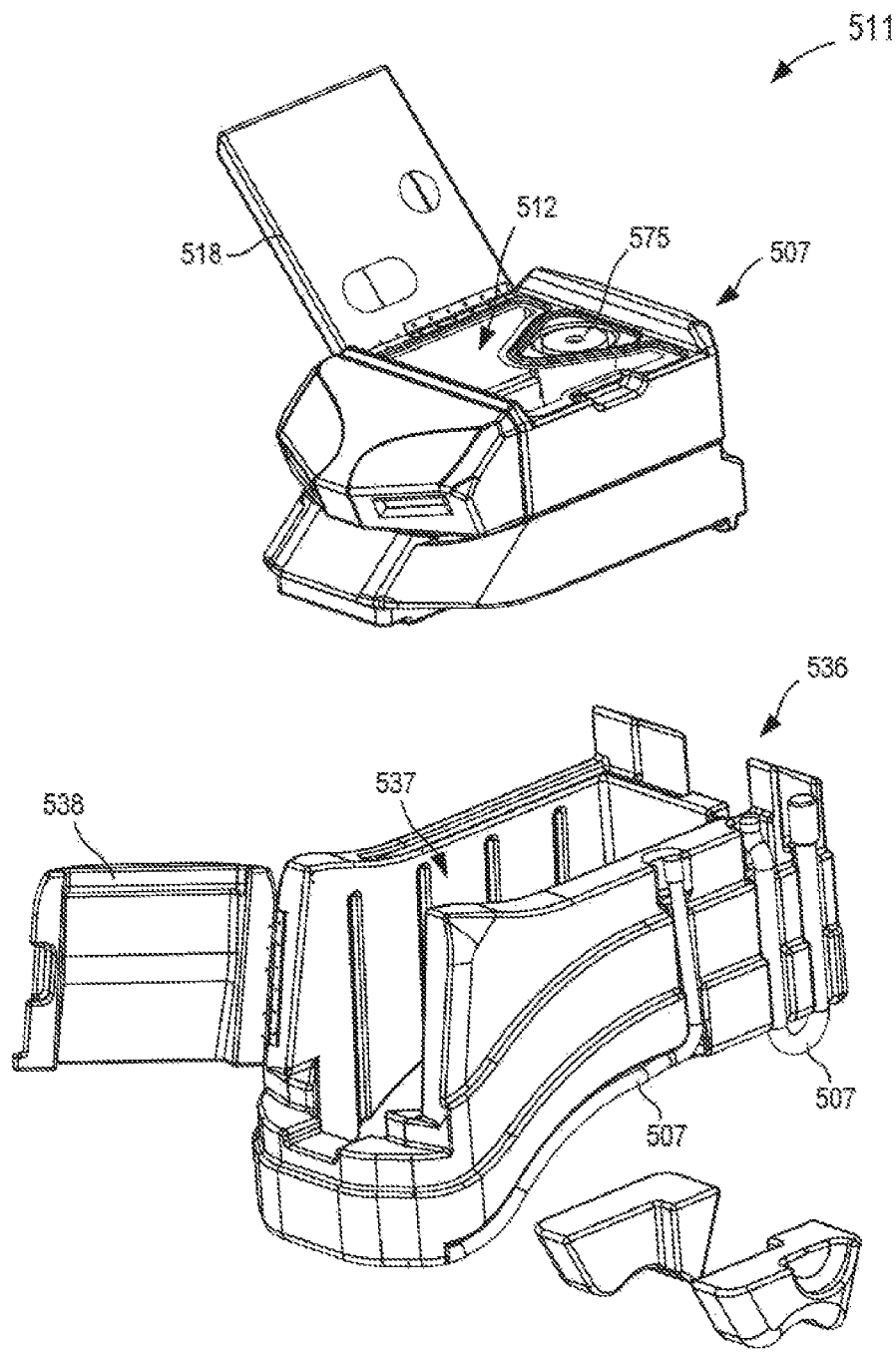
FIG. 32 is a partial exploded view of a portion of a frame included in the semi-autonomous robot of FIG. 29.

As shown in FIGS. 31 and 32, the upper storage portion 508 of the frame 510 can include a set of components configured to define a detritus cavity 512. The detritus cavity 512 can be any suitable shape, size, or configuration. Although not shown, the frame 510 and/or the body of the robot 500 can define an opening configured to place the detritus cavity 512 in fluid communication with the cleaning assembly 565, as described in further detail herein. The detritus cavity 512 can store and/or house a vacuum source 585 that can be configured to generate a negative pressure differential within the detritus cavity 512, which in turn, can result in a suction force exerted on and/or within the cleaning assembly 565. Thus, the cleaning assembly 565 can transfer refuse, detritus, fluid, and/or the like from the surface on which the robot 500 is moving to the detritus cavity 512. Moreover, the upper storage portion 508 includes and/or is coupled to a cover or lid 518 configured to substantially close off the detritus cavity 512 when the cover or lid 518 is in a closed configuration (see e.g., FIG. 29). In some embodiments, the upper storage portion 508 of the frame 510 and/or the detritus cavity 512 can be substantially similar in form and/or function to at least a portion of the storage portion 411 and/or the detritus cavity 412, respectively, described above with reference to the robot 400. Thus, the upper storage portion 508 is not described in further detail herein.

The lower storage portion 536 can include a set of components configured to define one or more cavities and/or storage compartments. For example, as shown in FIGS. 31 and 32, the lower storage portion 536 defines at least a battery cavity 537 configured to receive, store, and/or otherwise enclose one or more batteries 591 of the robot 500. As described above with reference to the upper storage portion 508, the lower storage portion 536 includes a cover or lid 538 configured to substantially close off, isolate, and/or cover the battery cavity 537 when in a closed configuration (see e.g., FIG. 29). Although not shown, the lower storage portion 536 can also contain and/or define one or more storage compartments configured to store a liquid such as a cleaning solution and/or a waste fluid (e.g., a used volume of the cleaning solution). Moreover, while not shown, the lower storage portion 536 can include any suitable tube, pipe, conduit, channel, opening, plumbing, etc. configured to establish fluid communication between the lower storage portion 536 and the cleaning assembly 565 such that fluid (e.g., a liquid such as a cleaning solution) can be transferred therebetween. In some embodiments, a pump can be disposed within the lower storage portion 536 and/or between the lower storage portion 536 and the cleaning assembly 565 to urge a volume of liquid to flow therebetween.

Figure 33:
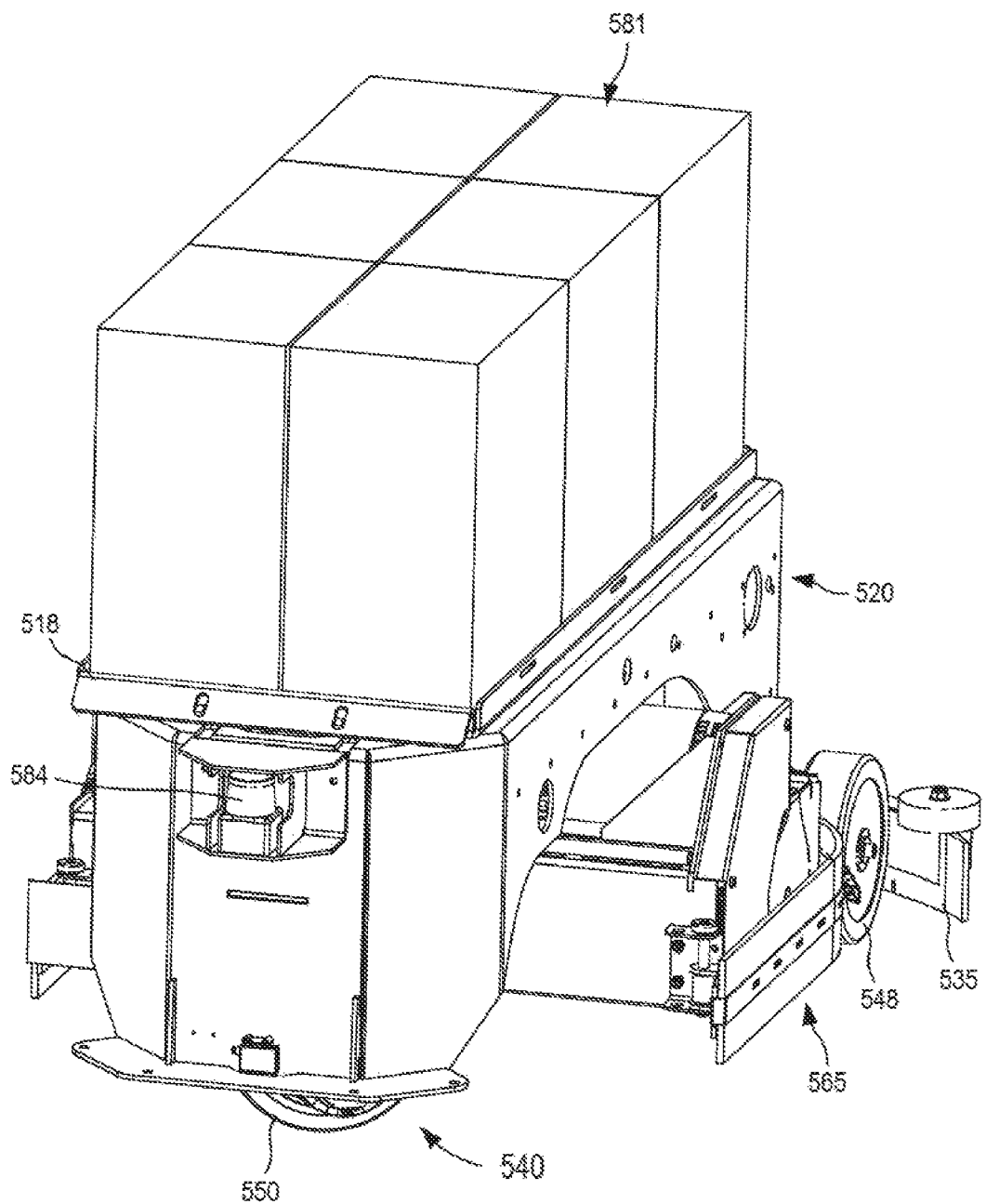
FIG. 33 is a perspective view of a portion of the frame, a drive system, and a cleaning assembly included in the semi-autonomous robot of FIG. 29.
Figure 34:
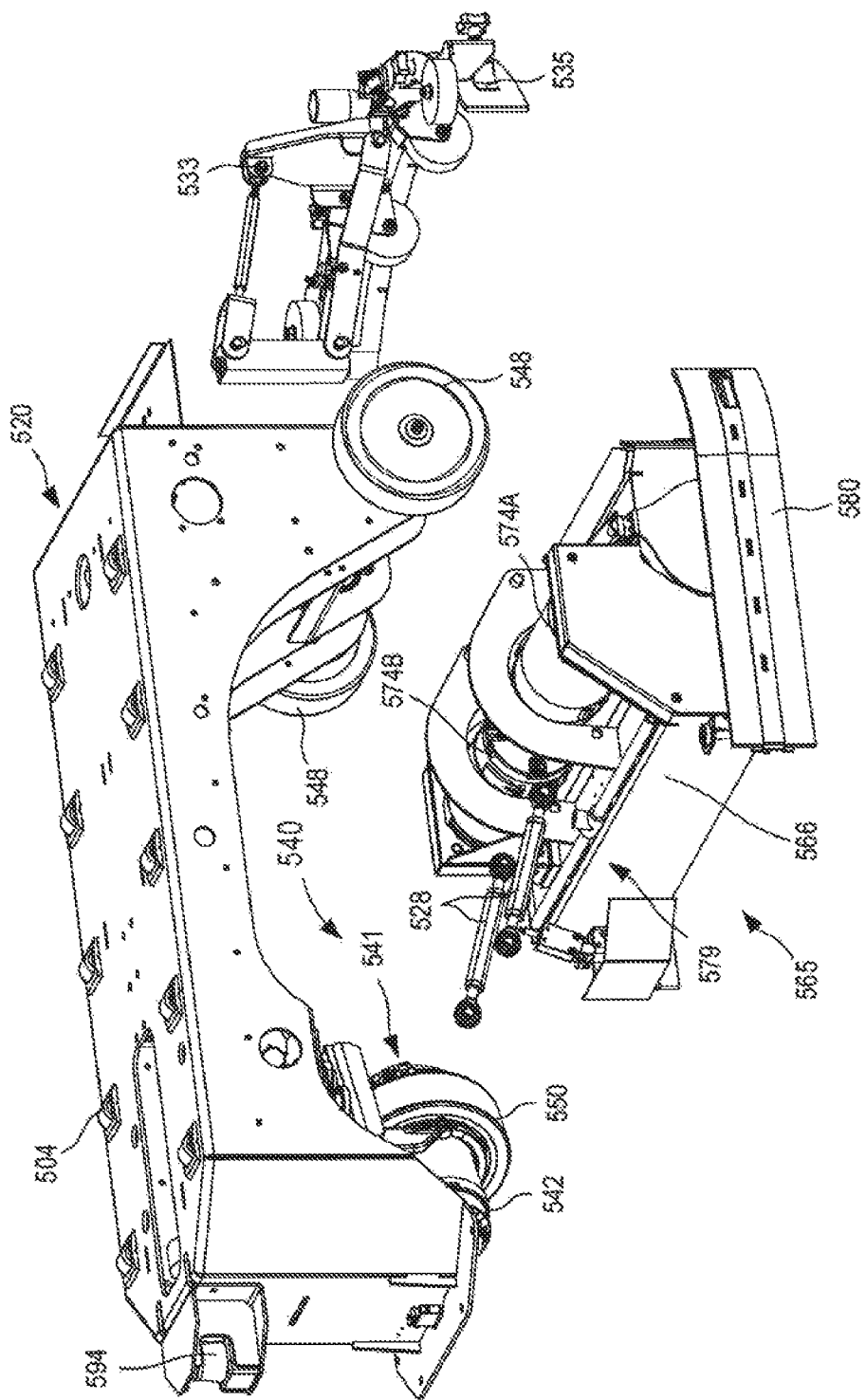
FIG. 34 is a partial exploded view of the portion of the frame, the drive system, and the cleaning assembly of FIG. 33.

The support portion 520 can include any suitable component, part, mechanism, linkage, and/or the like configured to support, for example, the storage portion 511 of the frame 510, the drive system 540, and/or the cleaning assembly 565. For example, in the embodiment shown in FIGS. 33-36, the support portion 520 includes a top plate 521 and a support structure 525. The top plate 521 can be coupled to the storage portion 511 of the frame 510 to couple the support portion 520 thereto. As shown in FIG. 33 the top plate 521 also can be coupled to and/or can otherwise support a battery tray 518, which in turn, supports the set of batteries 591. As shown in FIG. 34, the top plate 521 can include and/or can be coupled to a set of bumpers 504 (e.g., dampers, cushions, springs, etc.) configured to provide shock absorption and/or dispersion of a force otherwise transferred from the top plate 521 to the battery tray 518. In some embodiments, the lower storage portion 536 can be coupled to the battery tray 518 and, as such, the arrangement of the bumpers 504 or the like can reduce an amount of force and/or shock otherwise transferred by the top plate 521 on the lower storage portion 536. In addition, the top plate 521 can be configured to support and/or couple to a laser transceiver 594 and/or any other suitable sensor, and/or transceiver included in the electronics system 590 (see e.g., FIGS. 33-35).

Figure 35:
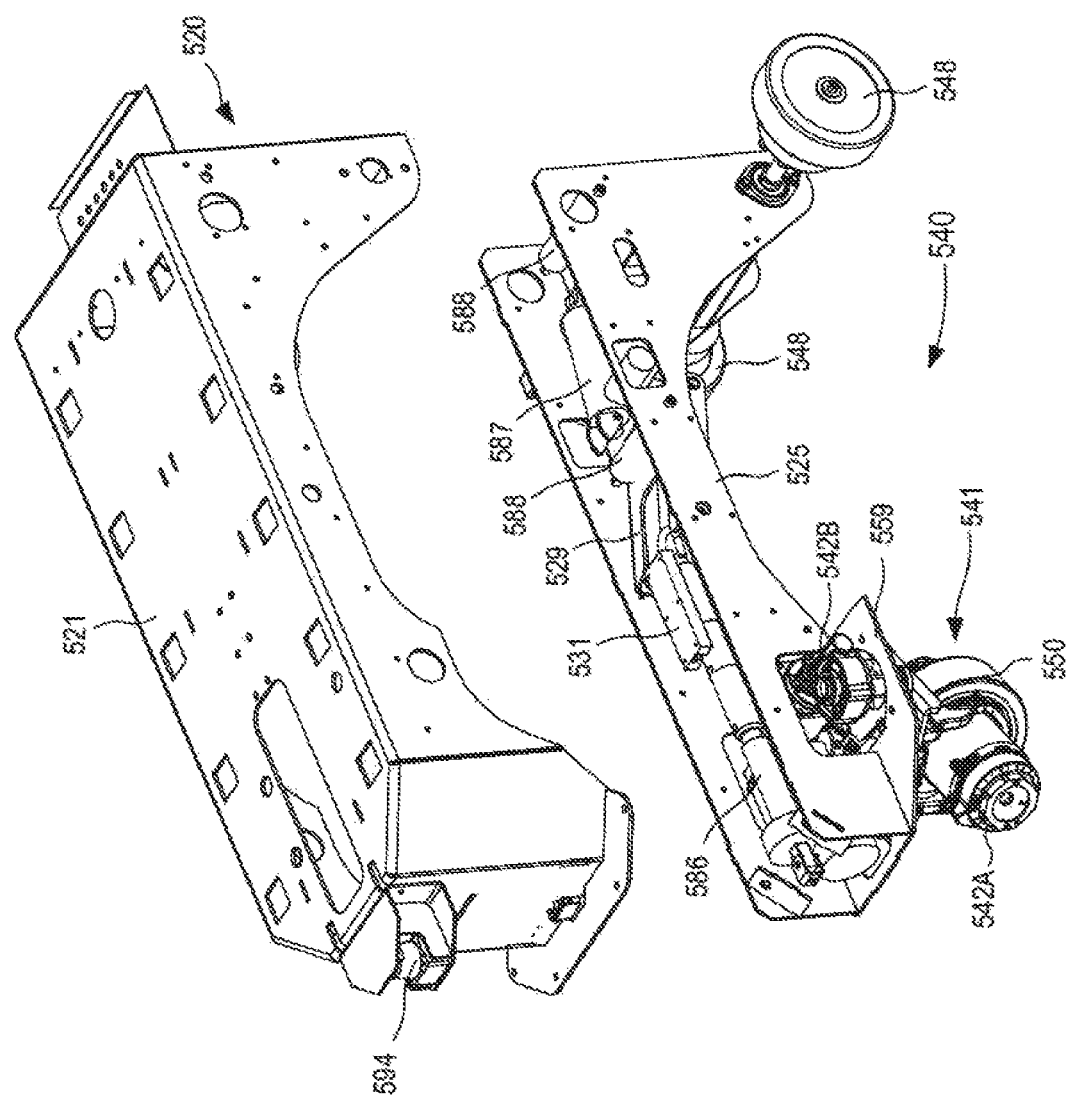
FIG. 35 is a partial exploded view of the portion of the frame and the drive system of FIG. 33.

The support structure 525 can include any suitable component configured to support at least a portion of the drive system 540, the cleaning assembly 565, and/or a rear skirt assembly 535. For example, as shown in FIG. 35, the support structure 525 is coupled (e.g., mechanically coupled via one or more fasteners, welded and/or otherwise joined, etc.) to a support plate 559, which in turn, is coupled to a drive mechanism 541 of the drive system 540. In addition, the support structure 525 is operably coupled to a set of wheels 548 of the drive system 540 via one or more bearings, axels, hubs, etc. As such, the support structure 525 is configured to support the drive system 540, thereby coupling the drive system 540 to the frame 510.

Similarly, the support structure 525 can be coupled to any suitable structure, component, device, etc. configured to couple the support structure 525 to the cleaning assembly 565. For example, the support structure 525 is coupled to at least a set of linkage 528 and a pivot member 529 configured to movably couple the cleaning assembly 565 to the support structure 525. For example, the linkage 528 and the pivot member 529 each can be coupled to a mounting portion 579 of the cleaning assembly 565 to allow the cleaning assembly 565 to be moved closer to or away from the surface in response to an actuation of, for example, a first actuator 586, as described in further detail herein.

Figure 36:
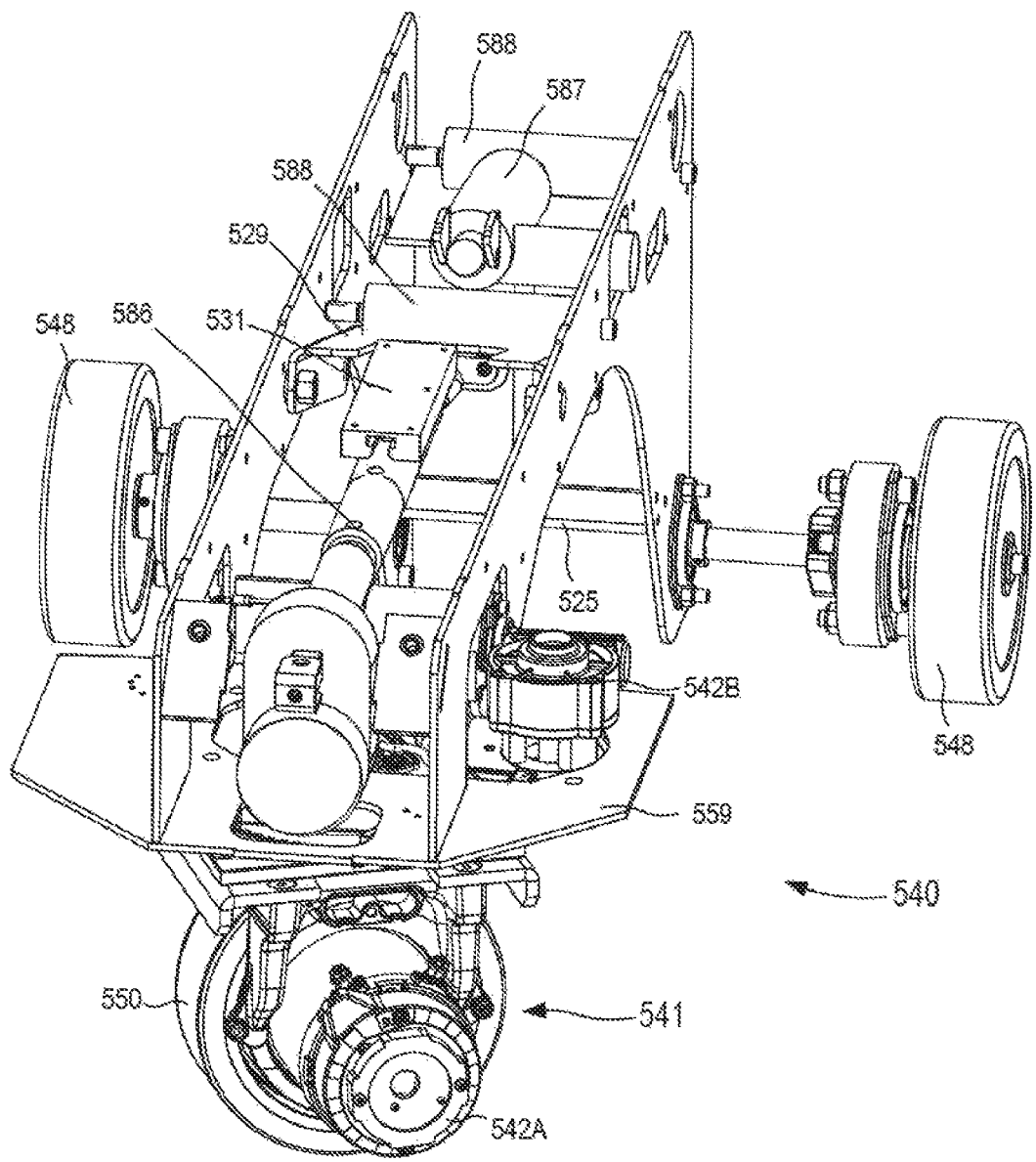
FIG. 36 is a front perspective view of a portion of the frame and the drive system of FIG. 33.

As shown in FIGS. 35 and 36, the support structure 525 is also coupled to a second actuator 587 and a set of rollers 588. The second actuator 586 is configured to couple to a coupling portion 534 of the rear skirt 535. In this manner, the second actuator 586 can be actuated to move the rear skirt 535 closer to or further from the surface being cleaned. In this manner, the rear skirt 535 can engage the surface along which the robot 500 travels to reduce an amount of debris not entrained in the cleaning assembly 565. The rollers 588 are configured to support, for example, one or more wires, hoses, conduits, tubes, etc. running along a length of the support structure 525. In some instances, the arrangement and/or use of the rollers 588 can prevent damage to the wires and/or damage or kinking of the hoses, etc. when the cleaning assembly 565 is moved closer to or further from the surface being cleaned.

Figure 37:
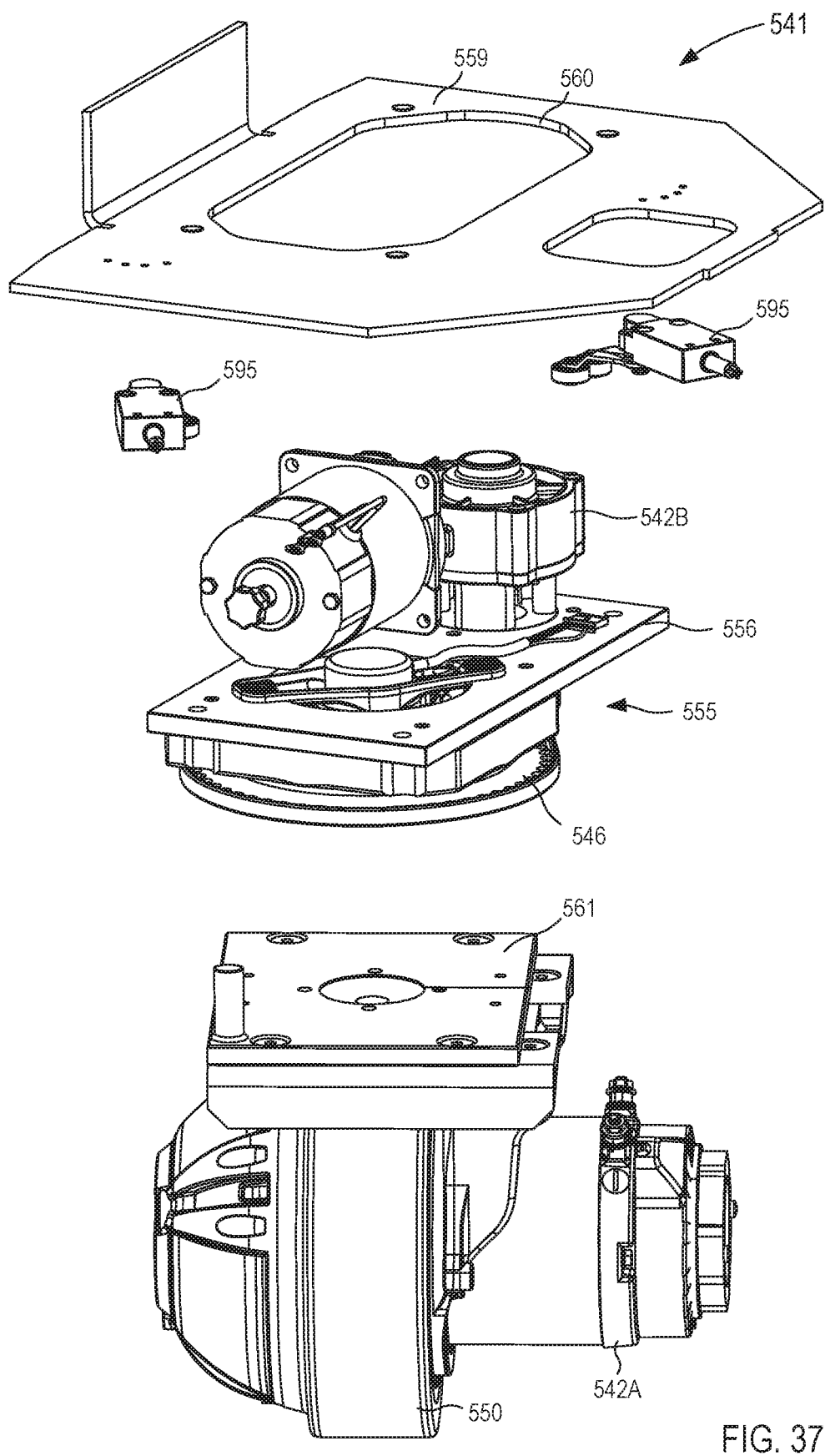
FIG. 37 is a partial exploded view of a drive mechanism included in the drive system of FIG. 33.

As shown in FIGS. 35-37, the drive system 540 can be any suitable system, mechanism, machine, assembly, etc. coupled to the support portion 520 (e.g., the support structure 525) and configured to move the robot 500 along a surface. For example, in this embodiment, the drive system 540 includes a drive mechanism 541 having a single steerable wheel and any suitable number of passive wheels 548 (as described above with reference to the robot and 300). The wheels 548 can be coupled to the support structure 525 in any suitable manner. For example, as described above, the wheels 548 can be coupled to the support structure 525 via one or more bearings, axles, hubs, bushings, etc. While described as being passive wheels, in other embodiments, the wheels 548 can include and/or can be at least operably coupled to one or more motors. In addition, though not shown in FIGS. 35-37, the wheels 37 can be coupled to any suitable sensor or encoder such as those described herein.

As shown in FIG. 37, the drive mechanism 541 is coupled to the support plate 559, which in turn, couples the drive mechanism 541 to the frame 510. The drive mechanism 541 includes a first motor 542A, a second motor 542B, a rotation subassembly 555, a coupling plate 561, a wheel 550, and one or more sensors 595. The wheel 550 and the first motor 542A are each coupled to the coupling plate 561, which in turn, is fixedly coupled to a portion of the rotation subassembly 555, as described in further detail herein). More specifically, the first motor 542A is fixedly coupled to the coupling plate 561 and the wheel 550 is rotatably coupled to the coupling plate 561 and in contact with, for example, an output of the first motor 542A such that rotation of the output of the first motor 542A results in a rotation of the wheel 550 relative to the coupling plate 561. The arrangement of the wheel 550 and the first motor 542A is such that the first motor 542A rotates the wheel 550 about an axis that is substantially parallel to the surface along which the robot 500 moves. Said another way, the wheel 550 is configured to rotate about a substantially horizontal axis in response to an output of the first motor 542A.

The rotation subassembly 555 is coupled to the coupling plate 561 and to the support plate 559, which in turn, rotatably couples at least a portion of the drive mechanism 541 to the support structure 525 of the frame 510. More specifically, the rotation subassembly 555 includes a mounting plate 556 that is coupled to the second motor 542B and rotatably coupled to an output member 546 of the second motor 542B (e.g., a gear, sprocket, pulley, etc. that is rotatably coupled to the mounting plate 556 via one or more bearings or the like). The output member 546 can be, for example, a direct output from the second motor 542B or can be operably coupled to an output of the second motor 542B via, for example, a belt or chain. For example, in some embodiments, an output of the second motor 542B can be coupled to a gear having a first diameter, which in turn, is operably couple to the output member 546 via a drive chain. In such an example, the output member 546 can have a second diameter that is greater than the first diameter such that one full rotation of the output of the second motor 542B results in less than one full rotation of the output member 546. In other words, the output of the second motor 542B and the output member 546 can be arranged to have any suitable gear ratio and/or the like such that a rotation of the output of the second motor 542B results in a rotation of the output member 546 with a desired rotational velocity and/or torque. In some instances, the one or more sensors 595 can be configured to sense a velocity of the output member 546 and/or a fault condition such as, for example, a snapping or slipping of a belt or chain. Moreover, the arrangement of the drive mechanism 541 is such that the output member 546 rotates about an axis that is substantially perpendicular to the surface along which the robot 500 moves. Said another way, the output member 546 is configured to rotate about a substantially vertical axis in response to an output of the second motor 542B.

The output member 546 is fixedly coupled to the coupling plate 561, which in turn couples the wheel 550 and the first motor 542A to the rotation subassembly 555. The arrangement of the output member 546 and the coupling plate 561 is such that when the output member 546 is rotated, in response to an output of the second motor 542B, the coupling plate 561 and thus, the wheel 550 and the first motor 542A are similarly, rotated. As such, the wheel 550 is configured to rotate about the first axis (e.g., substantially parallel to the surface) and the second axis (e.g., substantially perpendicular to the surface). In some embodiments, the rotation of the wheel 550 about the first axis advances the robot 500 along the surface or reverses the robot 500 along the surface, while the rotation of the wheel 550 about the second axis is operable in steering the robot 500 in a desired direction. Thus, the first motor 542A and the second motor 542B each can receive a signal and/or a flow of electric power, which is operable in moving the robot 500 along the surface in a desired direction and with a desired speed, as described in further detail herein. In some embodiments, the use of the drive mechanism 541 having the single steerable wheel 550 can, for example, reduce a turning radius of the robot 500, which in some instances, can allow the robot 500 to access tight spaces or the like, as described above.

The cleaning assembly 565 included in the robot 500 can be any suitable shape, size, and/or configuration. As described above, the cleaning assembly 565 includes the mounting portion 579, which is coupled to the support structure 525 of the frame 510 (see e.g., FIGS. 33 and 34). For example, the mounting portion 579 of the cleaning assembly 565 is coupled to the linkage 528 and the pivot member 529 for pivoting motion. More specifically, the first actuator 586 is coupled to the top plate 521 of the support portion 520 of the frame 510 and a portion of the pivot member 529 such that an actuation of the first actuator 586 results in a pivoting motion of the pivot member 529 relative to the frame 510. With the pivot member 529 coupled to the mounting portion 579 of the cleaning assembly 565, the pivoting motion of the pivot member 529 results in a pivoting of the cleaning assembly 565. The linkage 528 coupled to the mounting portion 579 are configured to control a direction and/or range of motion associated with the pivoting of the cleaning assembly 565 relative to the frame 510. For example, the linkage 528 can be, for example, substantially rigid elongate members having a fixed length (e.g., a fixed length during use but otherwise an adjustable length). Thus, with the linkage 528 and the pivot member 529 coupled to the mounting portion 579 at different positions (see e.g., FIG. 34), the actuation of the first actuator 586 results in a movement of the cleaning assembly 565 closer to or away from the surface to be cleaned, as described in detail above with reference to, for example, the robot 400.

Figure 38:
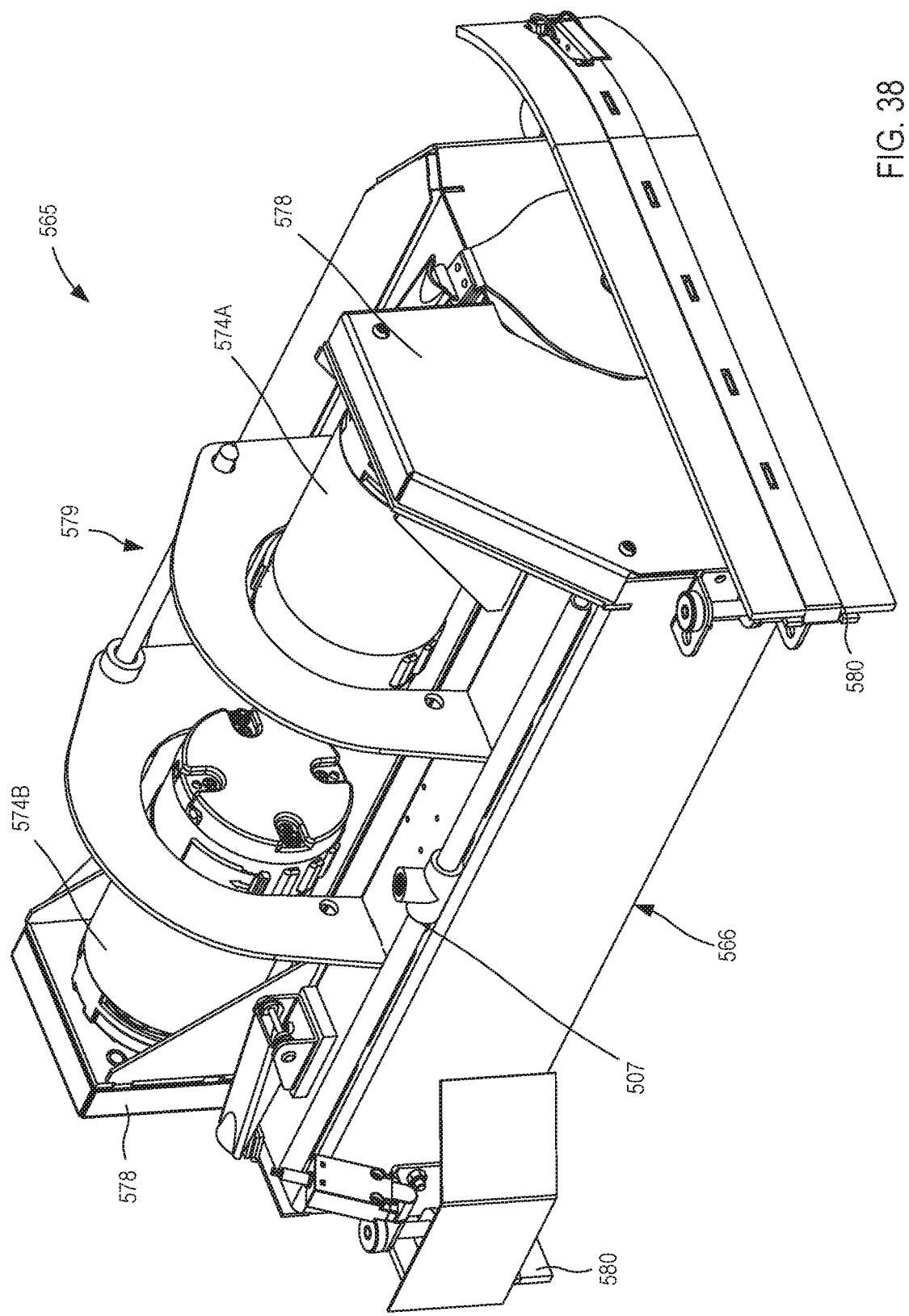
FIG. 38 is a rear perspective view of the cleaning assembly of FIG. 33.
Figure 39:
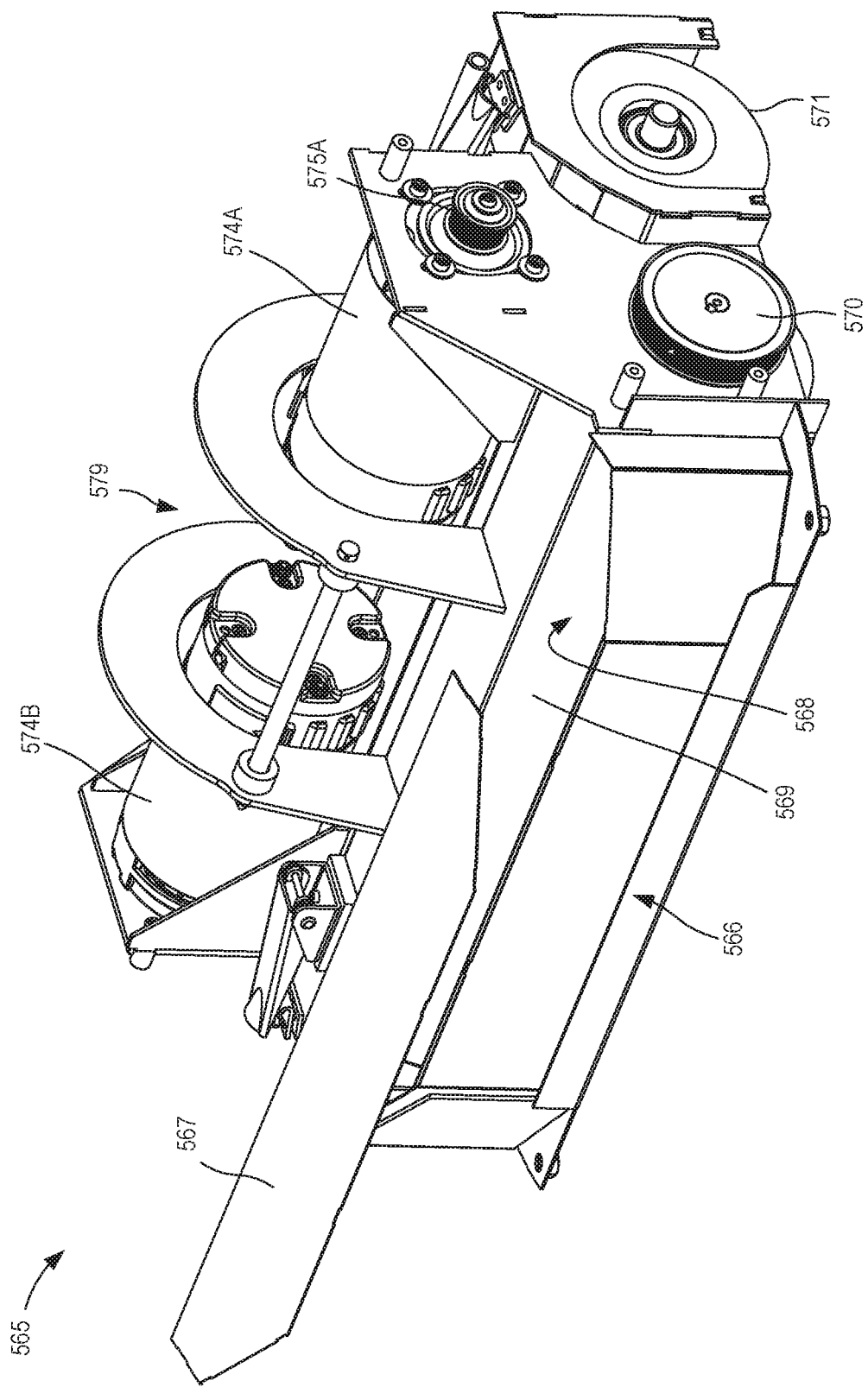
FIGS. 39 and 40 are a right perspective view and a left perspective view, respectively, of the cleaning assembly of FIG. 38 illustrated without one or more portions to shown internal components.
Figure 40:
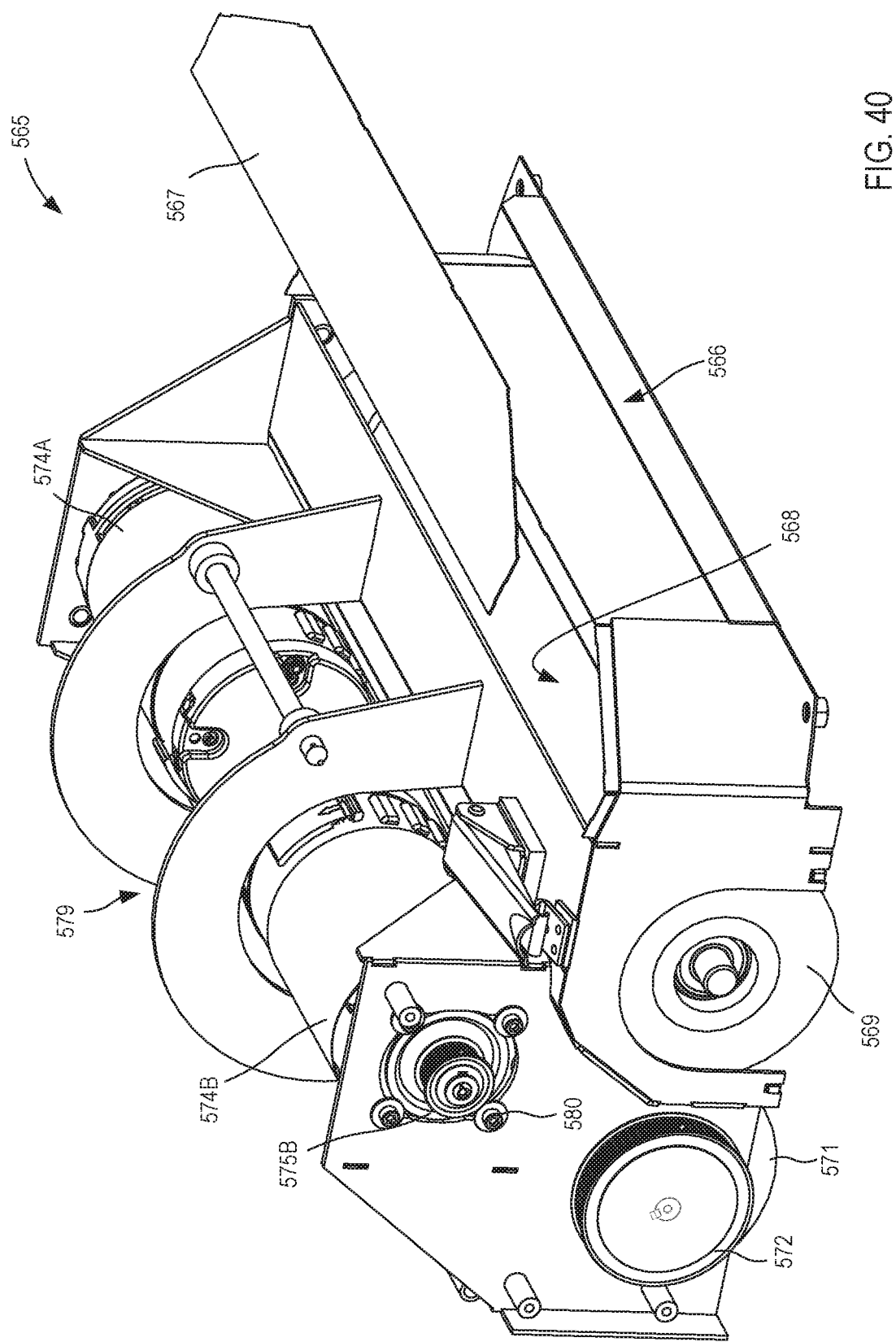
Figure 41:
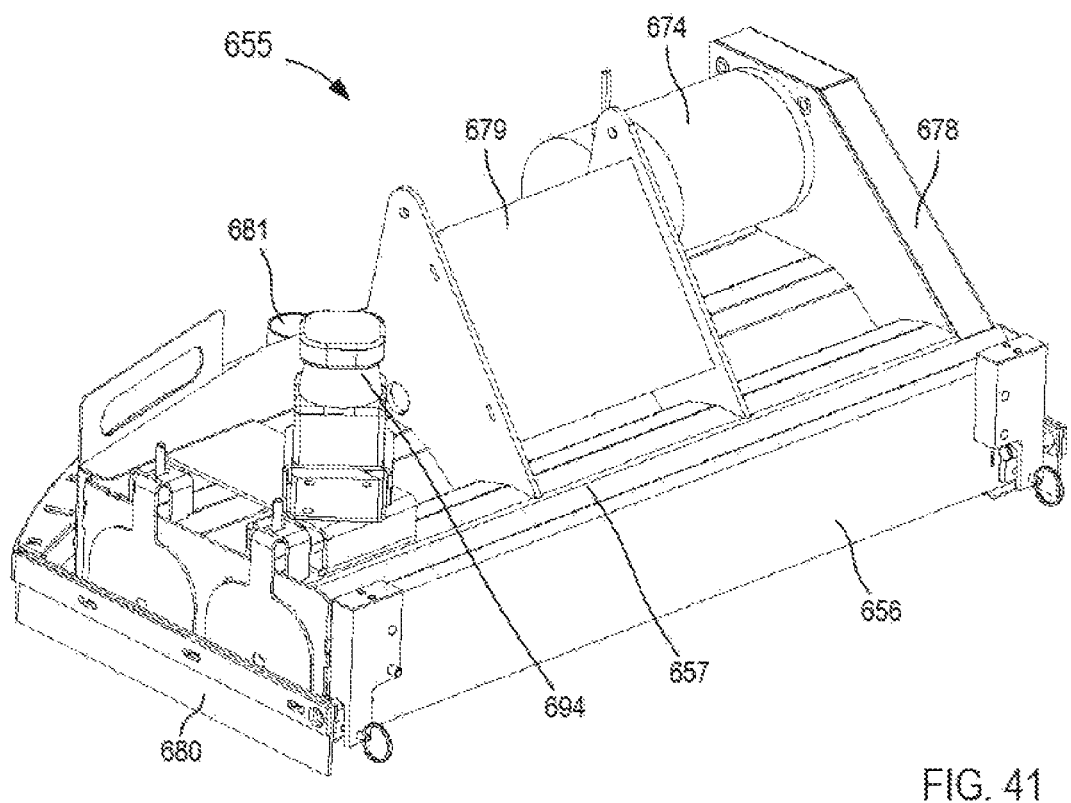
FIGS. 41 and 42 are a top perspective view and a bottom perspective view of a cleaning assembly according to an embodiment.
Figure 42:
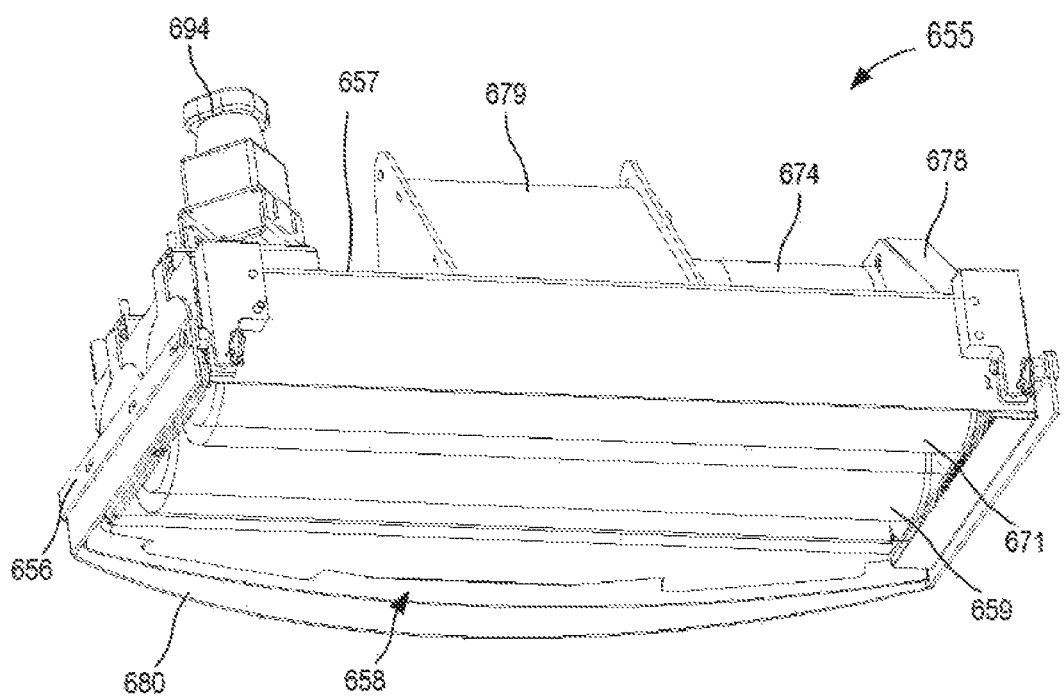
Figure 43:
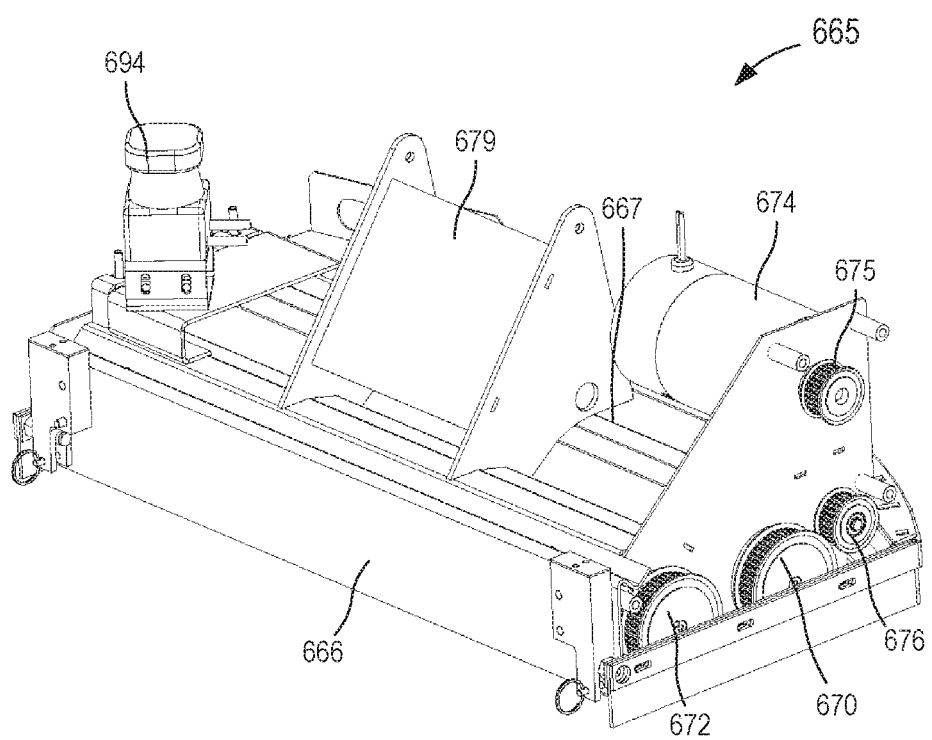
FIG. 43 is a perspective view of the cleaning assembly of FIGS. 41 and 42 with a shroud removed.

As shown in FIGS. 38-40, the cleaning assembly 565 includes a frame 566, a first brush 569, a second brush 571, a first motor 574A, and a second motor 574B. The frame 566 supports at least a portion of the cleaning assembly 565. As shown in FIG. 38, the frame 566 includes and/or can be coupled to a pair of skirts 580 that extend toward the surface from either side of the frame 566. The cover 567 is coupled to the frame 566 and is configured to cover, house, and/or enclose at least a portion of the cleaning assembly 565. More particularly, the cover 567 can couple to the frame 566 to define at least a portion of an inner volume 568 that can house at least a portion of the first brush 569 and the second brush 571, as shown in FIGS. 39 and 40. In some embodiments, at least a portion of the inner volume 568 can define, for example, a suction volume or the like within which a negative pressure (e.g., via the vacuum source 585) can be formed to draw detritus into the cleaning assembly 565 and ultimately into the detritus cavity 512 the like.

The first motor 574A and the second motor 574B of the cleaning assembly 565 can be any suitable motor configured, for example, to rotate the first brush 569 and the second brush 571, respectively. For example, as shown in FIG. 39, the first motor 574A includes an output 575A that can be operably coupled to a first pulley 570 fixedly coupled to the first brush 569 (e.g., via a belt or the like, not shown) such that rotation of the output 575A results in a rotation of the first brush 569. Likewise, as shown in FIG. 40, the second motor 574B includes an output 575B that can be operably coupled to a second pulley 572 fixedly coupled to the second brush 571 (e.g., via a belt or the like, not shown) such that rotation of the output 575B results in a rotation of the second brush 571. As shown in FIG. 38, the cleaning assembly 565 includes a pair of shrouds 578 that are configured to cover and/or house at least a portion of the outputs 575A and 575B, the first pulley 570, and the second pulley 572.

In some embodiments, the arrangement of the cleaning assembly 565 can be such that the motors 574A and 574B rotate the first brush 569 and the second brush 571, respectively, in substantially the same rotational direction. In other embodiments, the first motor 574A can be configured to rotate the first brush 569 in a first rotational direction and the second motor 574B can be configured to rotate the second brush 571 in a second rotational direction, opposite the first rotational direction. Although not shown in FIGS. 38-40, the arrangement of the cleaning assembly 565 is such that the inner volume 568 defined by the frame 566 is in fluid communication with, for example, the upper storage portion 508 and/or the lower storage portion 536 of the frame 510. For example, the detritus cavity 512 is in fluid communication with the inner volume 568 and is configured to draw detritus from inside the inner volume 568 into the detritus cavity 512 via a negative pressure produced by the vacuum source 585. The lower storage portion 536 (e.g., a liquid storage portion thereof) can be in fluid communication with the inner volume 568 via one or more hoses, pipes, conduits, tubes, etc. More particularly, one or more hoses or the like can extend from the lower storage portion 536 to, for example, a fluid delivery rail 507 (see e.g., FIG. 38) of the cleaning assembly 565. The fluid delivery rail 507, in turn, is in fluid communication with the inner volume 568 and thus, can deliver, for example, a flow of a cleaning solution and/or any other suitable liquid from the lower storage portion 536 to the inner volume 568, as described above. In this manner, the cleaning assembly 565 can be similar in form and/or function to the cleaning assemblies 165, 265, 365, and/or 465 described in detail above.

At least a portion of the cleaning assembly 565 can be in communication with the electronics system 590 and can be configured to send signals to and/or receive signals from the electronics system 590 associated with the operation of the cleaning assembly 565. For example, in some instances, the electronics system 590 can send a signal to the first actuator 586 that can be operable to move the cleaning assembly 565 relative to the frame 510, as described above. In some instances, the electronics system 590 can send a signal operable in transitioning the motors 574A and 574B between an "off" operational state and an "on" operational state, which in turn, can be operable in starting a rotation of the first brush 569 and the second brush 571, respectively.

As described in detail above with reference to the robots 100, 200, 300, and/or 400, the electronics system 590 can be configured to control any suitable portion of the robot 500 using, for example, a feedback control method such as a PID control scheme and/or the like. For example, the electronics system 590 can include and/or can be in communication with one or more electric and/or electronic components such as any number of cameras, transceivers, beacons, encoders, odometers, tachometers, accelerometers, IMUs, proximity sensors, relay logics, switches, and/or the like (collectively referred to herein as "sensors"). In some embodiments, the electronics system 590 can include and/or can be in communication with any of the sensors described above. As such, the sensors can sense, detect, and/or otherwise determine one or more operating condition associated with the robot 500 and/or one or more environmental condition associated with the environment within which the robot 500 is disposed, as described in detail above. For example, the electronics system 590 includes and/or is in communication with at least a user interface 592, one or more cameras 593, and the laser transceiver 594. Although not shown in FIGS. 29-40, the electronics system 590 can also include and/or can be in communication with one or more encoders, odometers, accelerometers, and/or IMUs included in the drive system 540. In this manner, the electronics system 590 can be substantially similar in form and/or function to the electronics systems 190, 290, 390, and/or 490 of the robots 100, 200, 300, and/or 400, respectively. Moreover, as described above, the electronics system 590 can be implemented in one or more devices included in the robot 500 and/or one or more remote devices such as, for example, a controller, a personal computer, a laptop, a tablet, a smartphone, a wearable electronic device, etc. In some instances, the electronics system 590 can be configured to send data associated with an operating condition, status, completion rate, cleaning map, etc. to a remote device, which in turn, can be accessed by a user remotely to verify a desired operation of the robot 500.

As described in detail above with reference to the robot 200, the electronics system 590 can receive signals associated with one or more operating conditions from the cameras 593, the laser transceiver 594, and/or any other suitable sensor (not shown in FIGS. 29-40). In turn, the electronics system 590 can execute a set of instructions, code, modules, etc. associated with controlling one or more subsequent actions of the drive system 540 and/or the cleaning assembly 565, based at least in part on the data received from the sensors. The electronics system 590 can then send signals indicative of instructions to perform the one or more subsequent actions to an associated electric and/or electronic component (e.g., the first actuator 586 coupled between the frame 510 and the cleaning assembly 565, a pump such as the vacuum source 585, a motor such as the motors 542A, 542B, 574A, and/or 574B, and/or any other suitable device). In some instances, based on data received from the sensors, the electronics system 590 can be configured to increase or decrease the velocity and/or acceleration of the robot 500, change an operating condition of the cleaning assembly 565, temporarily pause the robot 500, remap the surface being cleaned, redefine a cleaning path and/or cleaning plan, and/or the like, as described in detail above.

In some instances, the electronics system 590 can be configured to "shut down," "power off," and/or otherwise stop operating in response to the data received from the sensors. For example, in some instances, the electronics system 590 can receive a signal from a sensor that indicates an unsafe and/or undesired operating condition, in this manner, the receiving the signal can result in the electronics system 590 initiating a "kill switch" or the like. In some embodiments, the electronics system 590 can include a physical "kill switch" that can be actuated by a user. In still other embodiments, the electronics system 590 can receive a signal from a remote device such as a smartphone, personal computer, tablet, laptop, etc. indicative of an instruction to initiate the "kill switch." In this manner, the robot 500 can be configured to operate safely within, for example, defined safety parameters (e.g., defined by the user, defined by the manufacturer, etc.). Thus, the robot 500 can operate in a substantially similar manner as described above with reference to any of the robots 100, 200, 300, and/or 400 described in detail above.

Figure 29:
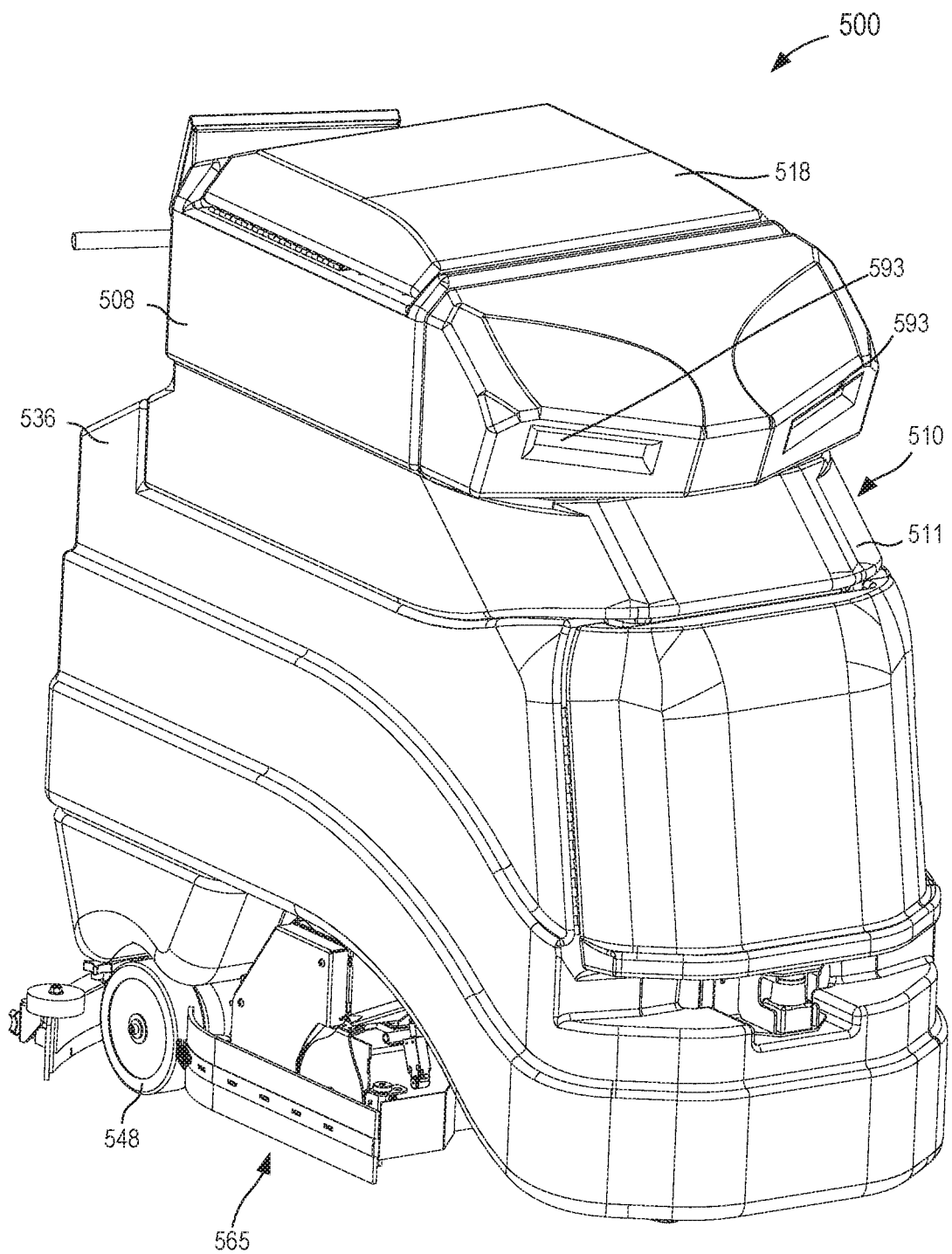
FIGS. 29 and 30 are a front perspective view and a rear perspective view, respectively, of a semi-autonomous robot according to an embodiment.
Figure 30:
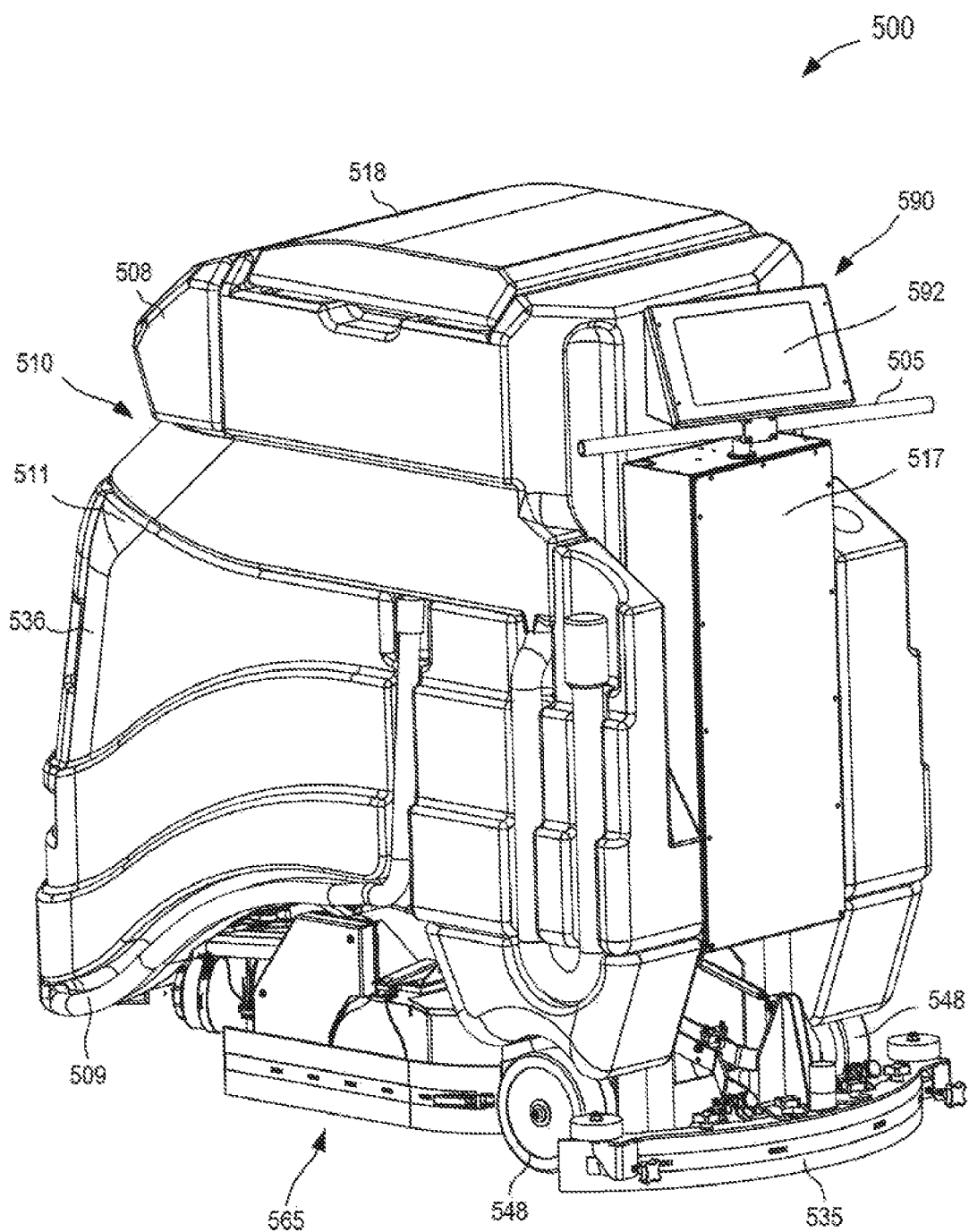

While the cleaning assemblies 265, 365, and 465 are particularly shown and described above, in other embodiments, the robots 200, 300, and/or 400 can include any suitable cleaning assembly. For example, FIGS. 29-31 illustrate a cleaning assembly 665 according to another embodiment. As described above with reference to the cleaning assemblies 265, 365, and/or 465, the cleaning assembly 665 includes a mounting portion 679 configured to be coupled to a frame of a robot. In some embodiments, the mounting portion 679 of the cleaning assembly 665 can include any suitable linkage and/or mechanism configured to allow the cleaning assembly 665 to be moved relative to the frame, as described above.

As shown, the cleaning assembly 665 includes frame 666, a cover 667, a shroud 678, a first brush 669, a second brush 671, a motor 674, and a laser transceiver 694. The frame 666 can be configured to support at least a portion of the cleaning assembly 665. As shown in FIG. 29, the frame 666 includes and/or can be coupled to a skirt 680 that can extend from the frame 666 toward a surface to be cleaned. The cover 667 is coupled to the frame 666 and is configured to cover, house, and/or enclose at least a portion of the cleaning assembly 665. The laser transceiver 694 is coupled to the cover 667 and is configured to function substantially similar to the laser transceivers 294 and/or 494 described in detail above.

The cover 667 can couple to the frame 666 to define an inner volume 668 that can house at least a portion of the first brush 669 and the second brush 671, as shown in FIG. 30. In some embodiments, at least a portion of the inner volume 668 can define, for example, a suction volume or the like within which a negative pressure can be formed to draw detritus into the cleaning assembly 665 and ultimately into a detritus volume or the like. For example, as described above, the robot 600 includes the vacuum source 685 that can be in communication with the inner volume 668 of the cleaning assembly 665 via, for example, a port 681 (see e.g., FIG. 29). In this manner, the vacuum source 685 can be configured to form a negative pressure differential within the inner volume 668 that can be operable in drawing detritus into the cleaning assembly 665.

The motor 674 of the cleaning assembly 665 can be any suitable motor configured, for example, to rotate the first brush 669 and the second brush 671. As shown in FIG. 31, the motor 674 includes an output 675 that can be operably coupled to a first pulley 670 fixedly coupled to the first brush 669, a second pulley 672 fixedly coupled to the second brush 671, and a tensioner pulley 676 via a belt. As such, the motor 674 can rotate the output pulley 675, which in turn, rotates the first pulley 670, the second pulley 672, and the tensioner pulley 676. Therefore, with the first pulley 670 fixedly coupled to the first brush 669 and with the second pulley 672 fixedly coupled to the second brush 671, the motor 674 can be configured to rotate the first brush 669 and the second brush 671. Moreover, as shown in FIG. 16, the shroud 678 can be configured to cover and/or house at least a portion of the output pulley 675, the first pulley 670, the second pulley 672, and the tensioner pulley 676.

In some embodiments, the arrangement of the cleaning assembly 665 can be such that the motor 674 rotates the first brush 669 and the second brush 671 in substantially the same rotational direction. In other embodiments, the motor 674 can be configured to rotate the first brush 669 in a first rotational direction and the second brush 671 in a second rotational direction, opposite the first rotational direction. In still other embodiments, the cleaning assembly 665 can include a first motor configured to rotate the first brush 669 and a second motor configured to rotate the second brush 671 independent of the first brush 669. In this manner, the first brush 669 and the second brush 671 can be rotated, for example, to sweep and/or scrub the surface to entrain debris and/or detritus within the inner volume 668. Moreover, a negative pressure produced by a vacuum source or the like (as described above) can draw the debris and/or detritus into a storage volume or the like (e.g., similar to the detritus volume 212 defined by the storage portion 211 of the frame 210 described above with reference to FIG. 6). As described above with reference to the cleaning assembly 465, the brushes 669 and 671 can be any suitable configuration. In this manner, the cleaning assembly 665 can be used in any suitable robot such as the robot 200, 300, and/or 400 to clean a surface on which that robot is moving.

Any of the embodiments described herein can perform any suitable process to efficiently clean a surface having any suitable regular or irregular boundary. For example, in some embodiments, a robot can execute any suitable process which can result in the robot following a contour of a cleaning environment (e.g., surface) within a predetermined distance such as, for example, about 5 centimeters or less from a boundary such as a wall or the like. Such robots can use, for example, one or more laser scanner sensor, 3D camera sensor, range sensor, proximity sensor, etc. to estimate the shape of the contour to be followed and then can execute a feedback control system and/or the like to substantially maintain a cleaning head and/or cleaning assembly within the predetermined distance of the surface. In addition, the robot can execute a set of processes to determine, for example, an angle of a portion of the robot relative to the desired contour. In some embodiments, the robot can execute a feedback control system and/or the like to substantially maintain at least a portion of the robot (e.g., the cleaning assembly) within about a 90 degree angle of the contour (i.e., perpendicular to the contour).

As described in detail above with reference to the robot 200, in some embodiments, a user can manipulate a robot to initialize the robot and/or otherwise to map the cleaning environment. In some instances, such an initializing process can include, for example, collecting data from any suitable sensor or the like included in the robot. For example, as a user drives the robot to initialize the robot, an electronics system of the robot can collect and/or store data received from one or more of a wheel odometer, IMU, laser, depth imager, range sensor, camera, radio beacon, pressure sensor, and/or any other suitable sensor. Once the electronics system receives the data from the one or more sensors, the electronics system (e.g., a processor included therein) can perform and/or execute a set of processes and/or the like to define a map of the cleaning environment based on the data received from the sensors. With the cleaning environment mapped, the electronics system can execute a set of processes and/or instructions associated with using the environment map to graph and/or chart robot positions represented by nodes. The electronics system can then determine an efficient path and/or a fit that passes through the nodes (e.g., a travelling salesman method, algorithm, and/or the like).

Figure 44:
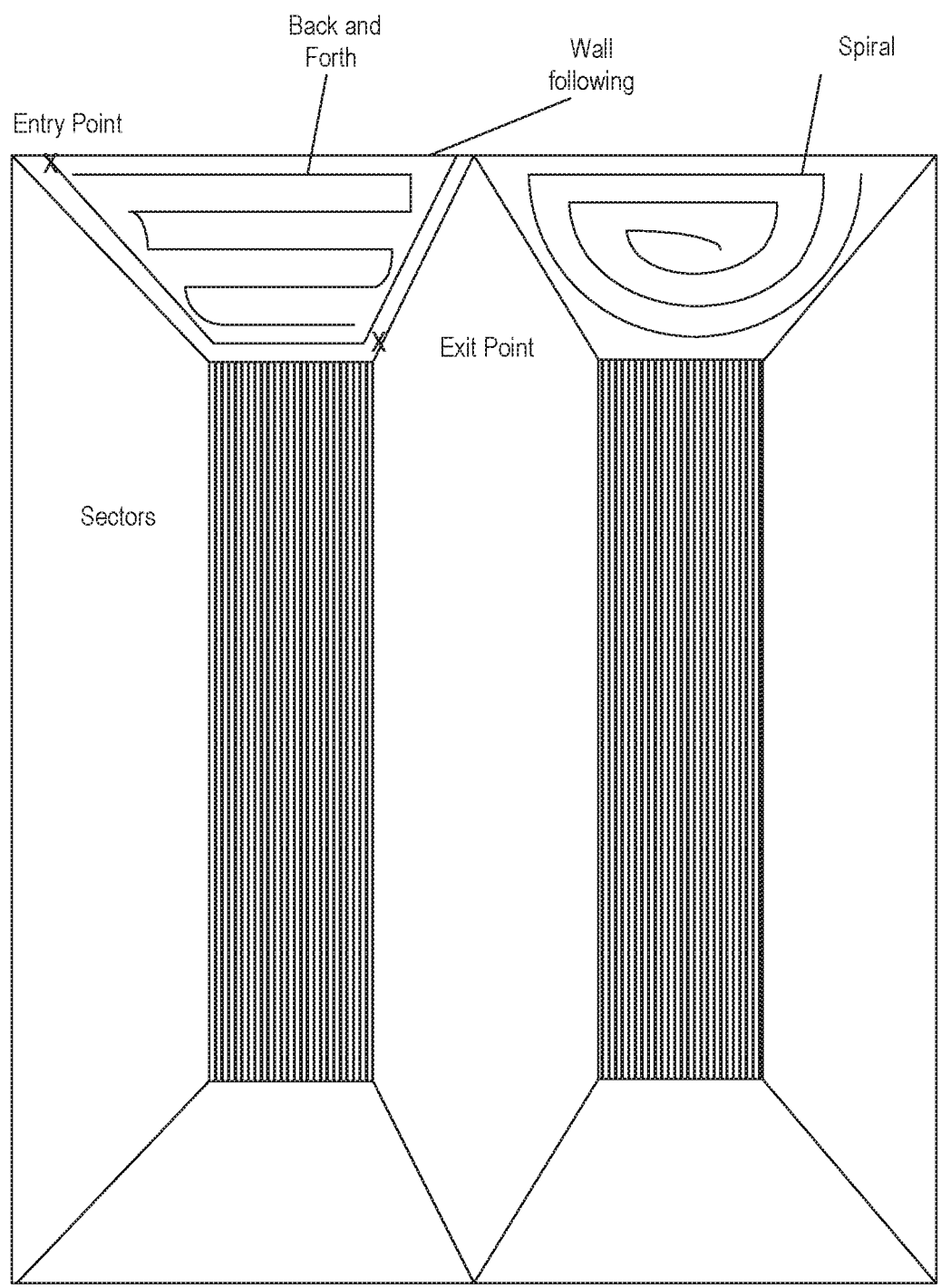
FIG. 44 is an illustration of methods for defining a cleaning plan.

In some embodiments, the electronics system of a robot can be configured to define an efficient path to clean a surface based on, for example, decomposing a cleaning environment into sectors. More specifically, as described above, the robot can be configured to determine and/or define a map of the cleaning environment. In some instances, the map can be a map or the like including specific and/or relevant information about the cleaning environment. Once the map is defined, the electronics system can decompose a cleaning environment into multiple sectors and can determine, for example, an efficient path for cleaning each sector independently (e.g., "intra-sector cleaning"), as shown in FIG. 44. In some instances, by first defining the map, the electronics system can determine and/or define an efficient decomposition of the map into the sectors, for example, without a user defining the sectors. Moreover, by defining the sectors based on the map and/or the like the electronics system can be configured to determine a position of the robot, a completion percentage, and/or the like.

Once a path is determined for each sector, the electronics system can determine, for example, an efficient path for combining the sectors (e.g., "inter-sector cleaning"). By way of example, in some instances, the electronics system can be configured to begin a mapping of a sector or the like by defining an operation and/or path that closely follows a set of boundaries associated with that sector, as described in detail above. Once a path for following the boundaries is defined, the electronics system can then define a path for cleaning an area circumscribed by the path following the boundaries. Once a path for each sector is defined, each intra-sector cleaning path can be defined and the inter-sector cleaning path can be defined based on a most efficient combination of the intra-sector cleaning paths. In some instances, the defining of the inter-sector cleaning path includes remapping the surface. In some instances, the most efficient intra-sector or inter-sector cleaning path can be a path most likely to avoid obstacles and/or other objects along the path.

As shown in FIG. 44, in some embodiments, the most efficient path for cleaning a sector can be a method in which the robot moves back and forth in substantially straight lines (as described above) with, for example, at least some overlap to ensure the surface is completely cleaned (e.g., in the event that the electronics system inaccurately determines the position of the robot). Alternatively, in some instances, the electronics system can determine the most efficient path for cleaning a sector can be a spiral or concentric paths. Similarly, the electronics system can be configured to define the paths such that there is an overlap to ensure the surface is completely cleaned. The electronics system can also define a most efficient way to enter and/or exit the sector based on, for example, an exit of a previous section that was just cleaned and/or an entrance of a subsequent sector to be cleaned. Moreover, in some instances, the electronics system can receive signals from the sensors and/or the like while moving along the path and can to update an intra-sector cleaning path and/or an inter-sector cleaning path in response to a discovered obstacle or the like. In other words, the electronics system can remap at least a portion of the surface to define an updated intra-sector cleaning path or an updated inter-sector cleaning path. As such, the updated intra-sector cleaning path and/or the updated inter-sector cleaning path can define a most efficient cleaning path accounting for the discovered object or the like.

While the electronics systems are described herein as sending signals to a portion of the robot (e.g., sensors, motors, actuators, pumps, etc.), which are operable in controlling at least the portion of the robot, in some instances, the electronics systems can send a flow of electricity having a desired electric power (e.g., not a signal including data). In such instances, an amount of electric power (i.e., a voltage (V) times an amperage (A) associated with the flow of electricity), for example, can be associated with a desired operational state of an electric and/or electronic component receiving the flow of electric power. For example, in some instances, the electronics system can deliver a first amount of electric power to a motor of a cleaning assembly configured to rotate one or more brushes. In turn, the motor can be configured to rotate an output shaft and/or pulley with a first rotational velocity. Similarly, the electronics system can deliver a second amount of electric power greater the first amount of electric power to the motor of the cleaning assembly and in response, the motor can rotate the output shaft and/or pulley with a second rotational velocity greater than the first rotational velocity. In other instances, the electronics system can send a signal to an electric and/or electronic component of the cleaning assembly and a flow of electric power. In such instances, the signal can be indicative of an instruction to operate at a predetermined operational state, which can be associated with an amount of electric power received.

While some of the electronics systems are described herein as receiving signals from any suitable sensor and/or the like and based on a processor executing a set of instructions, a subsequent action is performed by a portion of the robot, in other instances, a signal from the sensor can be operable in causing a portion of the robot to perform the subsequent action. For example, in some instances, the signal sent from a sensor can be operable in transitioning a switch, a fuse, a breaker, and/or any other suitable logic device from a first state, in which a portion of the robot receives a flow of electric power, to a second state, in which the portion of the robot substantially does not receive a flow of electric power. For example, a sensor can send a signal associated with a portion of a robot being placed in contact with an object as the robot moved along a surface can be operable in stopping a rotational output of one or more motors included in a drive system.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. For example, although the robots 100, 200, 300, and/or 400 are described above as including motors that drive and/or rotate one or more components via a belt and pulley arrangement, in other embodiments, a motor can be configured to drive any suitable component directly and/or via a chain and gear arrangement. Although various embodiments have been described as having particular features and/or combinations of components, other embodiments are possible having a combination of any features and/or components from any of embodiments as discussed above.

Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

What is claimed:

1. An apparatus, comprising:
   a frame supporting at least one storage volume;
   a drive system supported by the frame and configured to move the frame along a surface;
   a cleaning assembly coupled to the frame and configured to transfer detritus from the surface to the at least one storage volume as the drive system moves the cleaning assembly along the surface; and
   an electronics system supported by the frame and including at least a memory and a processor, the processor being configured to execute a set of instructions stored in the memory associated with (1) defining a map of the surface based on data received from at least one sensor, (2) decomposing the map into a plurality of sectors that collectively form the map, (3) defining an intra-sector path along each sector from the plurality of sectors based at least in part on a calculated efficiency associated with transferring detritus from that sector from the plurality of sectors to the at least one storage volume, and (4) combining the intra-sector path along each sector from the plurality of sectors to define an inter-sector path based at least in part on a calculated efficiency associated with the cleaning assembly transferring detritus from the surface to the at least one storage volume as the drive system moves the cleaning assembly along the inter-sector path.

2. The apparatus of claim 1, wherein the cleaning assembly is configured to transfer detritus from the surface to the storage volume with a predetermined efficiency when the drive system moves the cleaning assembly along the inter-sector path.

3. The apparatus of claim 1, wherein the drive system includes a plurality of wheels, each wheel from the plurality of wheels configured to rotate about a wheel axis in response to an output of a different motor from a plurality of motors, an angle defined between each wheel axis being substantially equal.

4. The apparatus of claim 1, wherein the at least one sensor is at least one of a light transceiver, a camera, a radio, an encoder, a range sensor, an inertial measurement unit, a compass, a gyroscope, or an accelerometer.

5. The apparatus of claim 1, wherein the electronics system is configured to transition the drive system from a first configuration in which the drive system, receives a flow of electric power, to a second configuration in which the electronics system prevents a flow of electric power to the drive system in response to an input from the at least one sensor.

6. The apparatus of claim 1, wherein the electronics system is configured to transition the cleaning assembly from a first configuration in which the cleaning assembly, receives a flow of electric power, to a second configuration in which the electronics system prevents a flow of electric power to the cleaning assembly in response to an input from the at least one sensor.

7. The apparatus of claim 1, wherein the electronics system is configured to at least partially control the drive system to move the cleaning assembly along the inter-sector path.

8. The apparatus of claim 7, wherein the electronics system is configured to at least partially control the drive system to move the cleaning assembly along a redefined inter-sector path in response to receiving the at least one signal associated with the inter-sector path.

9. A method of cleaning of a surface using a cleaning robot, the method comprising:
   receiving data from at least one sensor as the cleaning robot is moved along the surface prior to cleaning the surface;
   defining a map of the surface to be cleaned based on the data received from the at least one sensor;
   decomposing the map into a plurality of sectors, a boundary of each sector from the plurality of sectors being defined based on a calculated efficiency associated with the cleaning robot cleaning the mapped surface;
   defining an intra-sector path along each sector from the plurality of sectors based on a calculated efficiency associated with the cleaning robot moving along the intra-sector path to clean a portion of the mapped surface corresponding to that sector from the plurality of sectors; and
   combining the intra-sector paths to define an inter-sector path based on a calculated efficiency associated with the cleaning robot moving along the inter-sector path to clean the mapped surface.

10. The method of claim 9, wherein the cleaning robot includes an electronics system, a drive system, a cleaning assembly, and a frame supporting each of the electronics system, the drive system, and the cleaning assembly,
    the drive system configured to move the cleaning robot along the surface in response to a signal from the electronics system, the cleaning assembly configured to clean the surface as the drive system moves the cleaning robot along the surface.

11. The method of claim 9, wherein the receiving data from the at least one sensor as the cleaning robot is moved along the surface includes receiving the data from the at least one sensor as a user moves the cleaning robot along the surface.

12. The method of claim 11, wherein the receiving data from the at least one sensor includes receiving data representing objects relative to the surface produced by the at least one sensor.

13. The method of claim 9, further comprising:
defining an updated intra-sector path for a sector from the plurality of sectors in response to the cleaning robot detecting an obstacle along the intra-sector path of that sector from the plurality of sectors.

14. The method of claim 13, further comprising:
defining an updated inter-sector path in response to the defining the updated intra-sector path, the updated inter-sector path being defined based on a calculated efficiency associated with the cleaning robot moving along the updated inter-sector path to clean the mapped surface.

15. The method of claim 9, further comprising:
define a completion percentage associated with the cleaning robot moving along the inter-sector path to clean the mapped surface; and
sending a signal to a remote electronic device indicative of an instruction to present data associate with the completion percentage on a display of the remote electronic device.

16. A method of cleaning of a surface using a cleaning robot, the method comprising:
defining a plurality of sectors collectively forming a mapped surface, a boundary of each sector from the plurality of sectors being defined based on a calculated efficiency associated with the cleaning robot cleaning the mapped surface;
defining a plurality of intra-sector paths, each intra-sector path from the plurality of intra-sector paths being a path along a different sector from the plurality of sectors and being based on a calculated efficiency associated with the cleaning robot moving along the intra-sector path from the plurality of intra-sector paths to clean a portion of the mapped surface corresponding to that sector from the plurality of sectors;
combining the plurality of intra-sector paths to define an inter-sector path based on a calculated efficiency associated with the cleaning robot moving along the inter-sector path to clean the mapped surface;
defining an updated intra-sector path for a sector from the plurality of sectors in response to the cleaning robot detecting an obstacle along the intra-sector path of that sector from the plurality of sectors; and
defining an updated inter-sector path in response to the defining the updated intra-sector path, the updated inter-sector path based on a calculated efficiency associated with the cleaning robot moving along the updated inter-sector path to clean the mapped surface.

17. The method of claim 16, wherein the cleaning robot includes an electronics system, a drive system, a cleaning assembly, and a frame supporting each of the electronics system, the drive system, and the cleaning assembly,
the drive system configured to move the cleaning robot along the surface in response to a signal from the electronics system, the cleaning assembly configured to clean the surface as the drive system moves the cleaning robot along the surface.

18. The method of claim 16, wherein the receiving data from the at least one sensor as the cleaning robot is moved along the surface includes receiving the data from the at least one sensor as a user moves the cleaning robot along the surface.

19. The method of claim 18, wherein the receiving data from the at least one sensor includes receiving data representing objects relative to the surface produced by the at least one sensor.

20. The method of claim 16, further comprising:
define a completion percentage associated with the cleaning robot moving along the inter-sector path to clean the mapped surface; and
sending a signal to a remote electronic device indicative of an instruction to present data associate with the completion percentage on a display of the remote electronic device.

* * * * *